United States Patent
Gniadek et al.

(10) Patent No.: US 11,525,963 B2
(45) Date of Patent: Dec. 13, 2022

(54) OPTICAL CONNECTION SYSTEM, OPTICAL CONNECTOR, AND OPTICAL ADAPTER FOR USE WITH OPTICAL CABLE ASSEMBLY AND RECEPTACLE

(71) Applicant: Senko Advanced Components, Inc., Marlborough, MA (US)

(72) Inventors: Jeffrey Gniadek, Oxford, ME (US); Yim Wong, Kowloon (HK)

(73) Assignee: Senko Advanced Components, Inc., Hudson (MA)

( * ) Notice: Subject to any disclaimer, the term of this patent is extended or adjusted under 35 U.S.C. 154(b) by 0 days.

(21) Appl. No.: 17/190,096

(22) Filed: Mar. 2, 2021

(65) Prior Publication Data
US 2021/0278600 A1 Sep. 9, 2021

Related U.S. Application Data

(60) Provisional application No. 62/984,355, filed on Mar. 3, 2020.

(51) Int. Cl.
*G02B 6/38* (2006.01)
*G02B 6/44* (2006.01)

(52) U.S. Cl.
CPC .......... *G02B 6/3831* (2013.01); *G02B 6/3825* (2013.01); *G02B 6/4471* (2013.01)

(58) Field of Classification Search
CPC .................................................... G02B 6/3831
See application file for complete search history.

(56) References Cited

U.S. PATENT DOCUMENTS

| | | | |
|---|---|---|---|
| 5,233,674 A | 8/1993 | Vladic | |
| 2013/0272671 A1* | 10/2013 | Jones | G02B 6/3849 |
| | | | 385/139 |
| 2015/0049989 A1 | 2/2015 | Yoshizaki | |
| 2017/0170596 A1 | 6/2017 | Goossens et al. | |
| 2017/0192183 A1 | 7/2017 | Wong et al. | |
| 2018/0156988 A1* | 6/2018 | Gniadek | H01R 13/506 |
| 2019/0187383 A1* | 6/2019 | Waldron | G02B 6/3825 |
| 2019/0235178 A1 | 8/2019 | Takano et al. | |
| 2019/0346635 A1 | 11/2019 | Yang | |

OTHER PUBLICATIONS

International Search Report and Written Opinion, Application No. PCT/US21/20682, dated May 24, 2021, pp. 11.

* cited by examiner

*Primary Examiner* — Sung H Pak

(57) ABSTRACT

An optical connection system for use with a receptacle and an optical cable assembly includes an adapter and connector. The adapter has an adapter latch element, and the connector has a connector latch element. A delatch actuator with a delatch arm is disposed on the connector housing for movement from a locking position to an unlocking position. One of the adapter latch element and connector latch element is a bendable latch hook and the other is a locking channel. When the connector housing is mated with the adapter, the delatch arm allows the bendable latch hook to latch with the locking channel in the locking position and unlatches the bendable latch hook from the locking channel as it moves to the unlocking position. An actuator lock movably supports a blocking member on the connector for selectively blocking the delatch actuator from moving to the unlocking position.

27 Claims, 67 Drawing Sheets

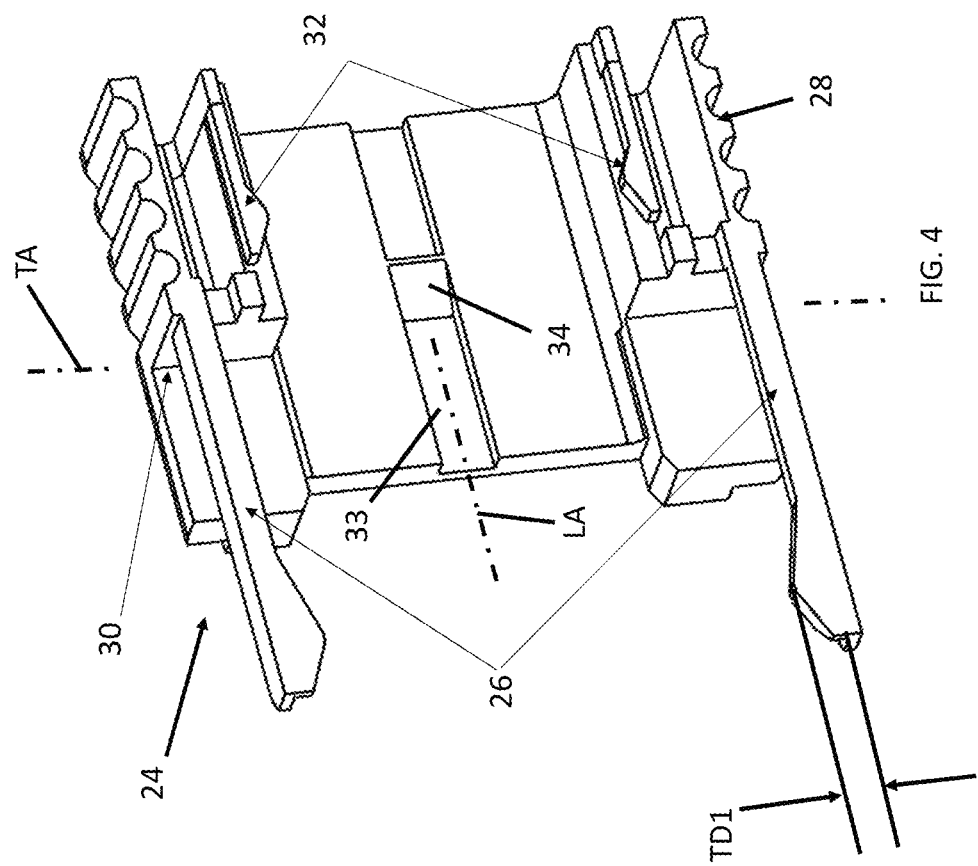
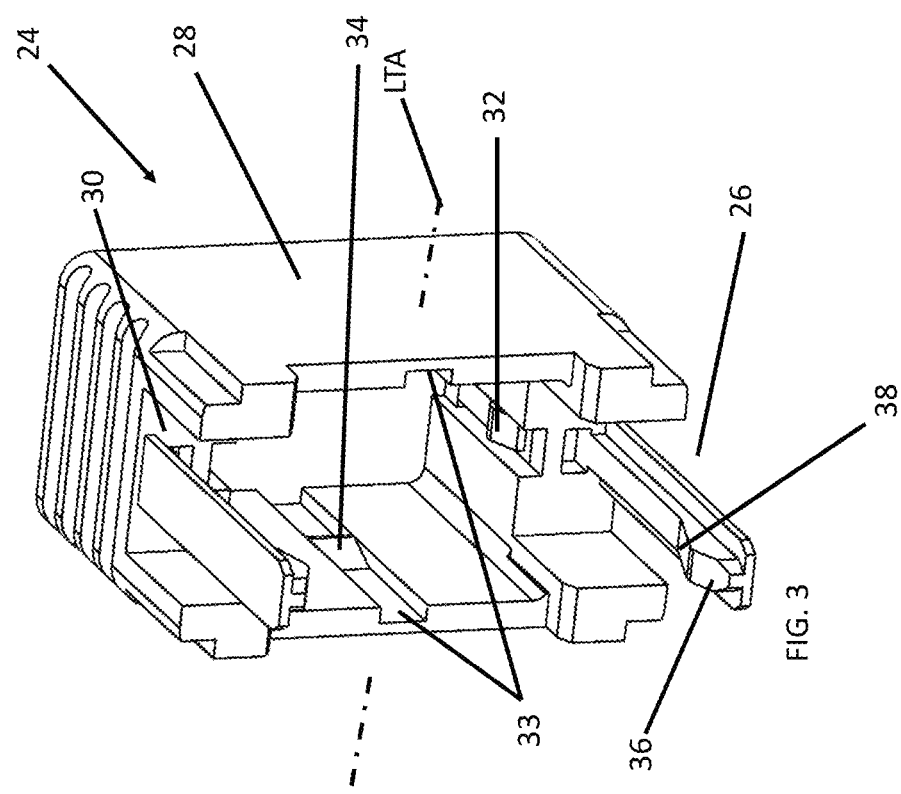

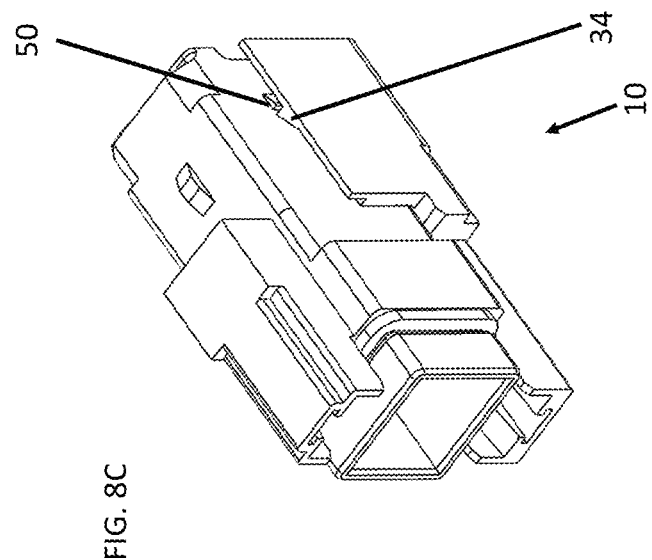
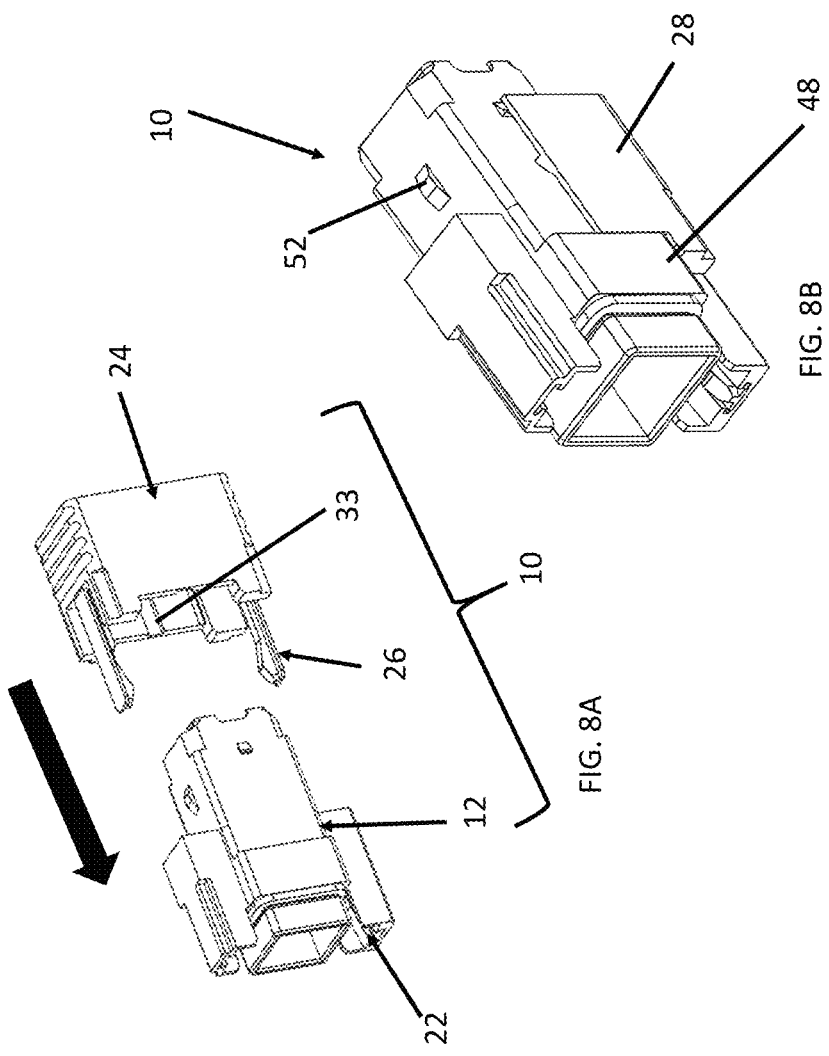

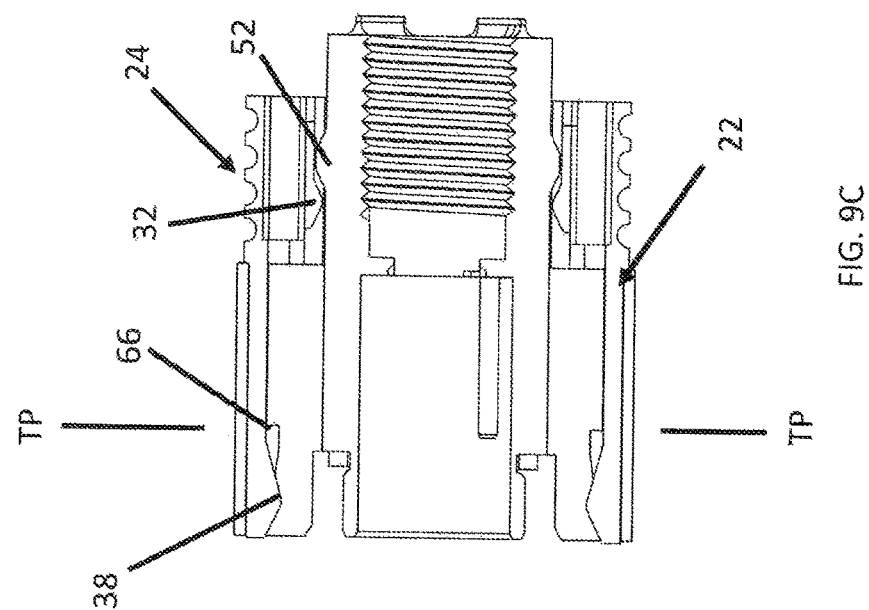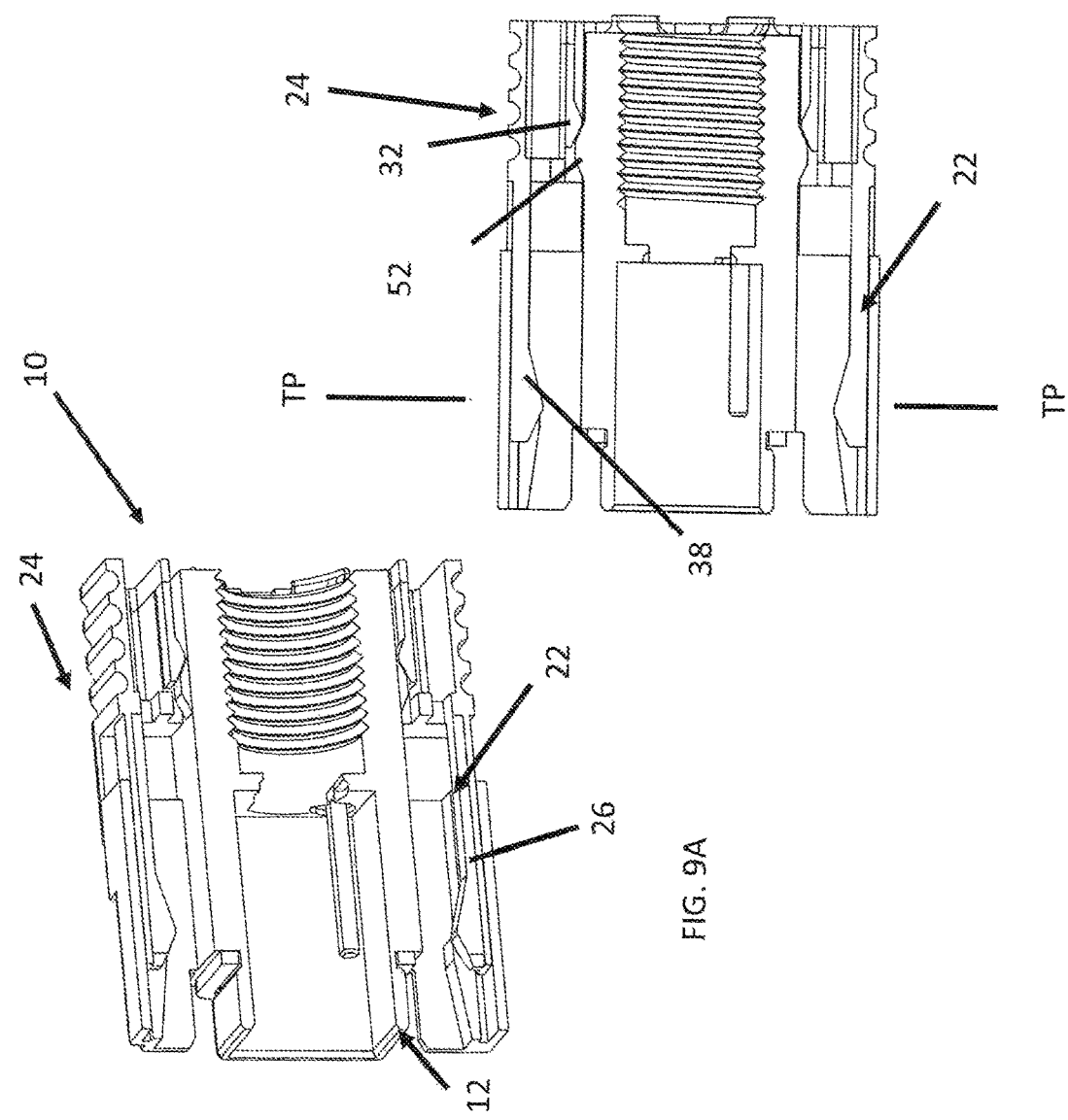

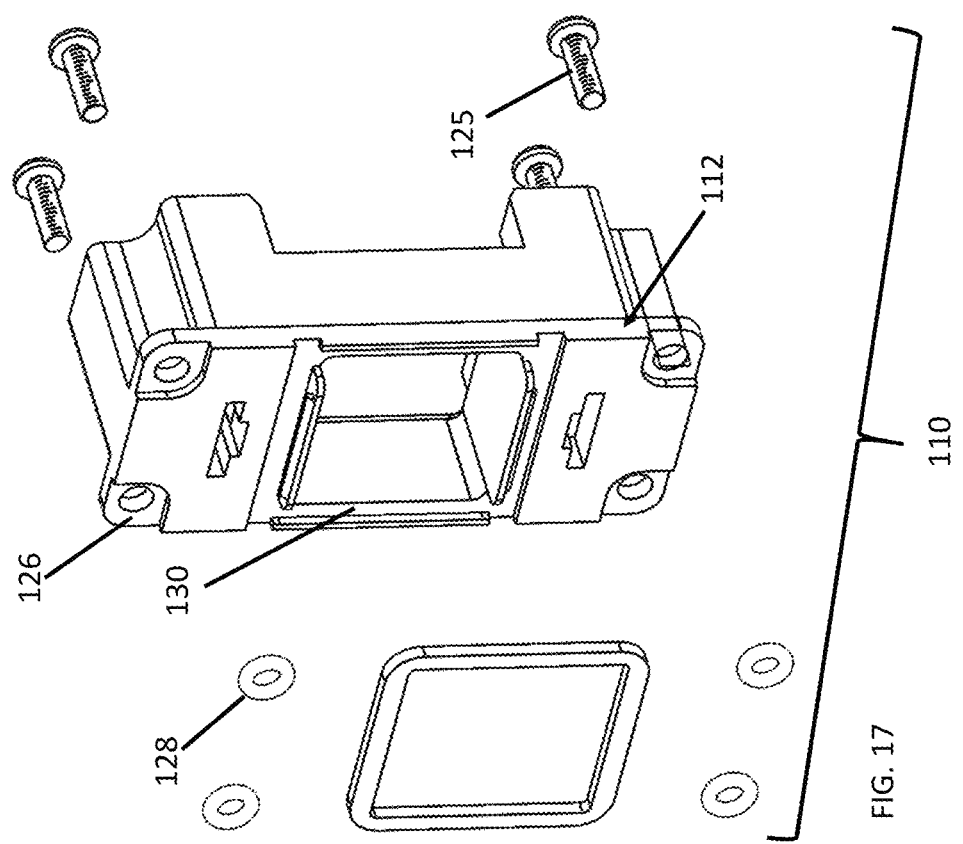

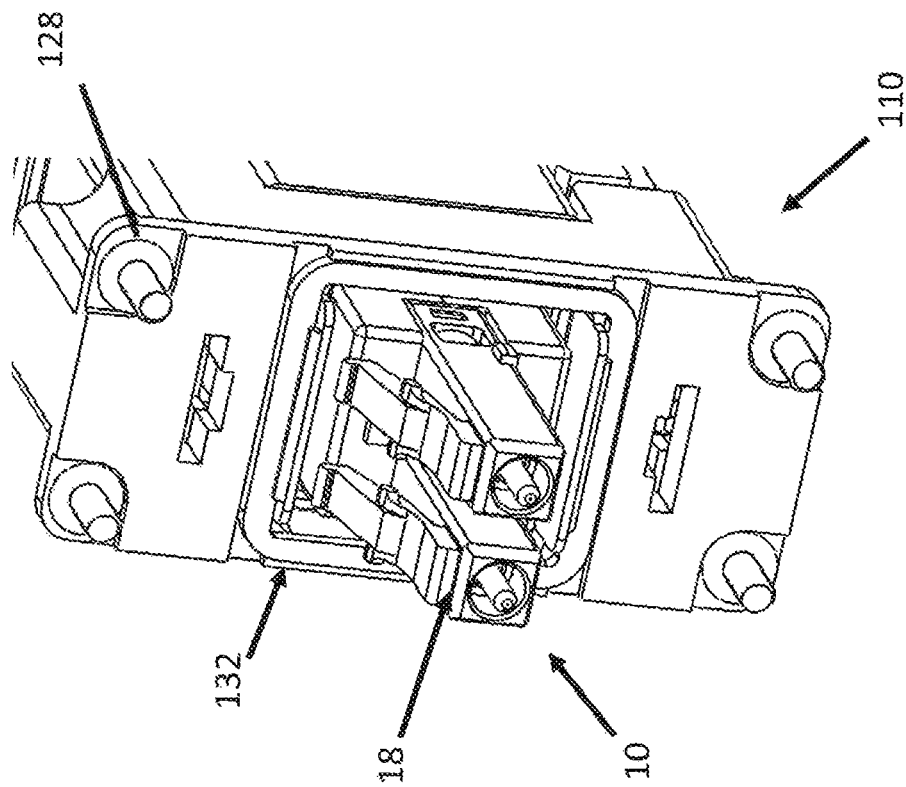
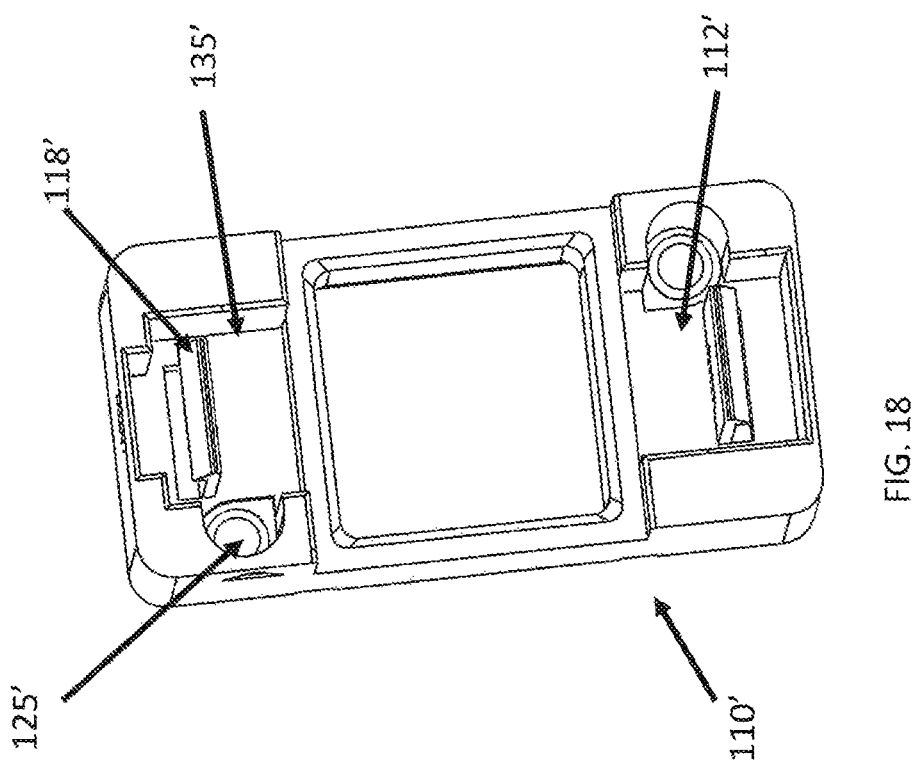

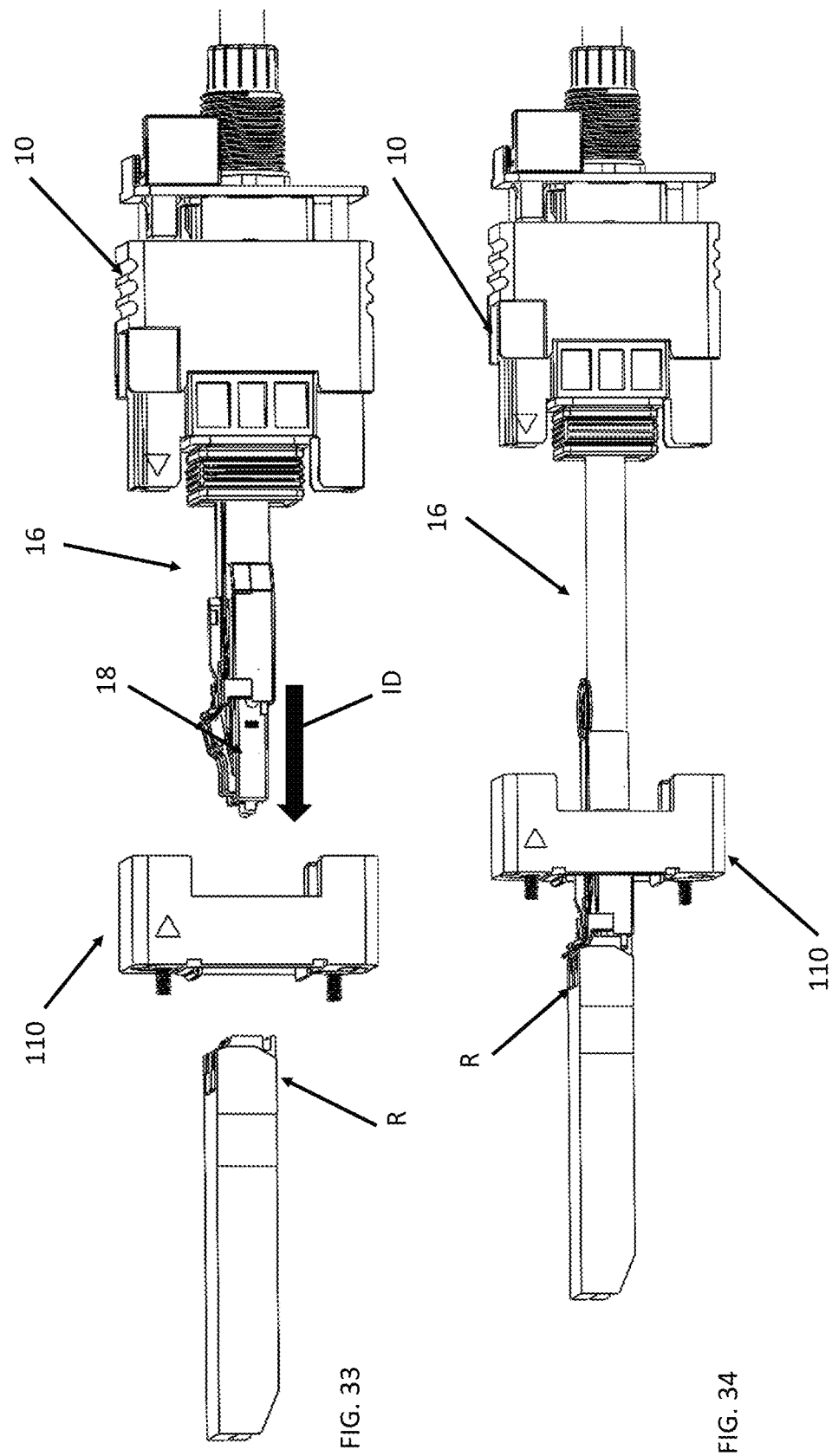

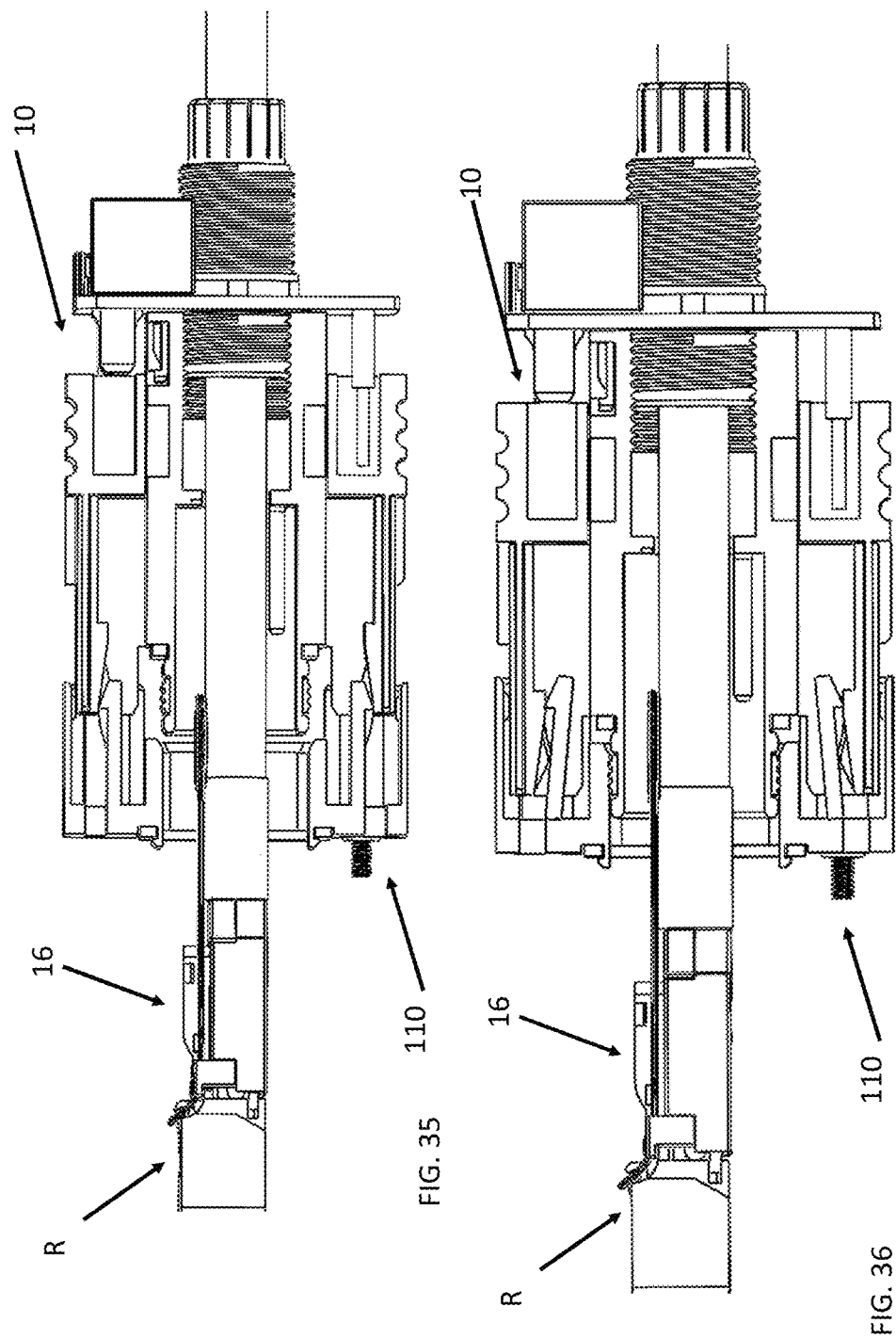

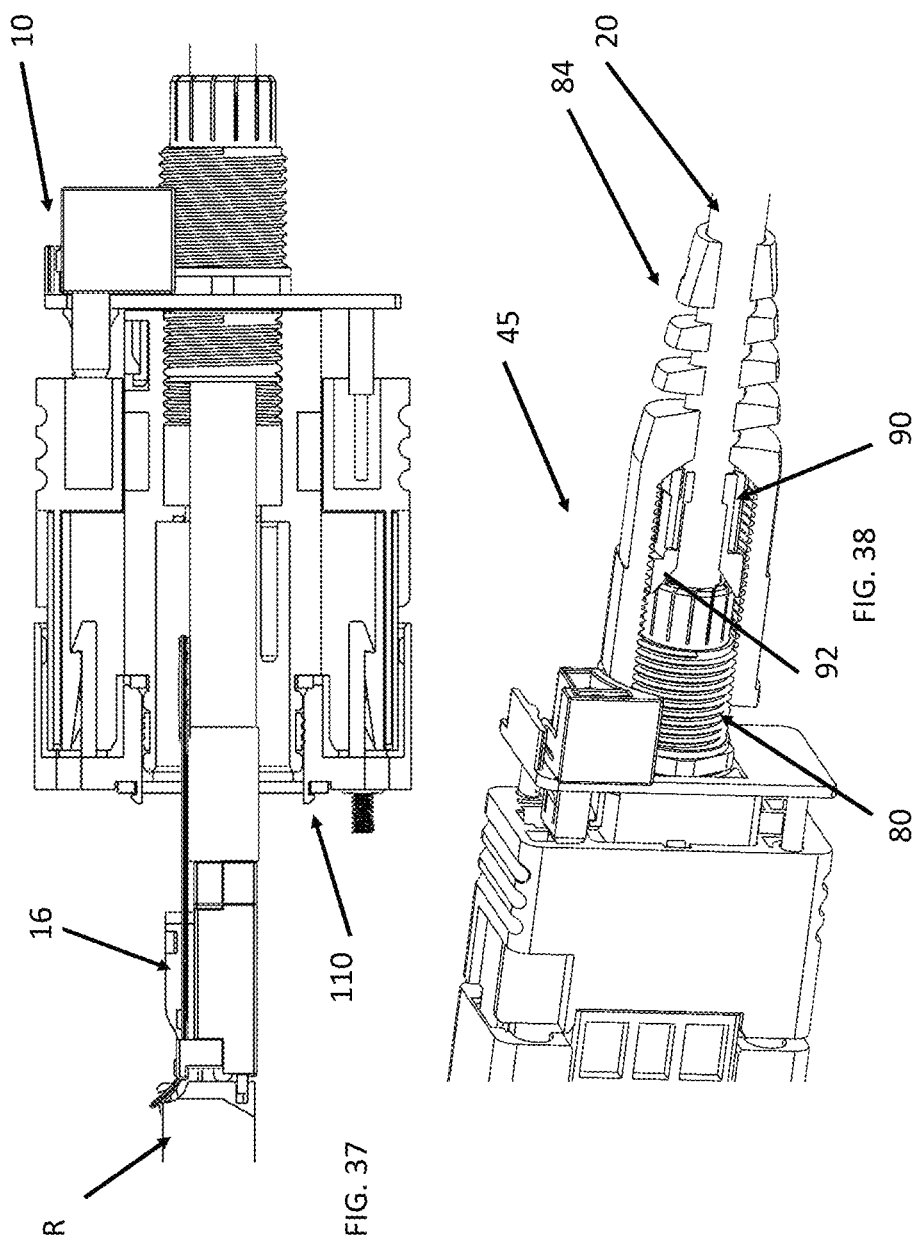

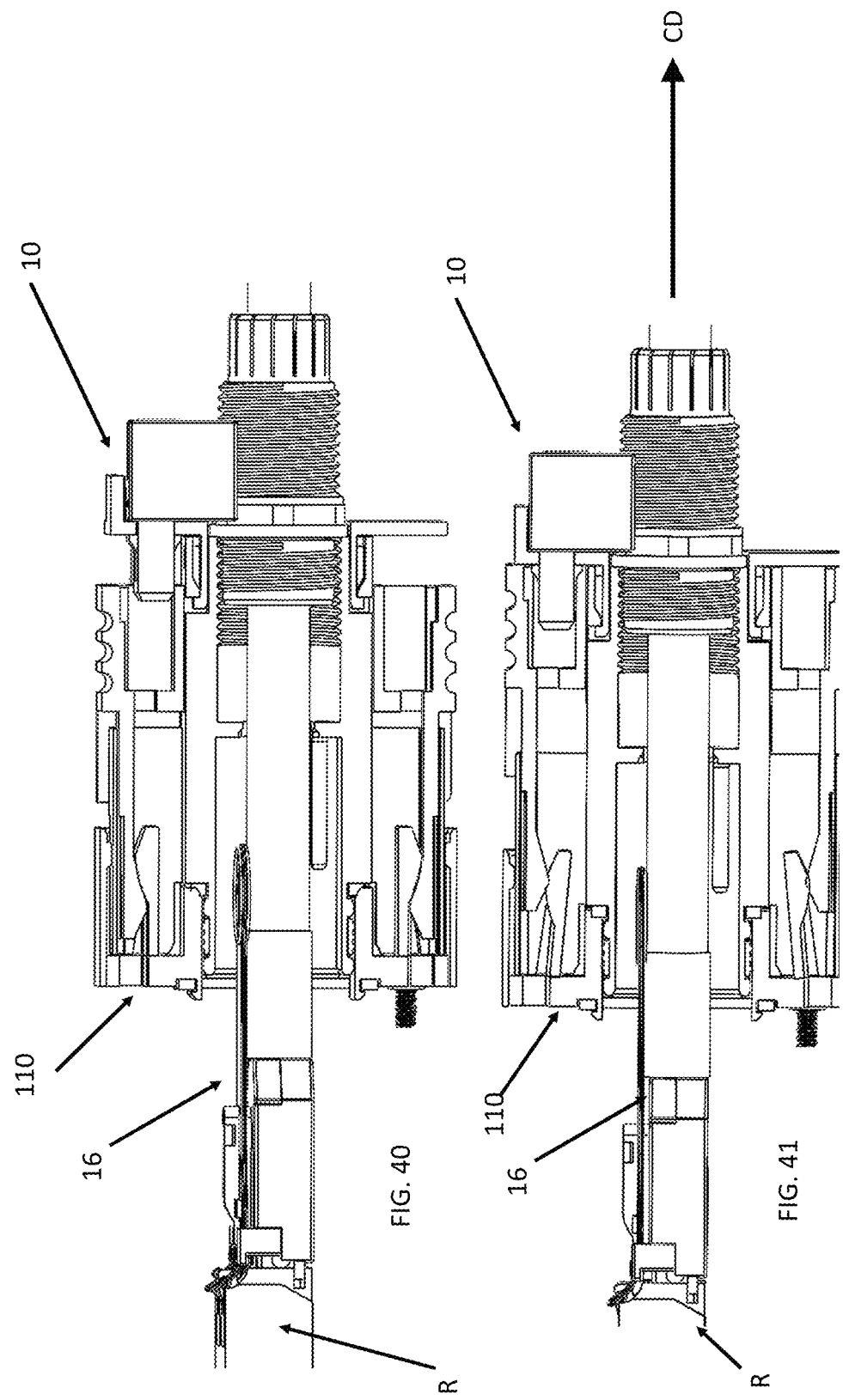

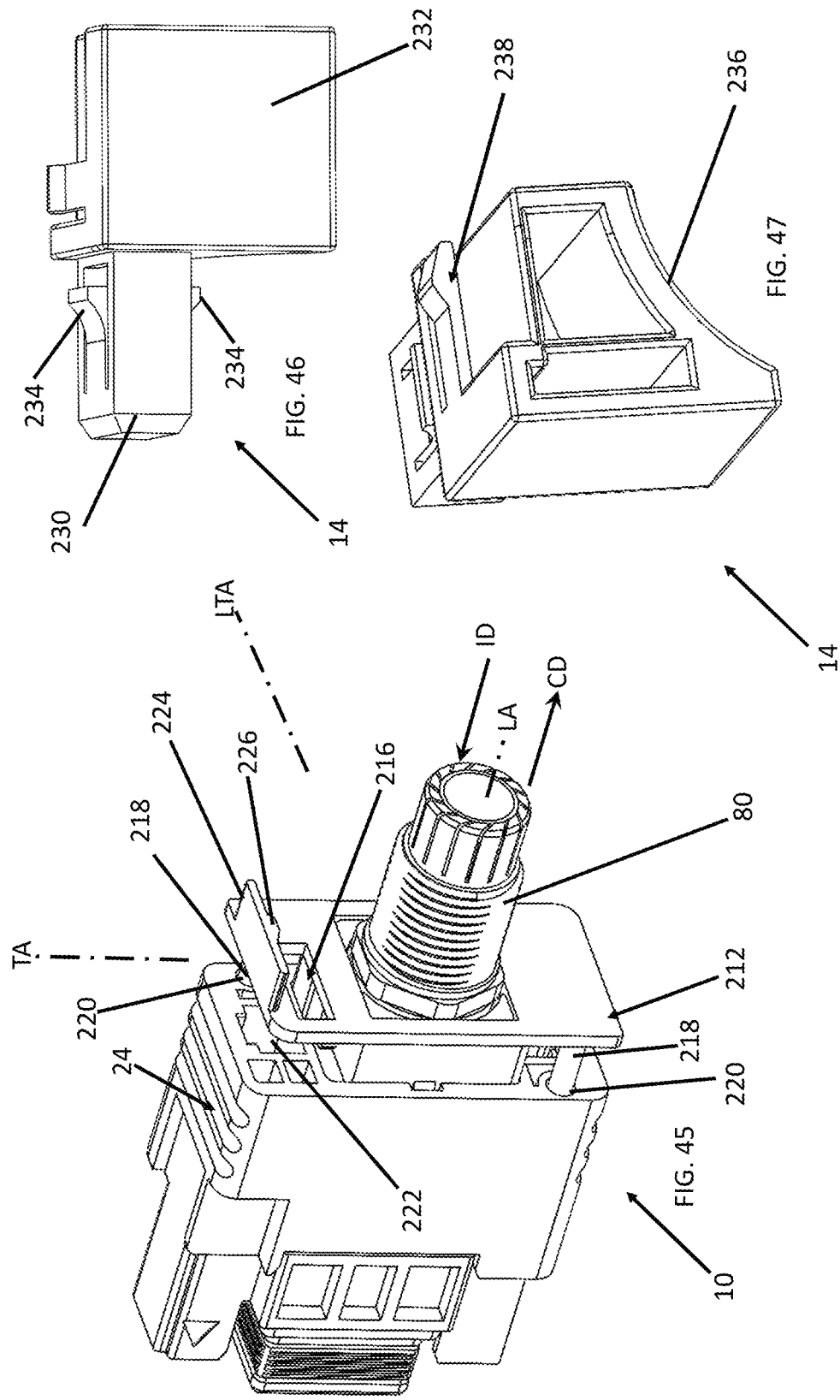

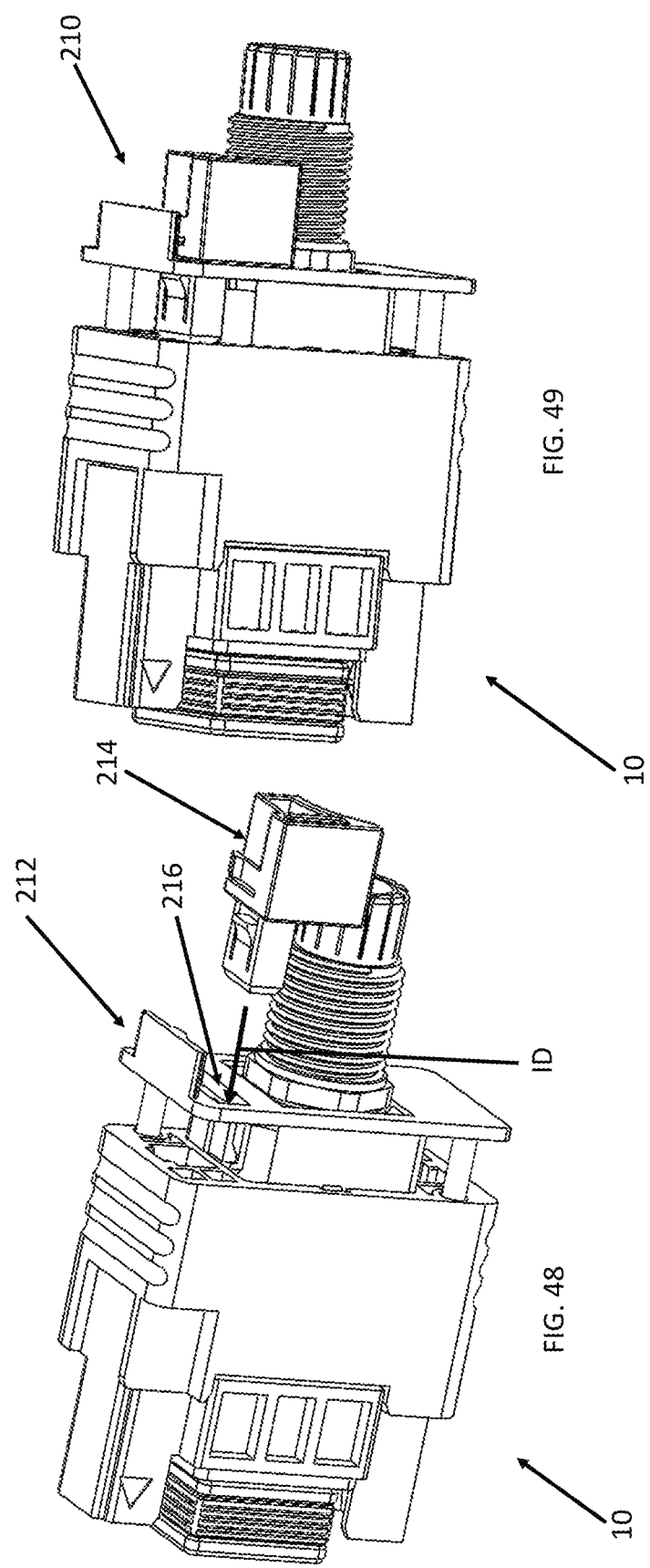

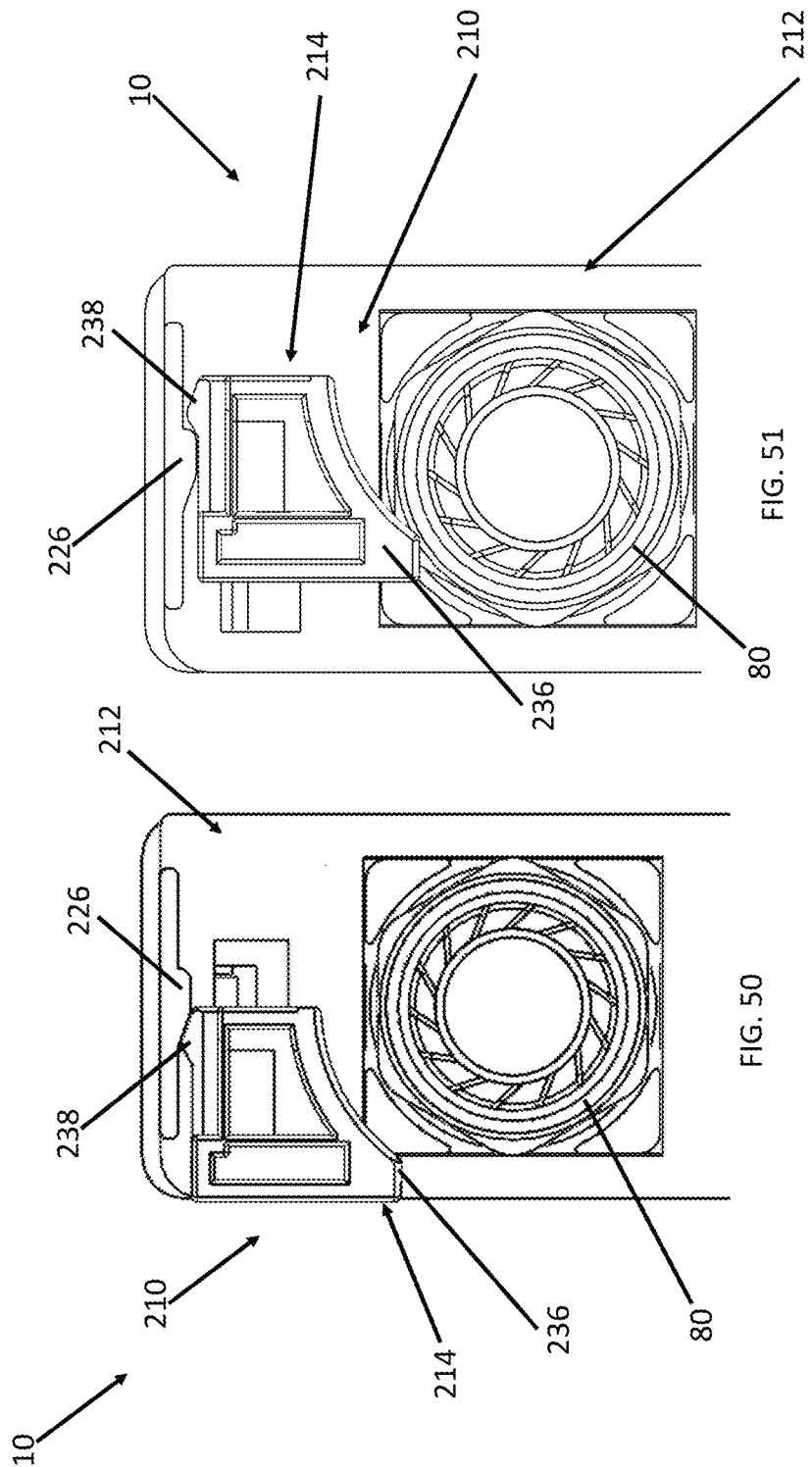

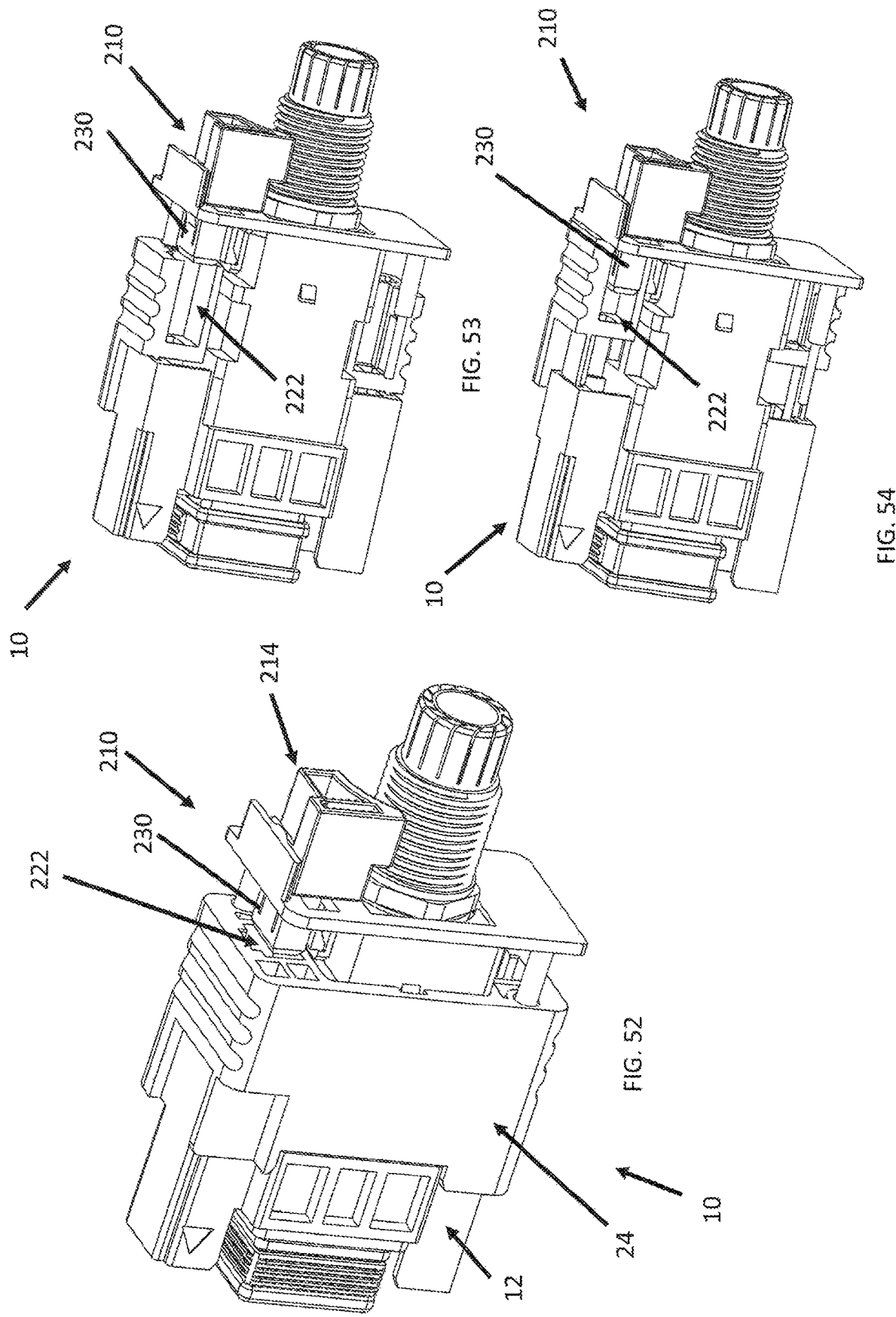

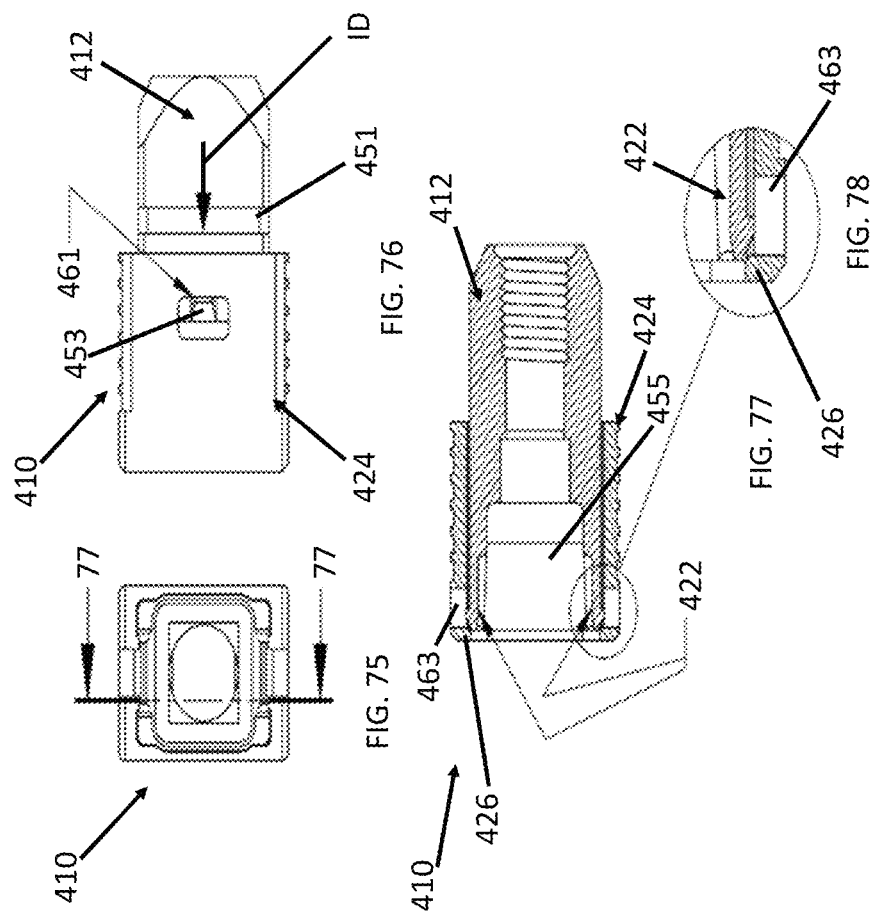

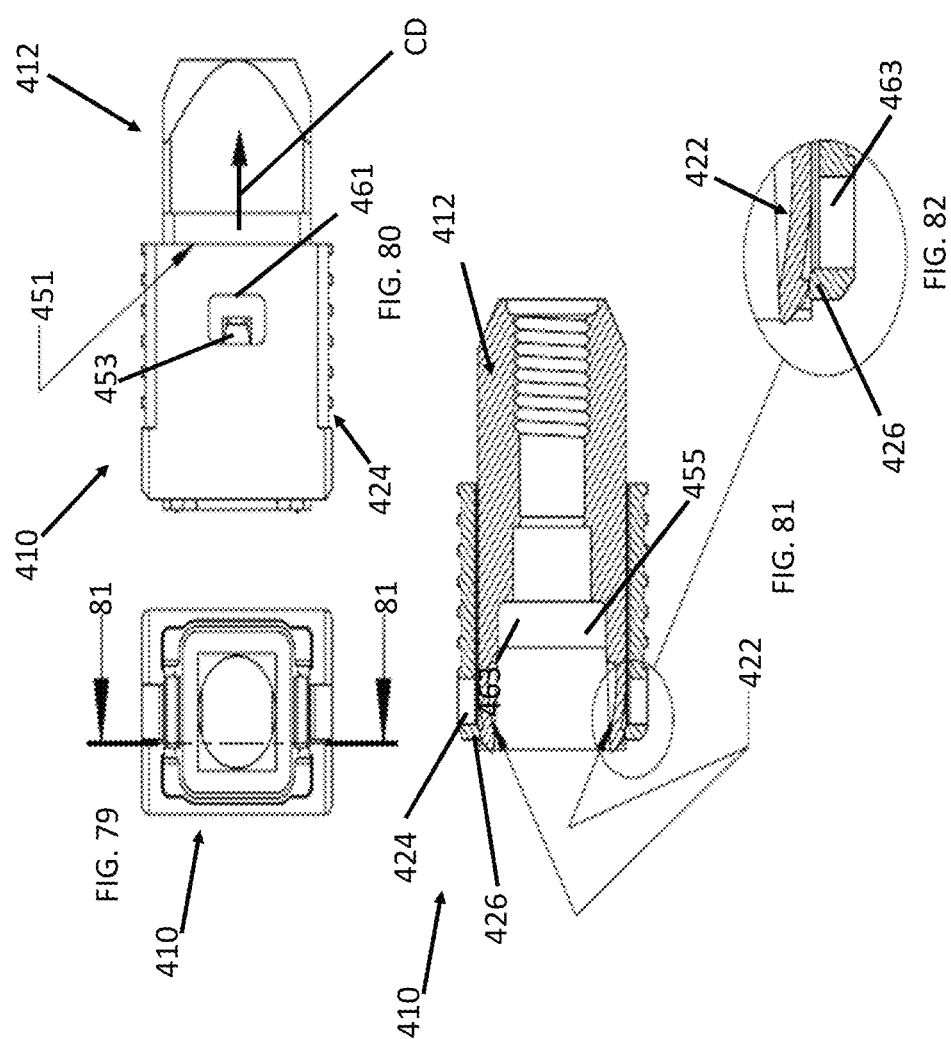

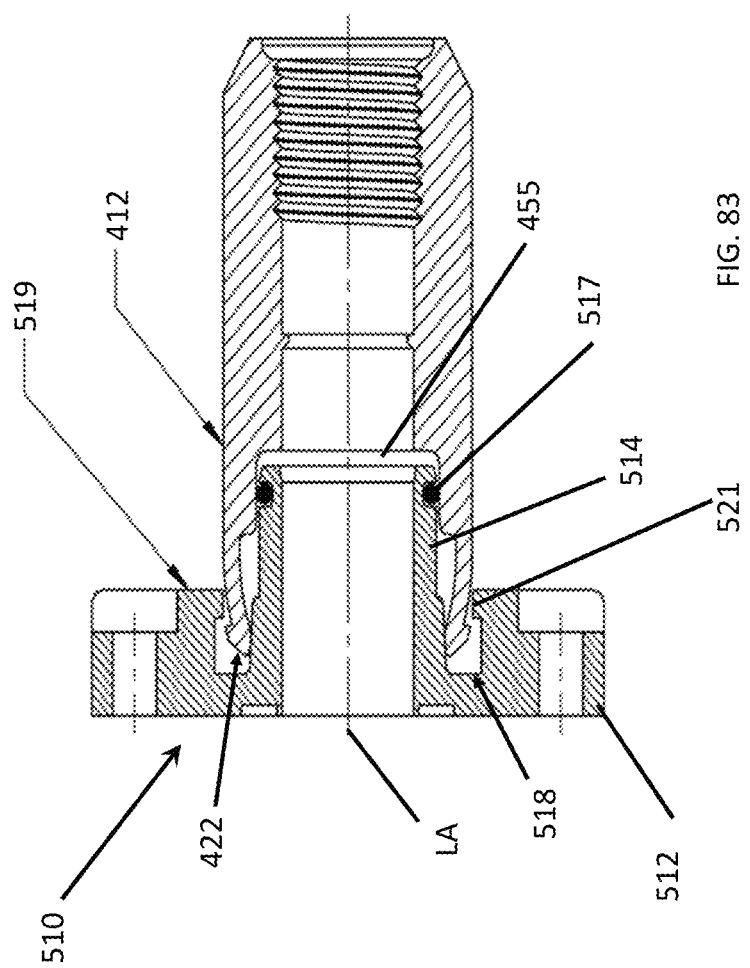

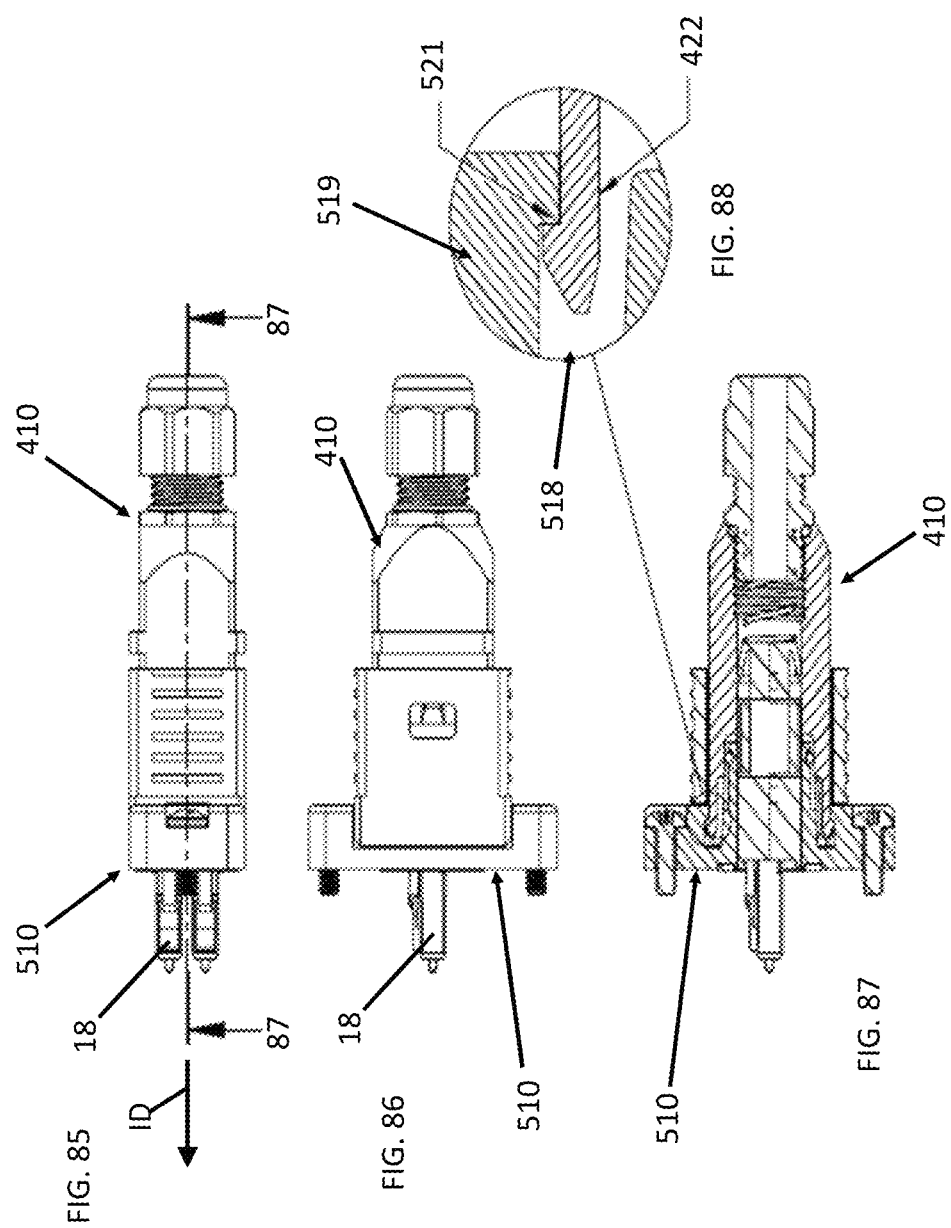

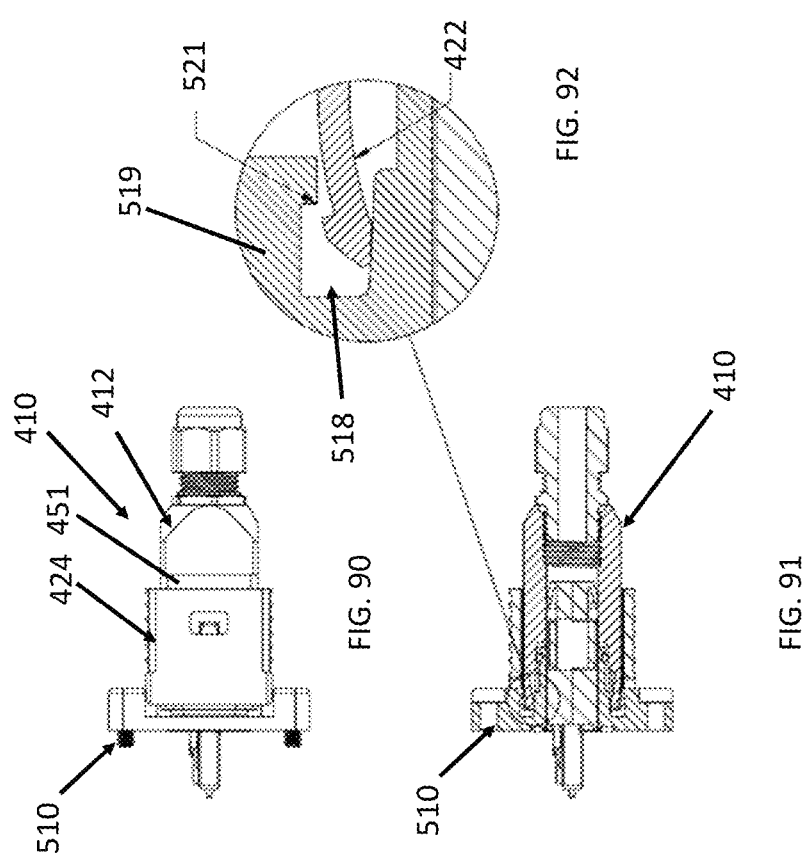

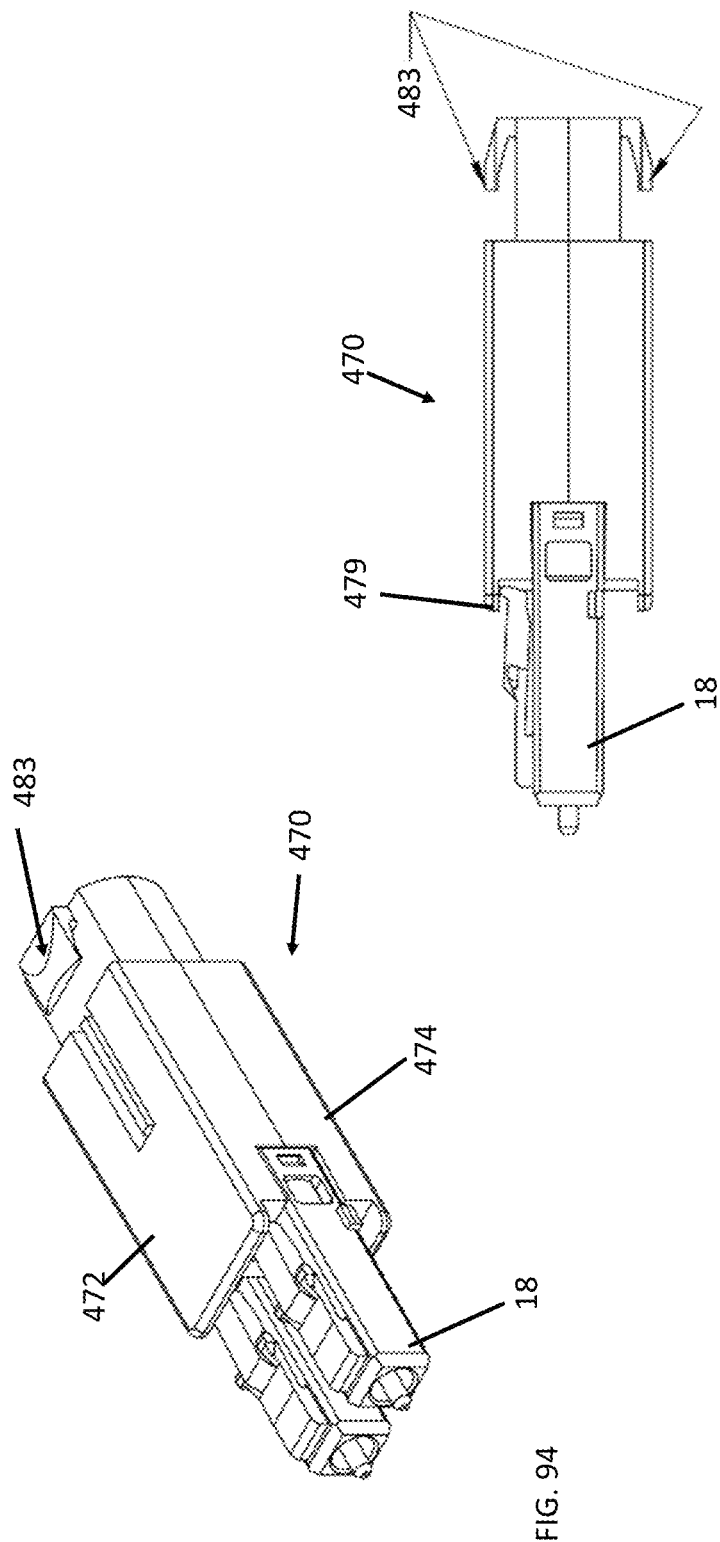

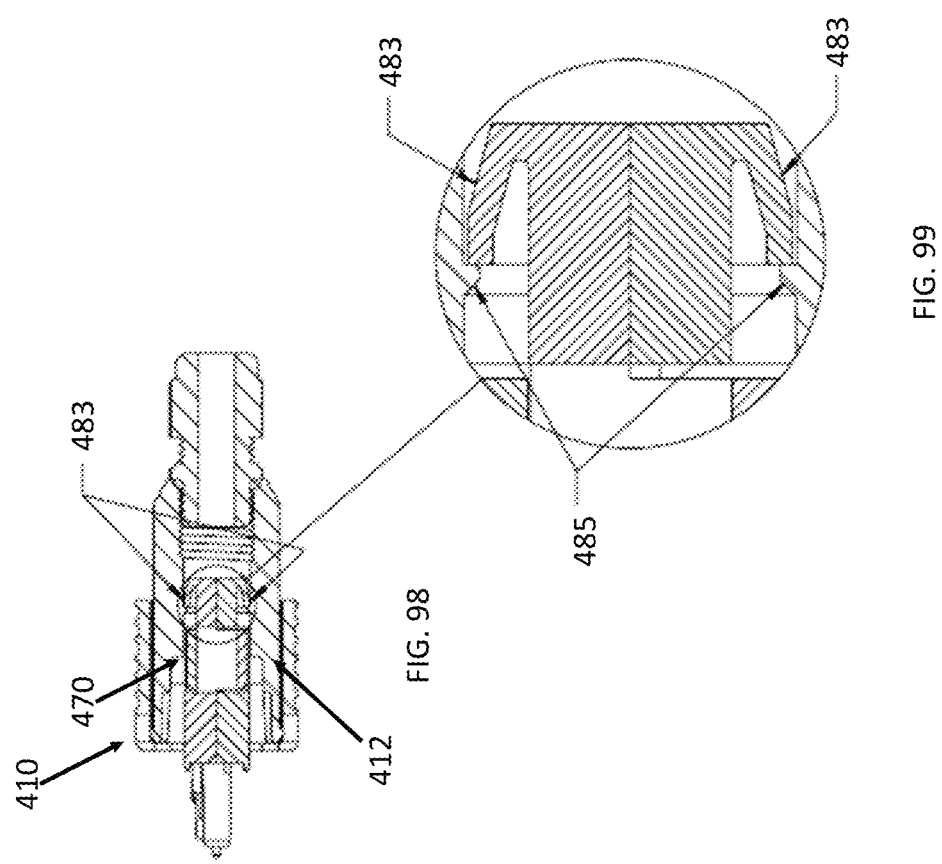

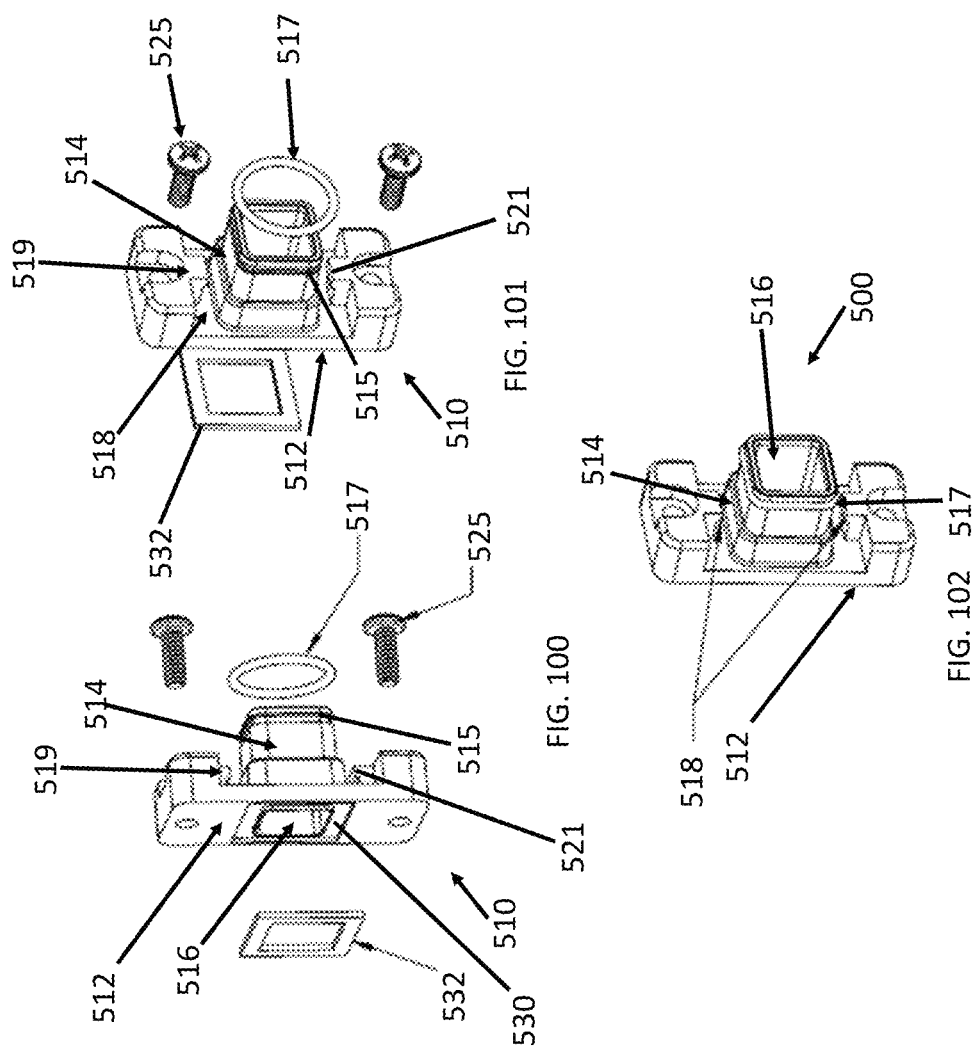

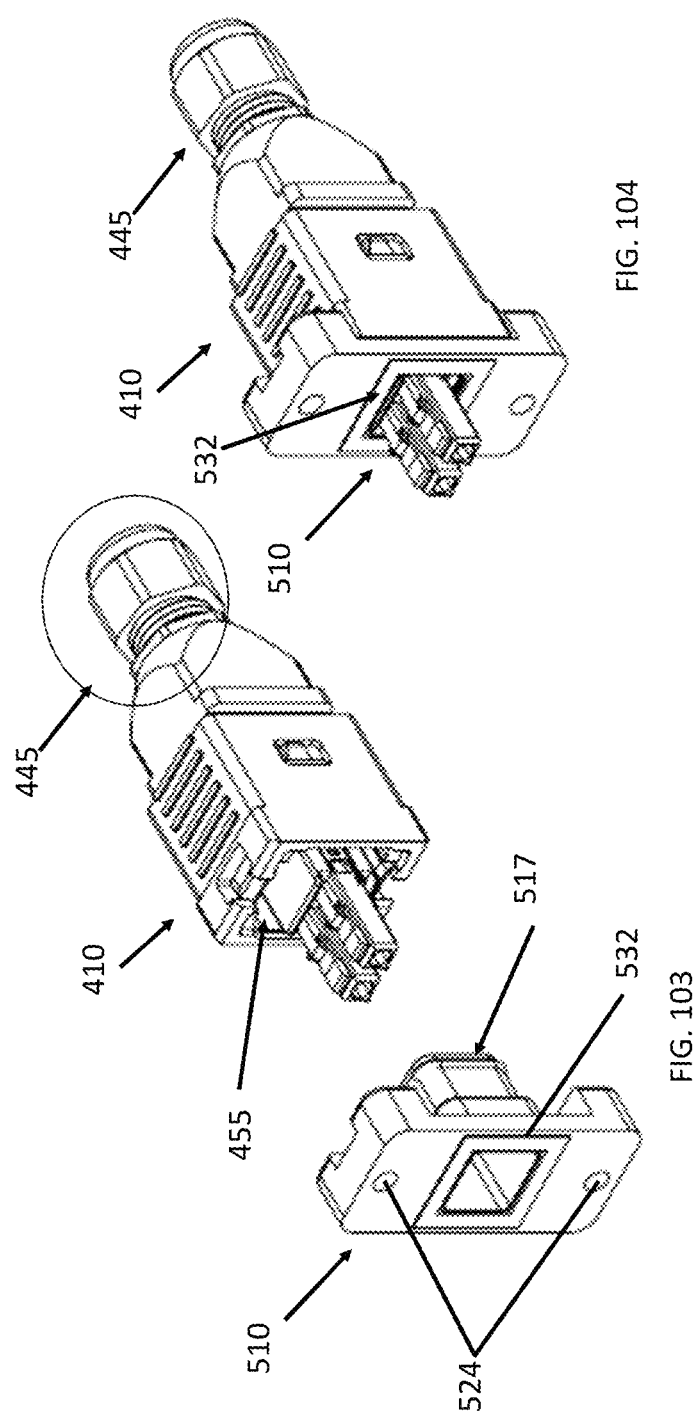

OPTICAL CONNECTION SYSTEM, OPTICAL CONNECTOR, AND OPTICAL ADAPTER FOR USE WITH OPTICAL CABLE ASSEMBLY AND RECEPTACLE

PRIORITY

This application claims the benefit of U.S. Provisional Patent Application No. 62/984,355, filed Mar. 3, 2020, which is hereby incorporated by reference in its entirety.

FIELD

The present disclosure generally relates to an optical connection system, optical connector, and optical adapter for use with an optical cable assembly and receptacle.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds. Fiber optic connectors need to be able to be installed rapidly, while assuring that the connections do not produce undue loss, and do not damage to the connectors.

SUMMARY

In one aspect, an optical connection system is for a receptacle and an optical cable assembly comprising an optical cable terminated by an optical plug configured to mate with the receptacle. The optical connection system comprises an adapter comprising a plug opening and an adapter latch element. The adapter is configured to be supported adjacent to the receptacle such that at least a portion of the optical plug is passable through the plug opening to mate with the receptacle. A connector is configured to releasably couple to the adapter. The connector comprises a connector housing having an adapter interface end portion and a cable end portion. The connector housing defines an interior passage extending longitudinally through the connector housing from the cable end portion through the adapter interface end portion. The adapter interface end portion of the connector housing is configured to mate with the adapter. The connector housing is configured to receive the optical cable assembly in the interior passage such that the optical cable extends from the cable end portion of the connector housing in a cable direction and the optical plug is exposed through the adapter interface end portion in an opposite direction for mating with the receptacle. The connector housing further comprises a connector latch element configured to latch with the adapter latch element to secure the connector to the adapter when the connector housing is mated with the adapter. A delatch actuator is disposed on the connector housing for movement with respect to the connector housing from a locking position to an unlocking position. The delatch actuator comprises a delatch arm. One of the adapter latch element and connector latch element comprises a bendable latch hook and the other of the adapter latch element and connector latch element comprises a locking channel. When the connector housing is mated with the adapter, the delatch arm is configured to: (i) allow the bendable latch hook to latch with the locking channel when the delatch actuator is in the locking position; and (ii) unlatch the bendable latch hook from the locking channel as the delatch actuator moves from the locking position to the unlocking position.

In another aspect, an optical connector configured to latch with an adapter comprises a connector housing having an adapter interface end portion, a cable end portion and an interior passage extending from the adapter interface end portion through the cable end portion. The cable end portion is configured to receive an optical cable. An actuator is disposed on the connector housing for movement relative to the connector housing from a first position to a second position whereby the actuator is configured to unlatch the optical connector from the adapter. An actuator lock comprises a blocking member supported on the connector housing for movement relative to the connector housing between a blocking position and a release position. In the blocking position, the blocking member is configured to block the actuator from moving from the first position the second position. And in the release position, the blocking member is positioned relative to the actuator such that the actuator can move from the first position to the second position without being blocked by the blocking member.

In another aspect, an optical connector configured to releasably couple to an optical adapter comprising an adapter latch element comprises a connector housing having an adapter interface end portion and a cable end portion. The adapter interface end portion of the connector housing is configured to mate with the adapter. The connector housing is configured to receive an optical cable assembly in the interior passage such that an optical cable of the optical cable assembly extends in a cable direction from the cable end portion of the connector housing and an optical plug of the optical cable assembly is exposed in an opposite direction toward the adapter. The connector housing further comprises a connector latch element configured to latch with the adapter latch element to secure the connector to the adapter when the connector housing is mated with the adapter. A delatch actuator is disposed on the connector housing for movement with respect to the connector housing from a locking position to an unlocking position. The delatch actuator comprises a delatch arm. The connector latch element comprises one of a bendable latch hook and a locking channel and the adapter latch element comprises the other of the bendable latch hook and the locking channel. When the connector housing is mated with the adapter, the delatch arm is configured to: (i) allow the bendable latch hook to latch with the locking channel when the delatch actuator is in the locking position; and (ii) unlatch the bendable latch hook from the locking channel as the delatch actuator moves from the locking position to the unlocking position.

In another aspect, an optical adapter configured to releasably couple to an optical connector comprising first and second connector latch elements comprises a panel engagement wall configured to be coupled to a panel in face-to-face relationship therewith when the adapter is mounted on the panel. A fitting extending longitudinally from the panel engagement wall and defining a connector opening therethrough. The panel engagement wall is configured to be positioned on the panel such that the connector opening aligns with an opening in the panel. First and second adapter latch elements extend longitudinally from the panel engagement wall on opposite sides of the fitting. The first and second adapter latch elements each comprise one of a bendable latch hook and a locking channel. The optical adapter is configured such that the bendable latch hooks can latch with the locking channels to retain the optical connector in mated relationship with the optical adapter Other aspects will be in part apparent and in part pointed out hereinafter.

BRIEF DESCRIPTION OF THE DRAWINGS

FIG. 3 is a perspective of a delatch actuator of the connector;

FIG. 4 is perspective of the delatch actuator shown in section;

FIG. 8A is an exploded perspective of a subassembly of the connector including the connector housing and the delatch actuator;

FIG. 8B is a perspective of the subassembly of FIG. 8A with an upper portion of the delatch actuator shown in section and the delatch actuator shown in a locking position;

FIG. 8C is the perspective of FIG. 8B except that the delatch actuator is shown in an unlocking position;

FIG. 9A is a perspective of the subassembly of FIGS. 8A-8C shown in section with the delatch actuator in the unlocking position;

FIG. 9B is a section of the subassembly of FIGS. 8A-8C with the delatch actuator shown in the unlocking position;

FIG. 9C is a section of the subassembly of FIGS. 8A-8C with the delatch actuator shown in the locking position;

FIG. 11A is a perspective of the subassembly of FIG. 11;

FIG. 17 is an exploded perspective of the adapter;

FIG. 18 is a perspective of a variation of the adapter with different panel attachment points than the adapter of FIGS. 14-17;

FIG. 19 is an enlarged, fragmentary perspective of a portion of the optical connection system with the connector mated to the adapter;

FIG. 33 is a perspective of the optical connection system with the connector in the cable pass-through configuration showing a cable assembly being moved relative to the connector toward a receptacle;

FIG. 34 is the perspective of FIG. 33 but showing the cable assembly being mated with a transceiver behind the adapter while the connector remains in generally the same position as in FIG. 33 in relation to the adapter;

FIG. 35 is an elevation of the optical connection system with the connector in the cable pass-through configuration showing the connector and the adapter in section and showing the connector moving along the cable assembly toward the adapter after the cable assembly is mated to the transceiver behind the adapter;

FIG. 36 is the elevation of FIG. 35 but showing the connector in a further advanced position such that connector bends bendable latch hooks of the adapter within locking channels of the connector;

FIG. 37 is the elevation of FIGS. 35 and 36 but showing the connector in a further advanced position at which the bendable latch hooks of the adapter latch with the locking channels of the connector;

FIG. 38 is a fragmentary perspective of the optical connection system in which a cable boot of the connector is shown in section;

FIG. 40 is the elevation of FIGS. 35-37 but showing the connector mated with the adapter and showing the delatch actuator of the connector pulled in the cable direction to a location at which delatch arms of the delatch actuator engage latch hooks of the adapter;

FIG. 41 is the elevation of FIG. 40 but showing the delatch actuator further pulled in the cable direction so that the delatch arms bend the latch hooks and thereby release the latch hooks from the locking channels of the connector;

FIG. 45 is a perspective of the connector with a blocking member of the actuator lock removed;

FIG. 46 is a perspective of the blocking member;

FIG. 47 is another perspective of the blocking member;

FIG. 48 is an exploded perspective of the connector showing the blocking member being installed;

FIG. 49 is a perspective of the connector with the blocking member installed;

FIG. 50 is an enlarged fragmentary cable end elevation of the connector showing the blocking member in a blocking position;

FIG. 51 is the elevation of FIG. 50 but showing the blocking member in a release position;

FIG. 52 is a perspective of the connector showing the blocking member in the release position;

FIG. 53 is another perspective of the connector showing the blocking member in the release position and showing the delatch actuator in section and in the locking position;

FIG. 54 the perspective of FIG. 53 but showing the delatch actuator in the unlocking position;

FIG. 59 is a perspective of the connector showing the blocking member in the blocking position allowing the cable boot to be threadably coupled to the cable gland shaft;

FIG. 60 is another perspective of the connector showing the blocking member in the blocking position allowing the cable boot to be threadably coupled to the cable gland shaft;

FIG. 61 is another perspective of the connector showing the blocking member in the blocking position allowing the cable boot to be threadably coupled to the cable gland shaft;

FIG. 75 is an end elevation of the subassembly of FIG. 74 showing the delatch actuator in a locking position;

FIG. 76 is a side elevation of the subassembly of FIG. 74 showing the delatch actuator in the locking position;

FIG. 77 is a section taken through plane 77-77 of FIG. 75;

FIG. 78 is an enlarged view of a portion of FIG. 77;

FIG. 79 is an end elevation of the subassembly of FIG. 74 showing the delatch actuator in an unlocking position;

FIG. 80 is a side elevation of the subassembly of FIG. 74 showing the delatch actuator in the unlocking position;

FIG. 81 is a section taken through plane 81-81 of FIG. 79;

FIG. 82 is an enlarged view of a portion of FIG. 81;

FIG. 83 is a section of a subassembly of a connection system including an adapter and a connector housing of the connector of FIG. 72 and showing the latch hooks of the connector housing deflected inward;

FIG. 85 is an elevation of the connection system including the adapter of FIG. 83 and the connector of FIG. 72 showing the connector mated and latched with the adapter;

FIG. 86 is another elevation of the connection system of FIG. 85 showing the connector mated and latched with the adapter;

FIG. 87 is a section taken through plane 87-87 of FIG. 85;

FIG. 88 is an enlarged view of a portion of FIG. 87;

FIG. 90 is another elevation of the connection system of FIG. 85 showing the connector mated and unlatched from the adapter;

FIG. 91 is a section taken through plane 91-91 of FIG. 89;

FIG. 92 is an enlarged view of a portion of FIG. 91;

FIG. 94 is a perspective of the subassembly of FIG. 93;

FIG. 95 is an elevation of the subassembly of FIG. 93;

FIG. 98 is a section taken through plane 98-98 of FIG. 96;

FIG. 99 is an enlarged view of a portion of FIG. 98;

FIG. 100 is an exploded perspective of the adapter of the connection system shown in FIGS. 85-92;

FIG. 101 is another exploded perspective of the adapter of FIG. 100;

FIG. 102 is a perspective of the adapter of FIG. 100;

FIG. 103 is a perspective of the connection system of FIGS. 85-92 showing the connector separated from the adapter; and FIG. 104 is a perspective of the connection system similar to FIG. 103 but showing the connector installed in the adapter.

Corresponding reference characters indicate corresponding features throughout the drawings.

DETAILED DESCRIPTION

As will become apparent, the present disclosure generally pertains to optical connection systems for facilitating the connection of an optical cable assembly to an optical receptacle. In an exemplary embodiment, the optical receptacle comprises the receptacle of a transceiver. The optical cable assembly comprises a cable terminated by an optical plug configured to mate with the receptacle. The optical connection system of the present disclosure is configured to partially house or enclose the mated cable assembly and receptacle. In one or more embodiments, the mated cable assembly and receptacle pass through the opening in a panel wall, and the connection system of the present disclosure mounts on the wall in a way that encloses the mated cable assembly and receptacle on a front side of the wall. For example, in one or more embodiments, the optical connection system is configured to seal with the wall and the cable assembly to provide an ingress-protected enclosure around the mated cable assembly and receptacle on the front side of the wall. In general, optical connection systems within the scope of this disclosure can comprise an adapter and a connector configured to releasably couple to the adapter. As will be explained in further detail below, embodiments of the adapter can mount on the wall around an opening formed in the wall through which the mated cable assembly and receptacle pass. Embodiments of connectors are configured to connect to the cable assembly and releasably couple to the adapter supported on the wall.

Figure 1:
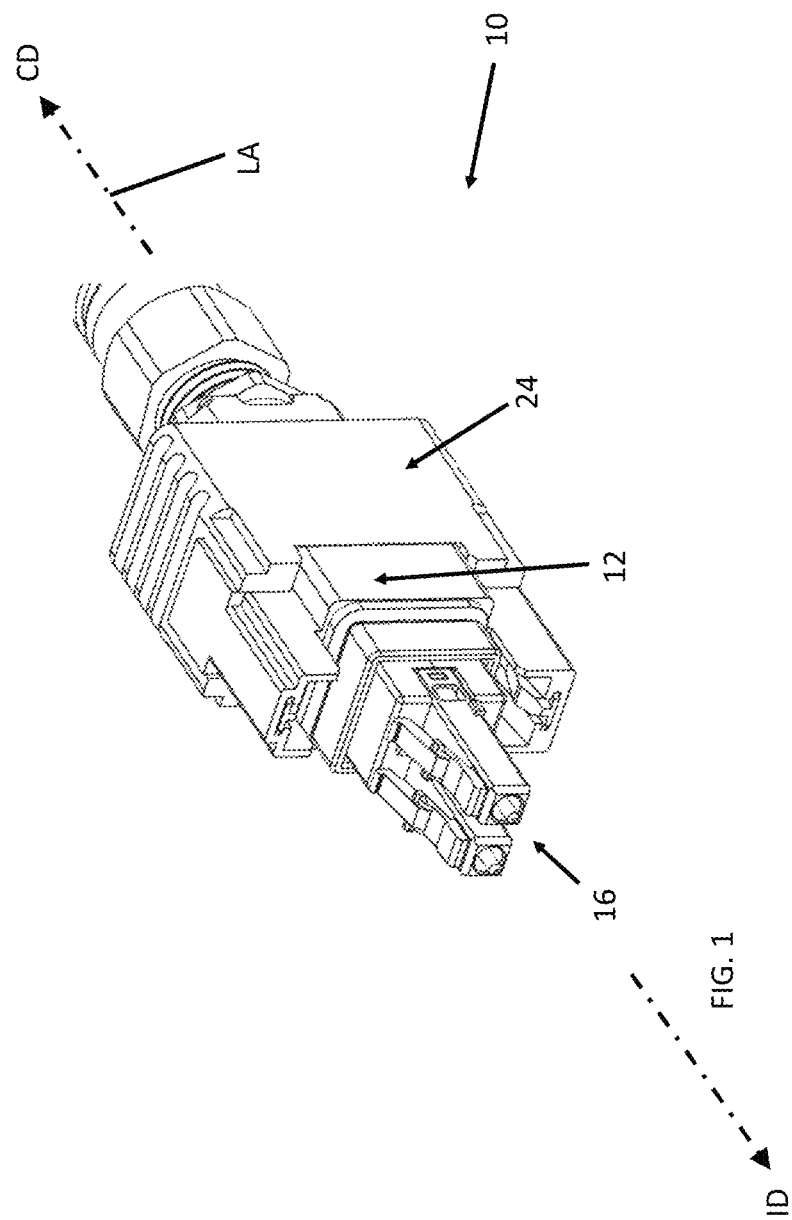
FIG. 1 is a perspective of a connector of an optical connection system.
Figure 2:
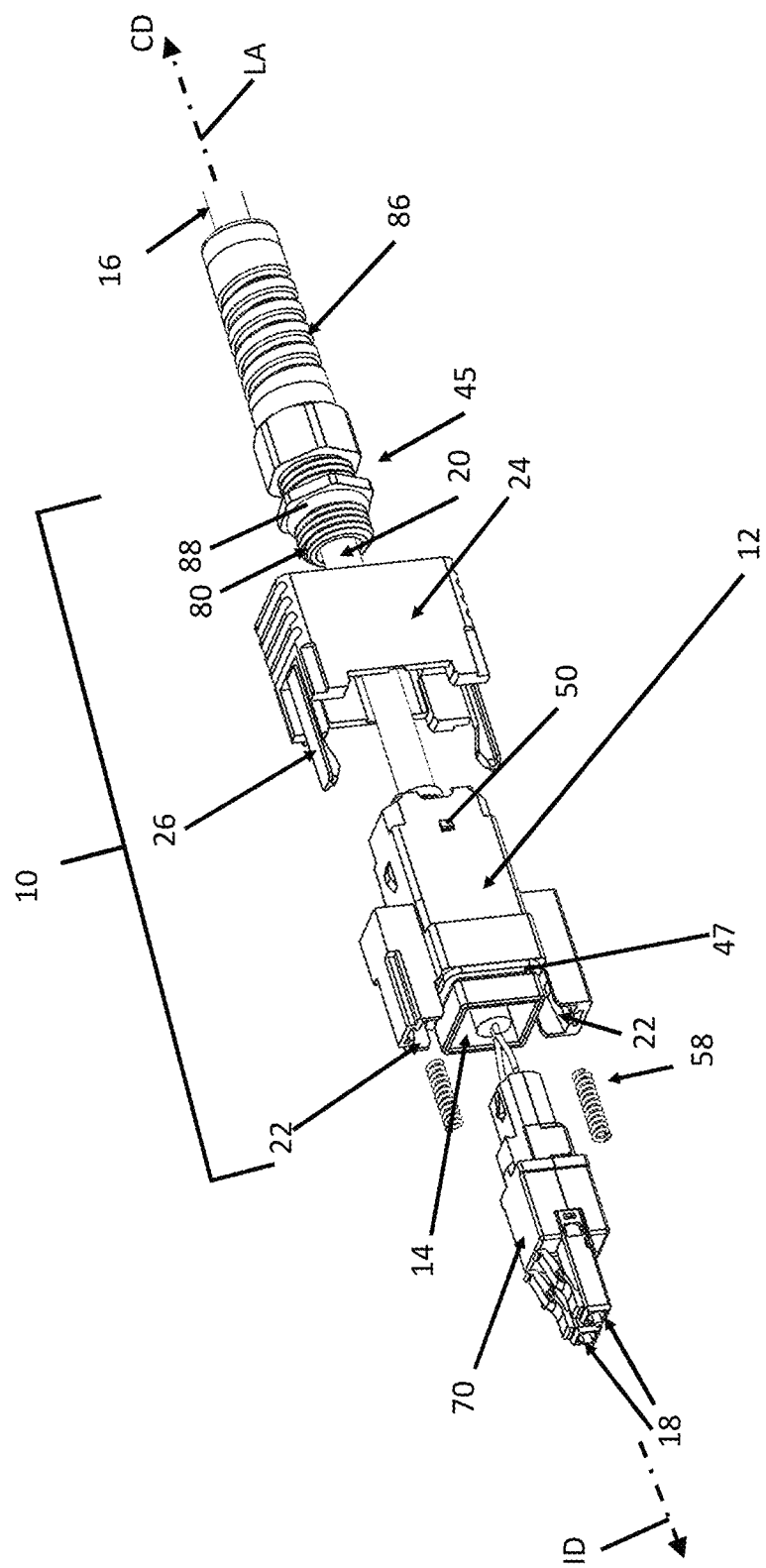
FIG. 2 is an exploded perspective of the connector.

Referring to FIGS. 1 and 2, an exemplary embodiment of connector of an optical connection system of the type described above is generally indicated at reference number 10. The connector broadly comprises a connector housing 12 having an adapter interface end portion and an opposite cable end portion spaced apart along a longitudinal axis LA. The cable end portion of the connector housing 12 is spaced apart from the adapter interface end portion in a cable direction CD. The adapter interface end portion of the connector housing 12 is spaced apart from the cable end portion in a connector insertion direction ID (broadly, a longitudinal direction opposite the cable direction).

The connector housing 12 defines an interior passage 14 that extends longitudinally through the connector housing from the cable end portion through the adapter interface end portion. The adapter interface end portion of the connector housing 12 is configured to mate with an adapter of the connection system (discussed below). The connector housing 12 is configured to receive an optical cable assembly 16 in the interior passage 14. The illustrated optical cable assembly 16 comprises duplex LC plugs 18 and an optical cable 20 that extends from the duplex LC plugs in the cable direction CD. Other optical cable assemblies can have other numbers and/or types of plugs. As shown in FIG. 1, the optical cable assembly 16 is received in the passage 14 such that the optical cable 20 extends from the cable end portion of the connector housing 12 in the cable direction CD and the optical plugs 18 are exposed in the insertion direction ID for mating with the optical receptacle (discussed below). As will be described in greater detail below, the connector housing 12 comprises a connector latch element 22 configured to latch with an adapter latch element to secure the connector 10 to the adapter when the connector housing is mated with the adapter.

The connector 10 further comprises a delatch actuator 24 disposed on the connector housing 12 for movement with respect to the connector housing in the cable direction CD from a locking position to an unlocking position. The delatch actuator 24 comprises at least one delatch arm 26. As discussed below, each delatch arm 26 is broadly configured for unlatching the connector latch element 22 from a corresponding adapter latch element.

Referring to FIGS. 3 and 4, in the illustrated embodiment, the delatch actuator 24 comprises a sleeve 28 and first and second delatch arms 26 extending from the sleeve in the insertion direction ID. The sleeve 28 is generally configured to fit around the perimeter of a cable end portion of the connector housing 12. The sleeve has a leading adapter interface end portion and a trailing cable end portion spaced apart along the longitudinal axis LA. The leading adapter interface end portion of the sleeve 28 is configured to engage an opposing surface of the connector housing 12 to hold the delatch actuator 24 on the housing in the insertion direction ID. The illustrated sleeve 28 is generally rectangular, comprising opposite upper, and lower walls and opposite left and right side walls as shown in the drawings. (Throughout this disclosure terms of relative position such as upper, lower, left, and right refer to the features of the embodiments as shown in the drawings. It is to be understood that the relative positions can change during use). Each of the upper and lower walls comprises a wing recess 30. The arms 26 extend in the insertion direction ID from the wing recesses 30. Each of the upper and lower walls also comprises a resiliently bendable detent latch 32 that is configured to latch with a respective portion of the connector housing 12, as described more fully below. Each of the left and right side walls of the sleeve 28 further comprises a longitudinal channel 33 and a stop 34 formed in the longitudinal channel. The stop 34 has a leading ramp surface and a trailing stop surface. The stop surface is configured to engage a portion of the connector housing 12 to retain the delatch actuator 24 on the connector housing. The exterior of the illustrated sleeve 28 is ribbed to enhance a user's grip of the delatch actuator during use.

Each delatch arm 26 has a T-shaped cross sectional shape, including an outer section that extends widthwise along a lateral axis LTA (FIG. 3) and an inner section that extends inward heightwise along a transverse axis TA (FIG. 4) from the outer section. The outer section is radially outward of the inner section in relation to the longitudinal axis LA. Each inner section includes a ramped portion at the leading end. The ramped portion includes a leading chamfer 36 and a trailing wedge surface 38. The wedge surface has a transverse dimension TD1 along the transverse axis TA. The illustrated wedge surfaces 38 are sloped to face radially inward with respect to the longitudinal axis LA and to face longitudinally in the cable direction CD. As will be explained in further detail below, the wedge surfaces 38 are configured to bend the bendable latch hooks of an adapter inward toward one another as the delatch actuator 24 moves relative to the connector housing 12.

Figure 6:
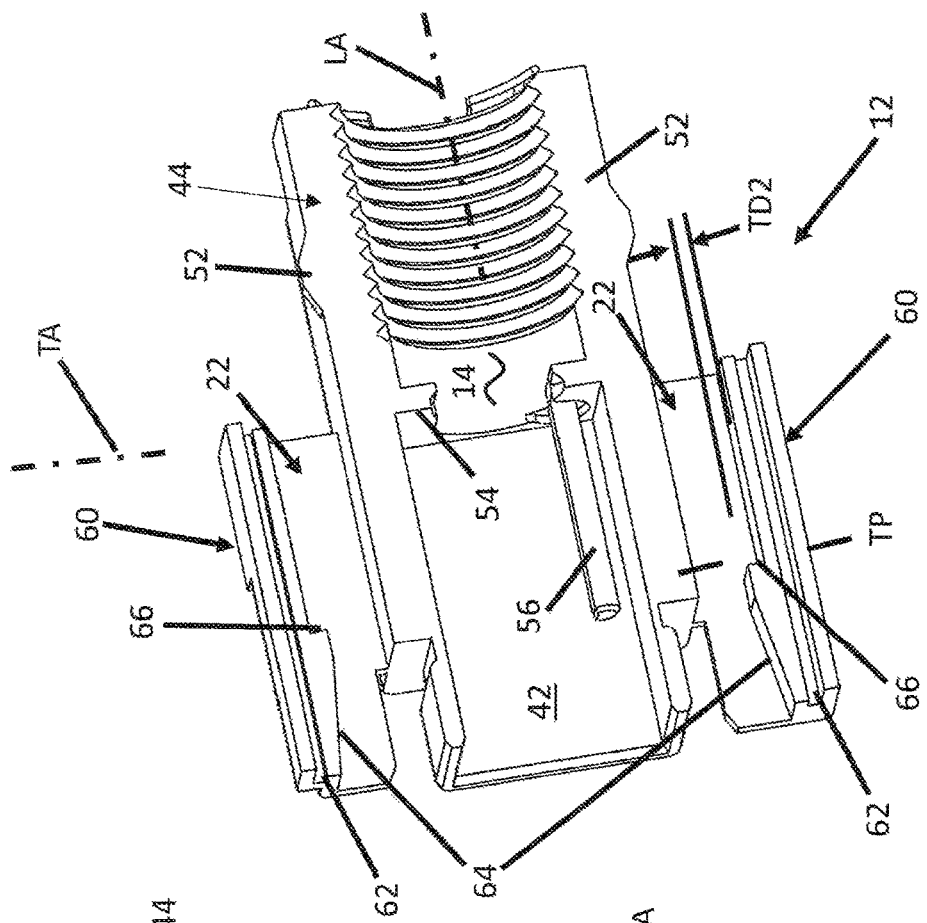
FIG. 6 is a perspective of the connector housing shown in section.
Figure 5:
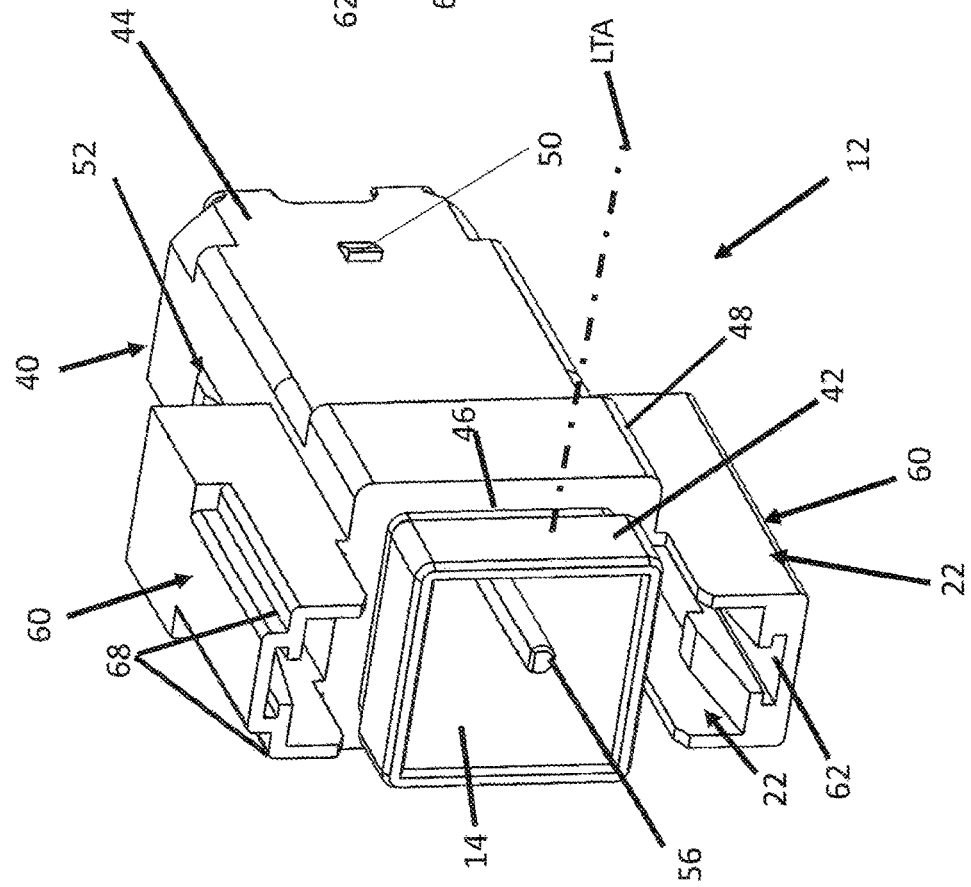
FIG. 5 is a perspective of a connector housing of the connector.

Referring to FIGS. 5 and 6, the connector housing 12 comprises a central enclosure 40 which defines the interior passage 14. The central enclosure 40 includes an adapter interface portion 42 and a cable interface portion 44. In the illustrated embodiment, the cable interface portion is internally threaded for connecting to a threaded cable gland assembly 45 (FIG. 2; broadly, a cable seal) that is configured to seal an interface between the cable end portion of the central enclosure and the optical cable 20. In the illustrated embodiment, the central enclosure 40 comprises a generally rectangular wall comprising opposite upper and lower walls spaced apart along the transverse axis TA and opposite left and right walls spaced apart along the lateral axis LTA.

The central enclosure 40 includes a seal retention groove 46 around the perimeter of the central enclosure at the inboard or trailing end of the adapter interface portion. As shown in FIG. 2, the seal retention groove 46 is configured to seat a resiliently compressible seal 47 therein such that the seal extends 360 degrees around the perimeter of the adapter interface portion 42.

The central enclosure 40 comprises a stop flange 48 that extends laterally outward along the lateral axis LT. The stop flange 48 is located immediately adjacent the seal retention groove 46 in the cable direction CD. The stop flange 48 is configured to engage the leading end portion of the sleeve 28 of the delatch actuator 24 to prevent the delatch actuator from being displaced in the insertion direction ID off of the connector housing 12.

A stop 50 is formed as a protrusion on each of the left and right walls. The stop 50 has a ramp surface facing in the cable direction surface CD and a stop surface facing in the insertion direction ID. The stop surface is configured to engage the opposing stop surface of a corresponding stop 34 of the delatch actuator 24 to stop the delatch actuator from being displaced off of the cable end of the connector housing 12 during use.

The illustrated central enclosure 40 further comprises detent protrusions 52 on the upper and lower walls. The detent protrusions 52 (broadly, protrusions) are configured so that the detent latches 32 of the delatch actuator 24 (FIG. 4) snap over the detent protrusions as the delatch actuator moves between the locking and unlocking positions.

Figure 7:
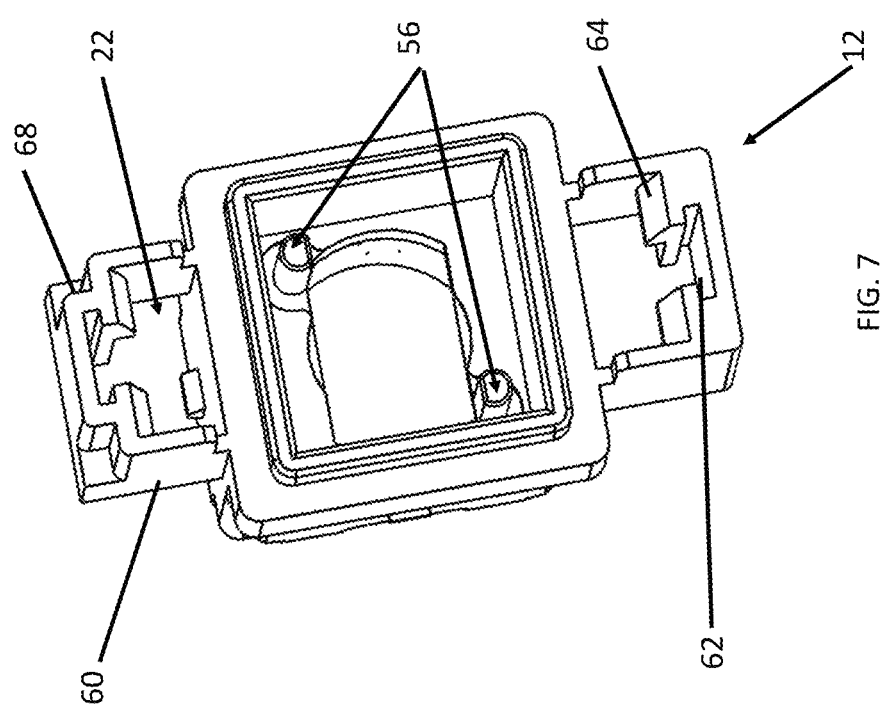
FIG. 7 is another perspective of the connector housing.

As shown in FIG. 6, in the interior passage 14, the central enclosure 40 comprises a transverse wall 54 that is configured to support the cable assembly 16. As shown in FIGS. 5-7, a pair of spring holding pins 56 extend longitudinally in the insertion direction ID from the transverse wall 54. Springs 58 (FIG. 2) for yieldably biasing the cable assembly 16 in the insertion direction ID are disposed on the spring holding pins 56 during use.

In the illustrated embodiment, the connector latch element 22 comprises a locking channel. More particularly, the housing 12 comprises upper and lower locking channels 22 (broadly, first and second locking channels) on opposite sides of the central enclosure 40. The upper and lower locking channels 22 are spaced apart along the transverse axis TA. In the illustrated embodiment, each locking channel 22 is defined between a respective upper or lower wall of the central enclosure 40 and a three-sided wing 60 disposed on the wall. Each three-sided wing 60 comprises left and right wall portions spaced apart along the lateral axis LTA and an overhanging wall portion extending laterally between the left and right wall portions. In the illustrated embodiment the overhanging wall portion of each three-sided wing 60 defines a T-shaped groove 62 of the channel 22. Each T-shaped groove 62 is configured to slidably receive a respective one of the T-shaped delatch arms. In other words, the illustrated connector 10 comprises an upper delatch arm 26 slidably received in the upper locking channel 22 and a lower delatch arm slidably received in the lower locking channel. Each locking channel 22 comprises an adapter interface end portion and a cable end portion spaced apart along the longitudinal axis LA.

The overhanging wall portion includes a hook on each side of the T-shaped groove 62. Each hook includes a leading ramp surface 64 and a trailing locking surface 66. The trailing locking surface is longitudinally spaced apart between the adapter interface end portion and the cable end portion of the respective locking channel 22. The locking surface 66 faces in the cable direction CD and has a transverse dimension TD2 along a transverse axis TA that is less than the transverse dimension TD1. Conversely, the transverse dimension TD1 is greater than the transverse dimension TD2. The locking surface 66 extends generally in a plane TP, e.g., a plane generally parallel to the transverse-axis-TA-lateral-axis-LTA plane and generally perpendicular to the longitudinal axis LA.

In the illustrated embodiment, the upper three-sided wing 60 includes a keying feature 68 (e.g., first and second longitudinal keyways) and the lower three-sided wing lacks the keying feature. This prevents the connector 10 from being mated to an adapter in an inverted orientation.

Referring to FIGS. 8A-8C, the connector 10 can be assembled by moving the delatch actuator 24 onto the cable end portion of the central enclosure 40 of the connector housing 12. The delatch arms 26 will slide into the locking channels 22, and the stops 50 will slide along the longitudinal channels 33 until they pass across the opposing stops 34. As shown in FIG. 8B, the stop flange 48 provides an insertion-direction stop that engages the leading end portion of the delatch actuator sleeve 28 to limit longitudinal displacement of the delatch actuator in the insertion direction ID. As shown in FIG. 8C, the opposing ends of the stops 34, 50 engage one another to limit longitudinal displacement of the delatch actuator in the cable direction CD. Thus, the delatch actuator 24 is retained on the connector housing 12.

Referring to FIGS. 9A-9C, the delatch actuator 24 is disposed on the connector housing 12 for movement with respect to the connector housing from a locking position (FIG. 9C) to an unlocking position (FIG. 9B). In the illustrated embodiment, the detent latch 32 resiliently deflects to clear the detent protrusion 52 as the delatch actuator 24 moves between the locking position and the unlocking position. Thus, the detent latch 32 and the detent protrusion 52 provide a detent mechanism that holds the delatch actuator 24 in the locking and unlocking positions. When the delatch actuator 24 is in the locking position (FIG. 9B), the wedge surfaces 38 of the delatch arms 26 are longitudinally spaced apart from the plane TP in the insertion direction ID. The wedge surfaces 38 cross the plane TP as the delatch actuator 24 moves from the locking position to the unlocking position. As explained more fully below, as the wedge surfaces 38 cross the plane TP, they are configured to unlatch the connector 10 from a mating adapter.

Figure 10:
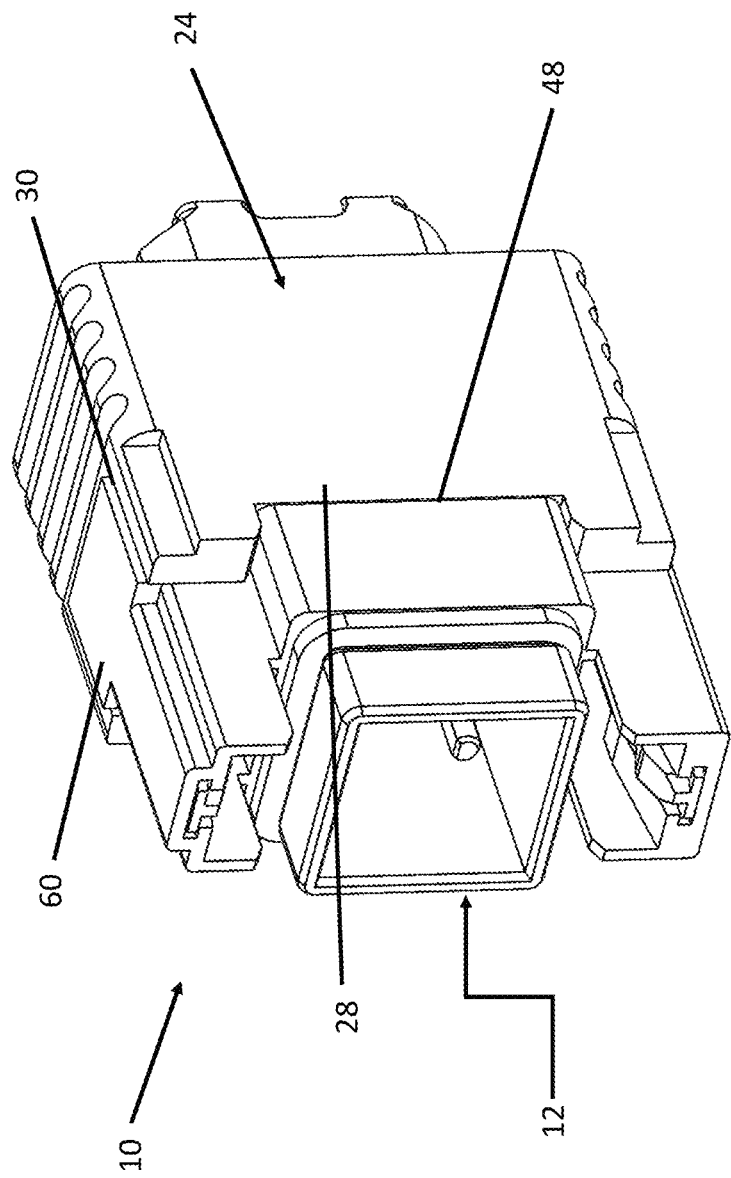
FIG. 10 is a perspective of the subassembly of FIGS. 8A-8C.

Referring to FIG. 10, the connector 10 is shown with the delatch actuator 24 in the locking position. As can be seen, in this position the end portions of the three-sided wings 60 are received in the wing recesses 30 of the top and bottom walls of the sleeve 28. In addition, the leading end of the sleeve 28 engages the stop flange 48 as explained above.

Figure 11:
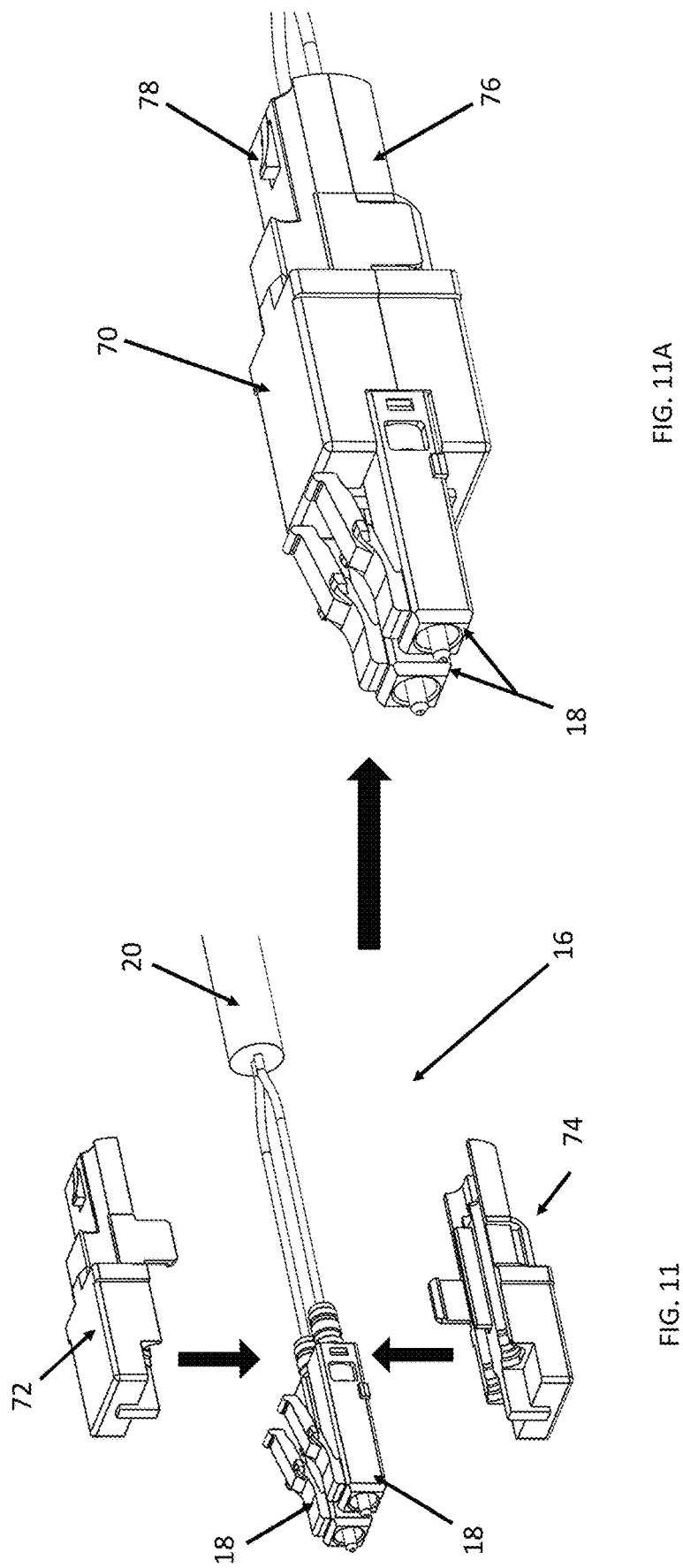
FIG. 11 is an exploded perspective of a subassembly of the connector including optical plugs and a plug retention body.

Referring to FIGS. 11 and 11A, in the illustrated embodiment the cable assembly 16 comprises a pair of LC plugs 18 that are secured inside a plug retention body 70. The illustrated plug retention body 70 has a clamshell configuration. More particularly, the plug retention body 70 comprises an upper body part 72 and a lower body part 74 that are configured to secure together by snap-fit connection such that the plugs 18 are retained between the upper and lower body parts. In certain embodiments, a gasket or other seal element is provided to seal the interface between the plug frames 18 and the plug retention body 70. The plugs 18 extend in the insertion direction ID from the plug retention body 70. The plug retention body 70 comprises a back post portion 76 that includes a bendable latch hook 78.

Figure 12:
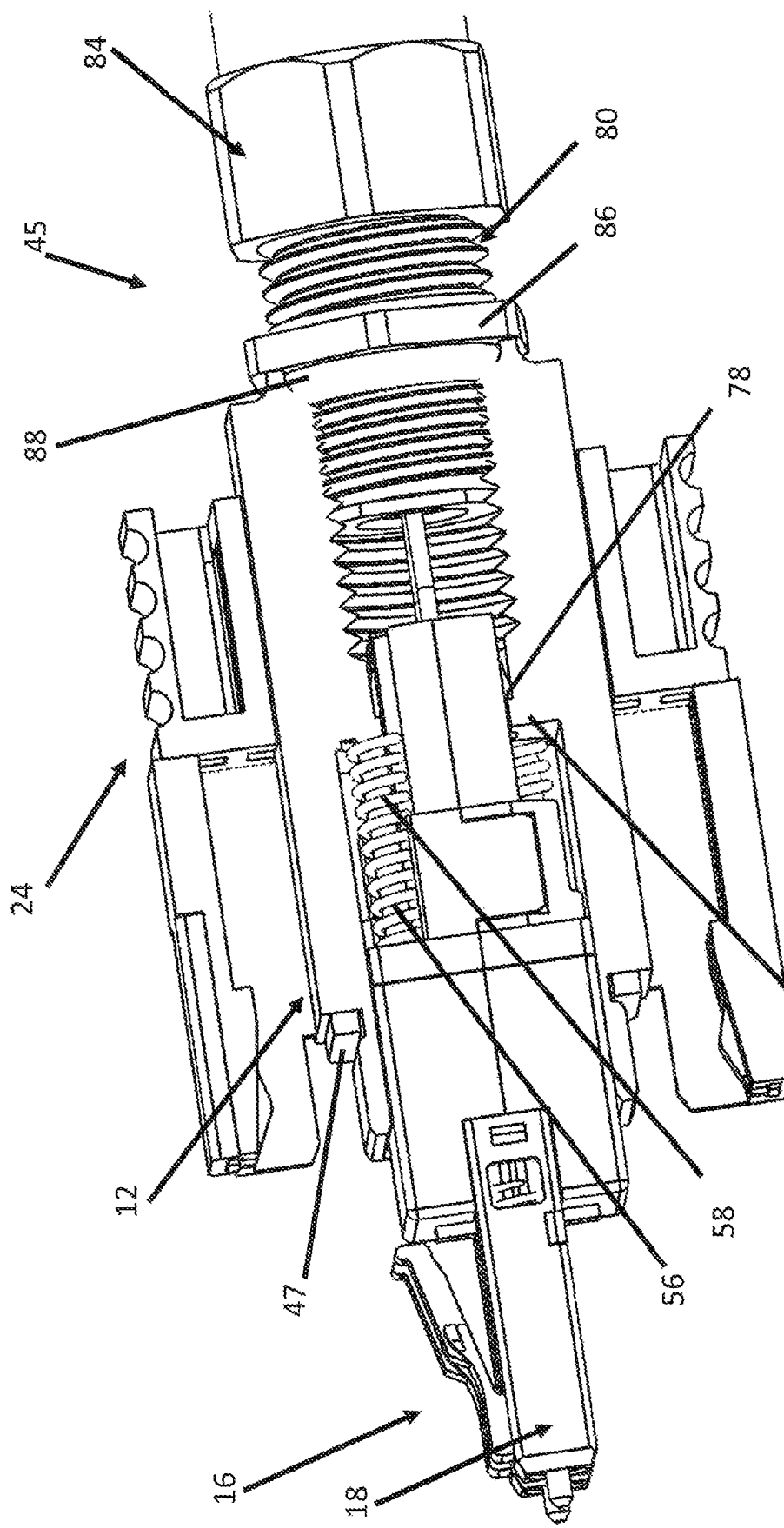
FIG. 12 is a perspective of the connector shown in section.
Figure 13:
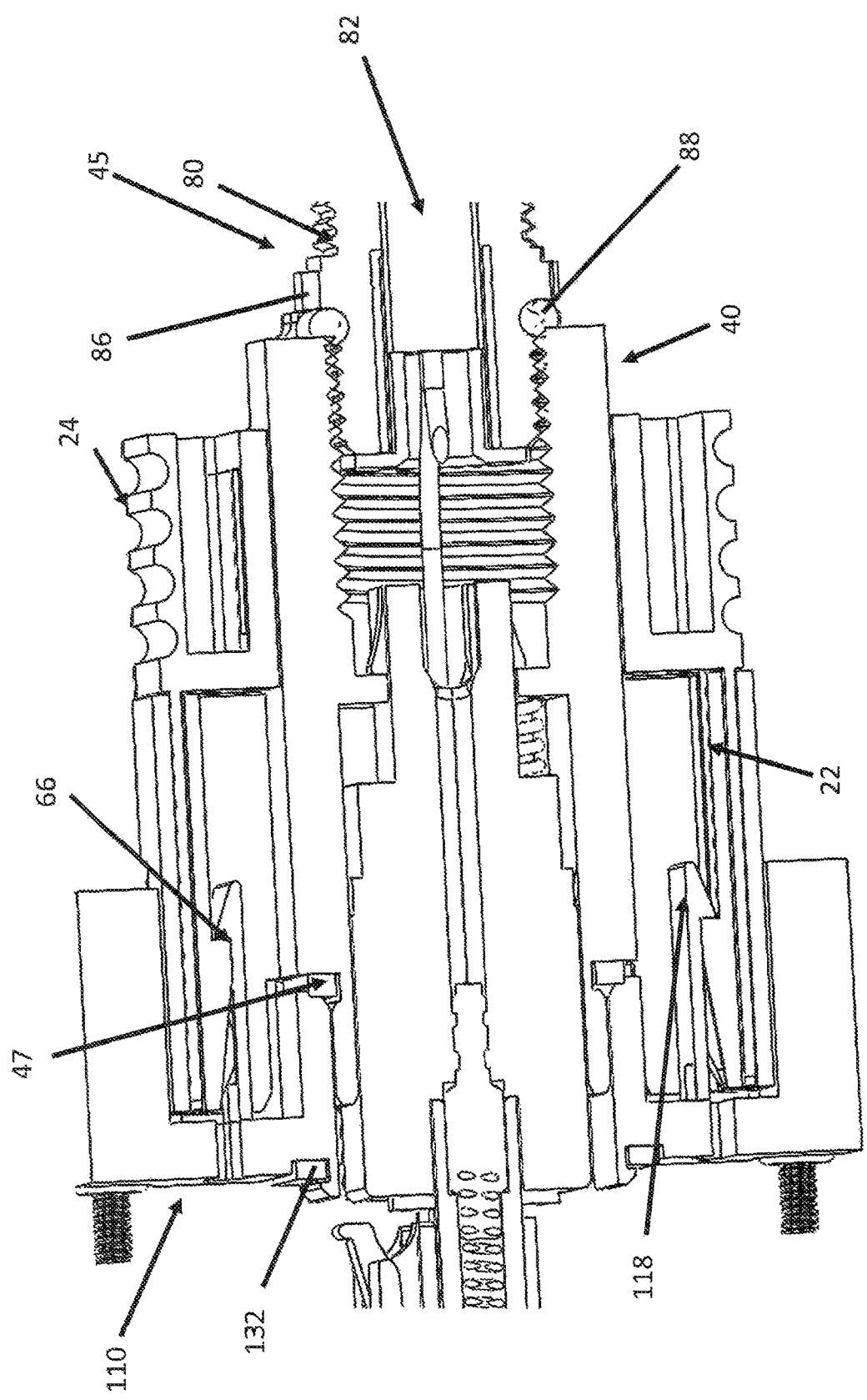
FIG. 13 is a section of the connector mated with an adapter of the optical connection system.
Figure 14:
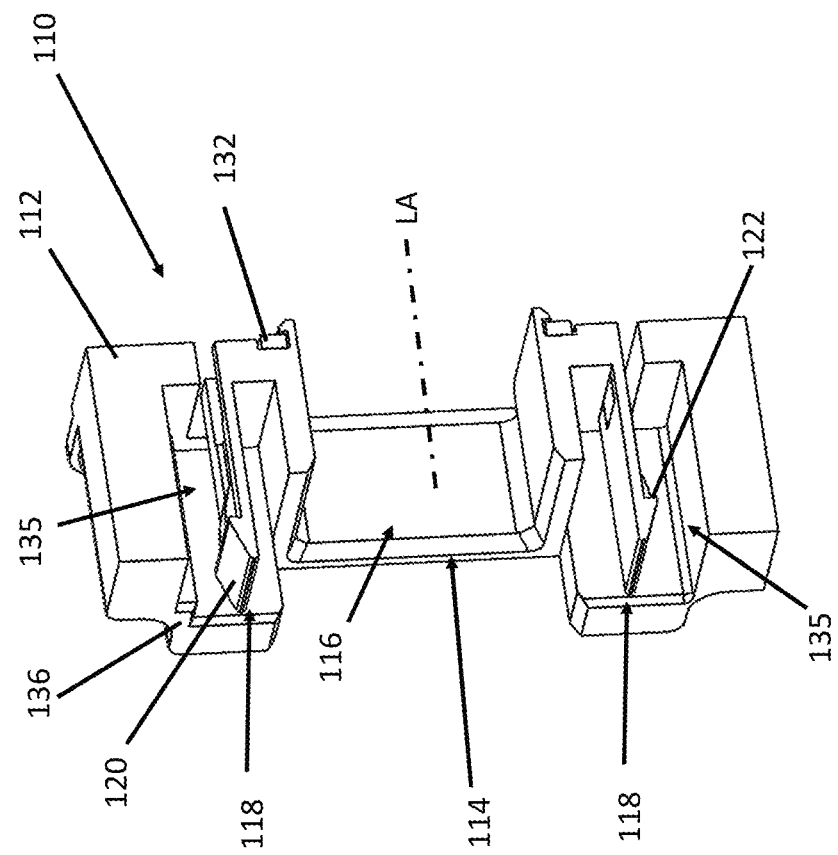
FIG. 14 is a perspective in section of the adapter of the optical connection system.
Figure 16:
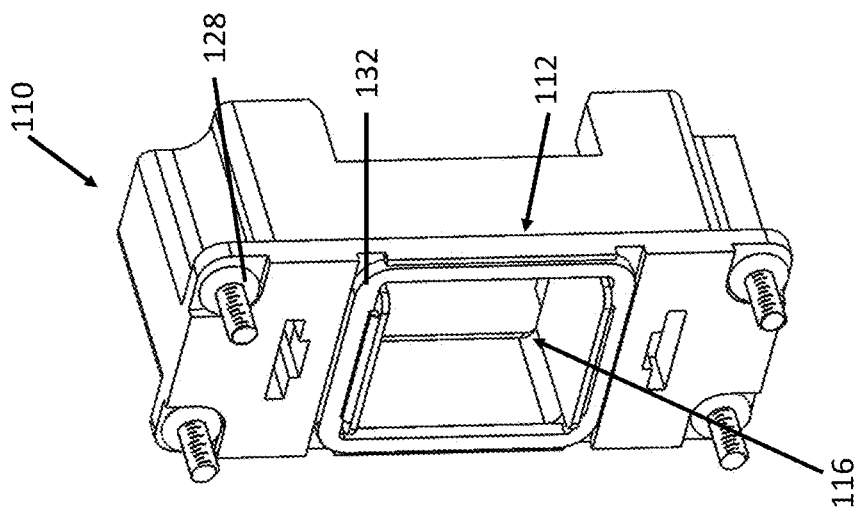
FIG. 16 is another perspective of the adapter
Figure 15:
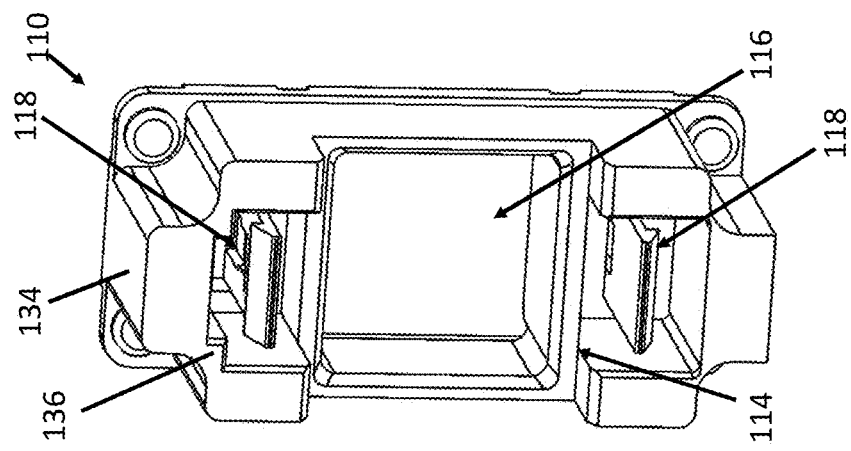
FIG. 15 is a perspective of the adapter.

Referring to FIGS. 12 and 13, in the illustrated embodiment, the connector 10 is configured to hold the cable assembly 16 in the interior passage 14. More particularly, the plug retention body 70 is configured to be inserted into the interior passage 14 such that the back post portion 76 is received in a central opening formed in the transverse wall 54. The bendable hooks 78 are deflected inward as they cross the transverse wall 54 and resiliently rebound outward to retain the plug retention body 70 on the transverse wall of the connector housing 12. The springs 58 disposed on the spring holding pins 56 are resiliently compressed between the transverse wall 54 and the plug retention body 70. Thus the springs 58 yieldably bias the cable assembly 16 in the insertion direction relative to the connector 10.

Referring to FIG. 13 in the illustrated embodiment, the cable gland assembly comprises a gland shaft 80 that is configured to be releasably connected to the cable end portion of the connector housing (e.g., by threaded connection). A sealing gland 82 is received in a cable end portion of the illustrated gland shaft 80. The cable end portion of the gland shaft (see FIG. 38) is radially compressible to press the sealing gland 82 tightly against the cable 20 to form a seal. In the illustrated embodiment, the cable end portion of the gland shaft 80 is radially compressed by threadably tightening a cable boot 84 (broadly, a gland nut) onto the gland shaft. The illustrated gland shaft 80 comprises a flange 86 spaced apart between the opposite longitudinal end portions thereof. The flange 86 is configured to compress an O-ring gasket 88 against the cable end of the connector housing 12 to seal the interface between the gland shaft 80 and the housing.

Referring to FIGS. 14-17, an exemplary embodiment of an adapter for mating with the connector 10 is generally indicated at reference number 110. In general, the adapter 110 is configured to mount on a panel P (FIGS. 21-22) having an opening O therethrough. The adapter 110 comprises a panel engagement wall 112 configured to be coupled to the panel P (FIGS. 21-22) in face-to-face relationship therewith when the adapter is mounted on the panel. The adapter 110 further comprises a jack 114 (broadly, a fitting) extending longitudinally from the panel engagement wall 112 and defining a connector opening 116 therethrough. The connector opening 116 is generally rectangular in shape for matingly receiving the adapter interface portion 42 of the connector 10 therein. The panel engagement wall 112 is configured to be positioned on the panel P such that the connector opening 116 aligns with an opening O in the panel P. Suitably the panel engagement wall 112 includes at least one mounting feature, such as the screw holes 124, for mounting the adapter 110 on the panel P (e.g., via screws 125).

In the illustrated embodiment, the panel-facing side of the panel engagement wall 112 comprises a seal groove 126 around each of the screw holes 124 for retaining an O-ring gasket 128 around each of the screws 125. Additionally, the panel-facing side of the panel engagement wall 112 comprises a seal groove 130 around the connector opening 116. The seal groove 130 is configured to seat a seal gasket 132 that extends 360 degrees about the connector opening 116 and the panel opening O. Together the gaskets 128 and the gasket 132 provide a fluid seal of the interface between the adapter 110 and the panel P to prevent ingress of liquid and/or debris through the interface.

The adapter 110 broadly comprises at least one adapter latch element 118 configured to latch with a latch element 22 of the connector 10. In the illustrated embodiment, the adapter 110 comprises first and second bendable latch hooks 118 (broadly, first and second latch elements) extending longitudinally from the panel engagement wall 112 on opposite sides of the jack 114 for latching with the connector housing 12 in the locking channels 22. Each latch hook 118 comprises a leading, outwardly facing ramp surface 120 and a locking surface 122 that faces generally in the connector insertion direction ID. The latch hooks 118 are bendable radially inward toward the longitudinal axis LA.

The illustrated adapter 110 further comprises upper and lower latch hook enclosure walls 134 that extend longitudinally from the panel wall 112. The upper and lower enclosure walls 134 are located on the upper and lower sides of the jack 114, respectively. Each enclosure wall 134 extends around three sides of a respective latch hook 118 in spaced apart relationship therewith. Together the enclosure wall and the upper or lower wall of the jack 114 form a pocket 135 in which a respective latch hook 118 is received. The latch hook 118 is cantilevered from the panel wall 112 within the pocket 135. In the illustrated embodiment, the upper enclosure wall 134 comprises key rails 136 (broadly, a key element) that is configured to be slidably received in the keyways 68 of the three-sided wing 60 of the connector housing 12. If a user tries to insert the connector 110 in an inverted orientation the, key rails 136 will interfere.

FIG. 18 illustrates an adapter 110' that is substantially the same as the adapter 110, except that the screws 125' pass through the panel wall 112' inside the pockets 135' for the latch hooks 118.

As shown in FIG. 19, when the connector 10 is mated with the adapter 110, the adapter interface portion 42 of the connector housing is received in the connector opening 116 of the jack 114 such that the plugs 18 pass through the panel wall 112. As can be understood from FIGS. 21-23, this allows the plugs 18 to mate with a receptacle R on a behind-the-wall side of the panel P opposite the adaptor 110.

Figure 20:
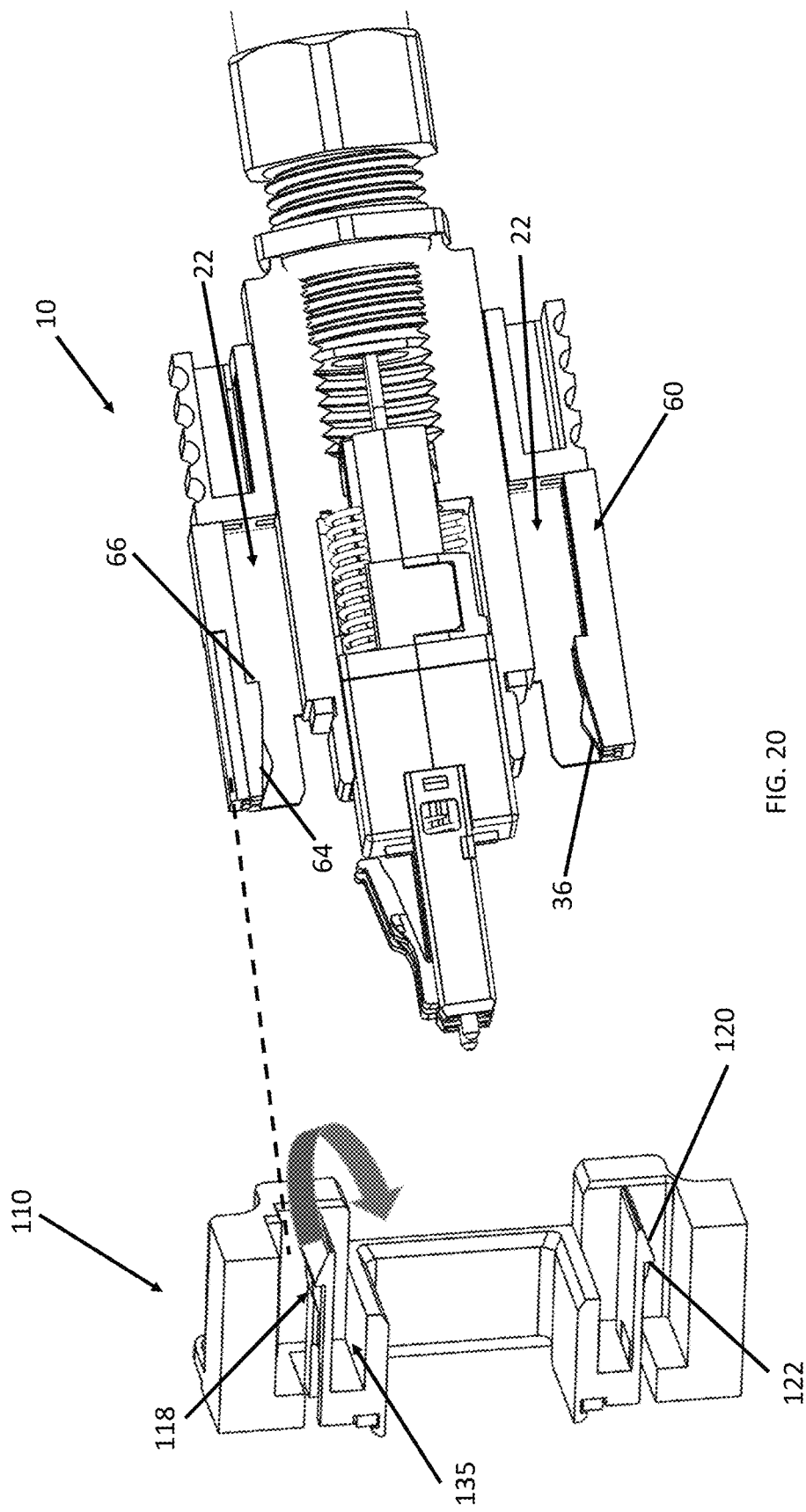
FIG. 20 is a perspective in section of the optical connection system showing the connector approaching the adapter.

Referring to FIG. 20, when the connector 10 is inserted into the adapter 110, each of the upper and lower three-sided wings 60 is configured to pass into the respective one of the upper and lower pockets 135. This causes the cantilevered latch hooks 118 to pass into the locking channels 22. Within each locking channel, the leading chamfer 36 on the delatch actuator arm 26 and/or the ramp surface 64 slides along the ramp surface 120 of the latch hook 118 thereby bending the latch hook inwardly. When the locking surface 122 of the latch hook clears the locking surface 66 of the locking channel 22, the latch hook 118 resiliently rebounds such that the latch hook locks with the locking surface of the locking channel.

Figure 21:
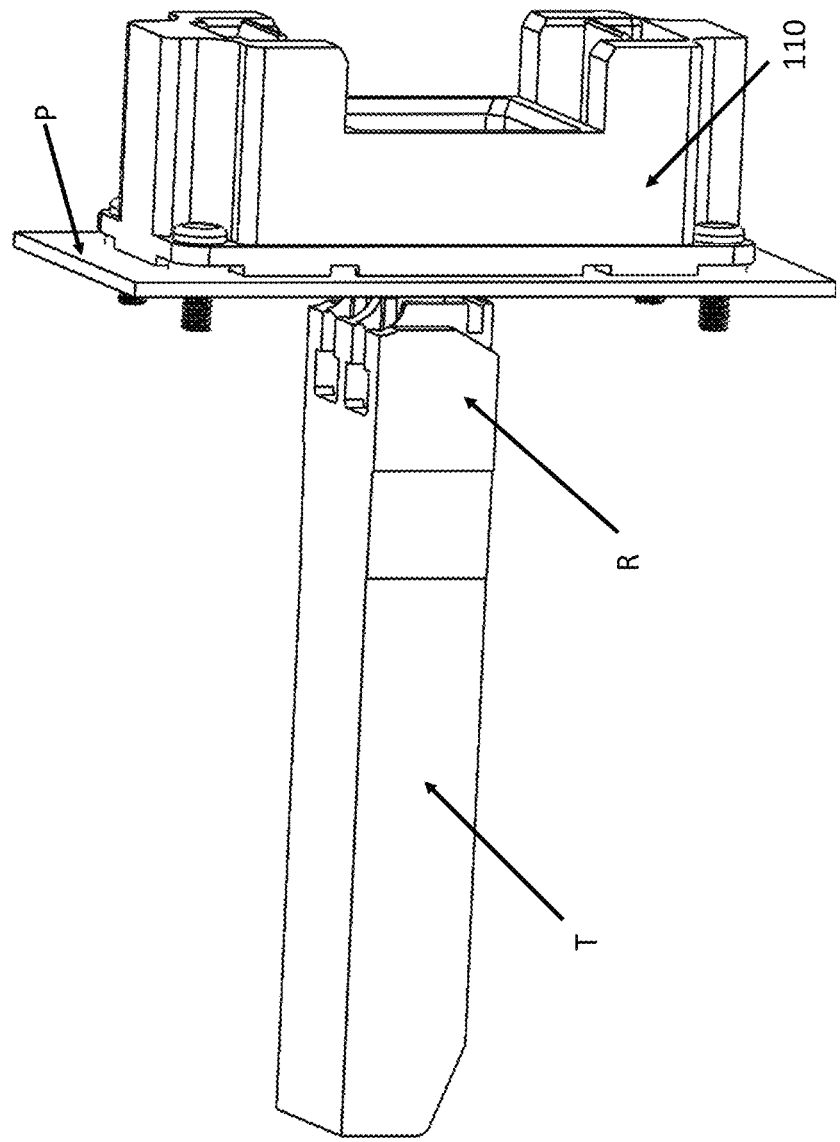
FIG. 21 is a perspective of the adapter secured to a panel with a behind-the-wall transceiver.
Figure 22:
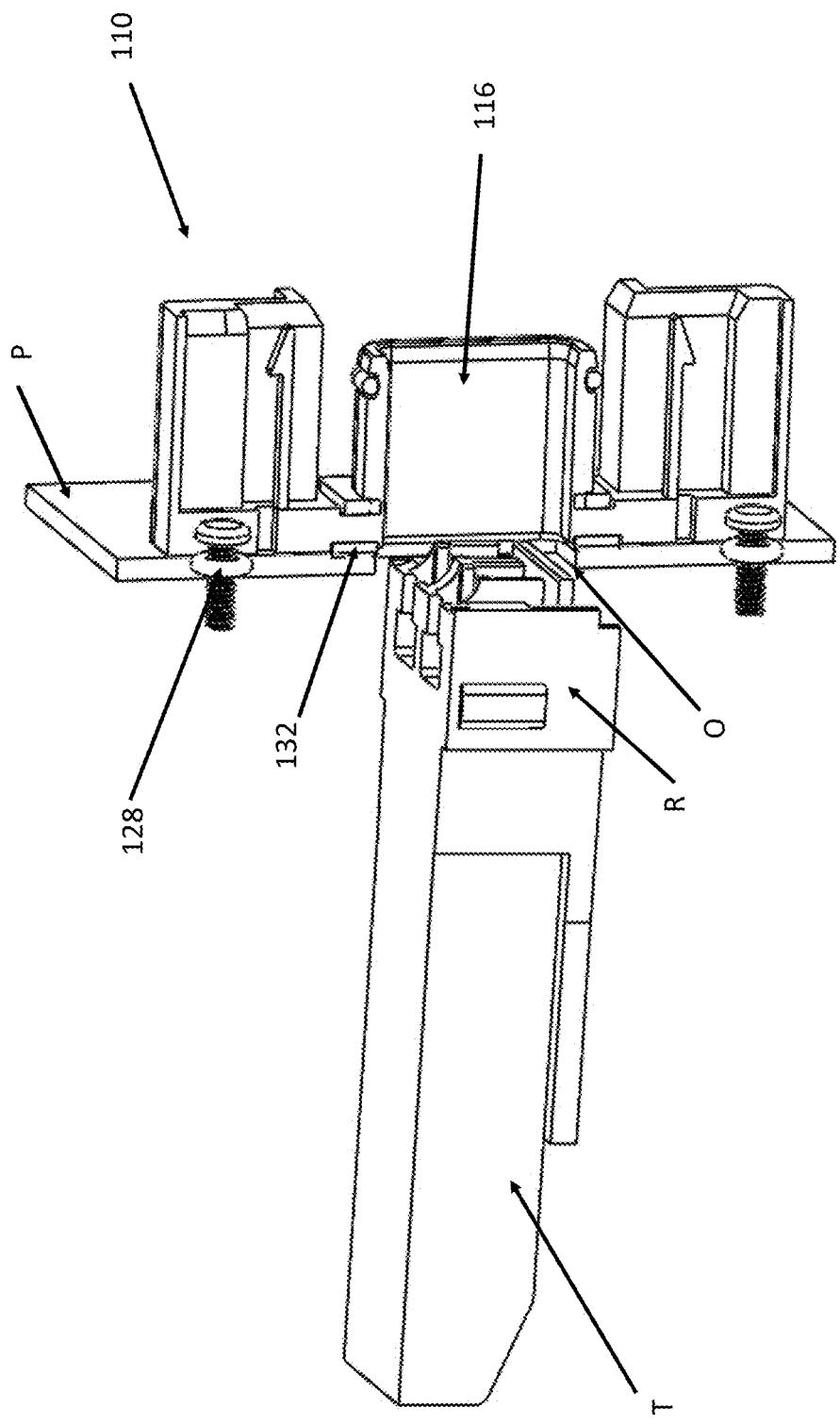
FIG. 22 is the perspective of FIG. 21 but showing the adapter in section.

Referring to FIGS. 21-22, in one or more embodiments, the adapter 110 can be mounted on a panel P at an opening O such that the cable assembly 16 can mate with a receptacle R through the opening in the panel. In FIGS. 21-22, the receptacle R is mounted on the panel P on the opposite side from the adapter 110. Thus, the plugs 18 initially mate with the receptacle R "behind the wall" of the panel. In the illustrated embodiment, the receptacle R is a component of a transceiver T, but other types of fiber optic receptacles may also be used without departing from the scope of the disclosure.

Figure 23:
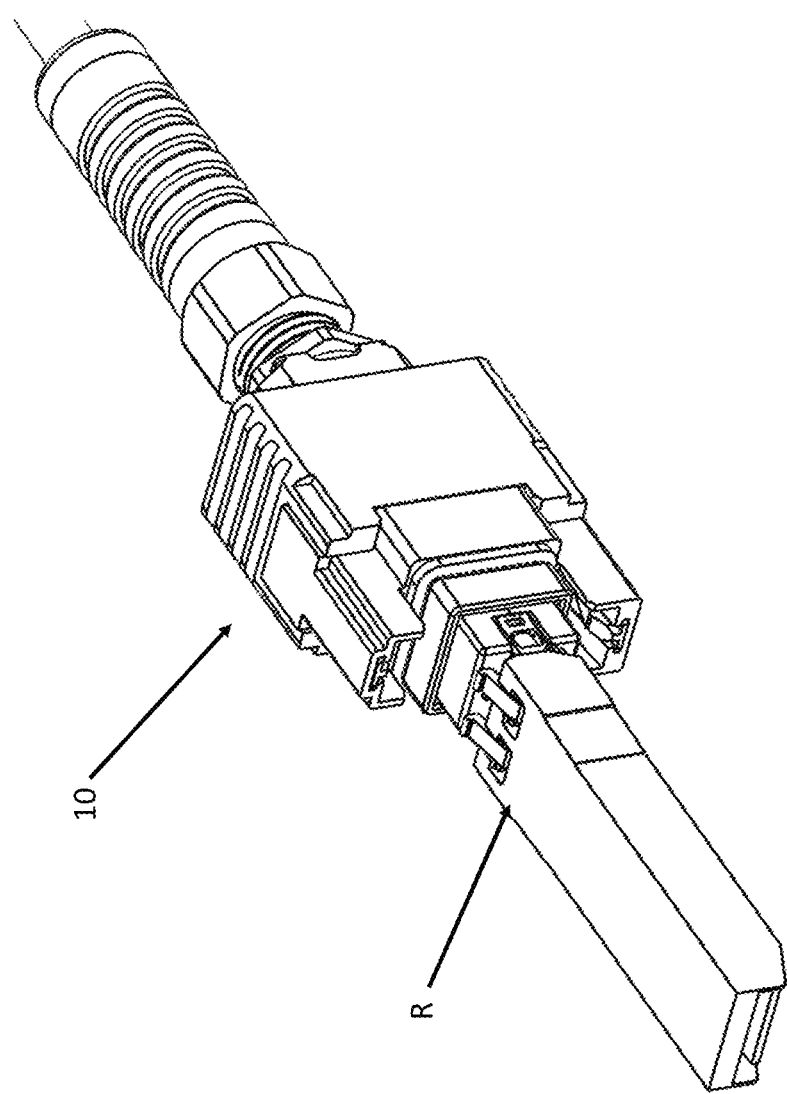
FIG. 23 is a perspective of the connector mated with the transceiver but not connected to the adapter.
Figure 24:
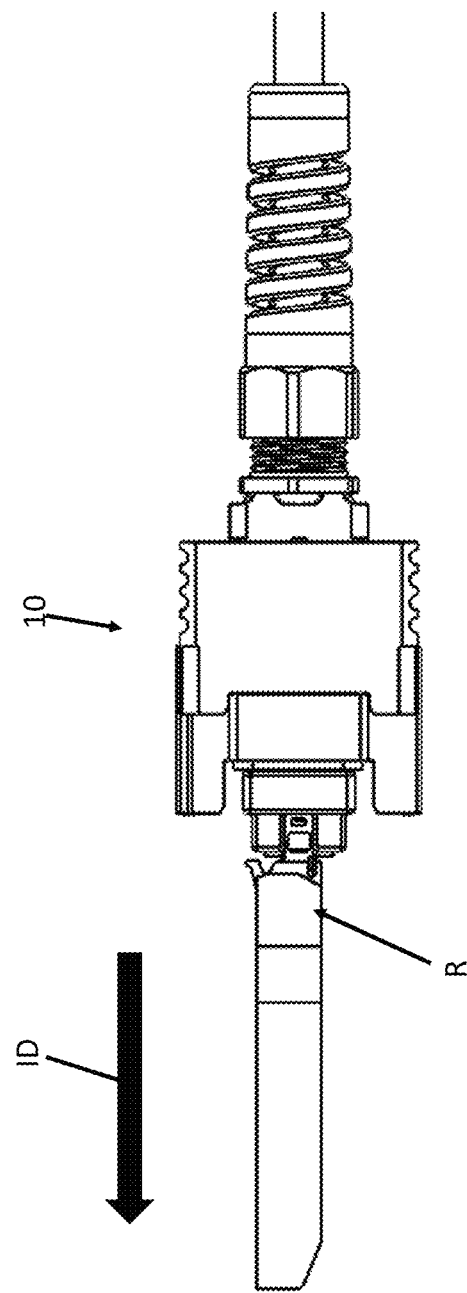
FIG. 24 is an elevation of the connector mated with the transceiver approaching the adapter mounted on a panel.
Figure 25:
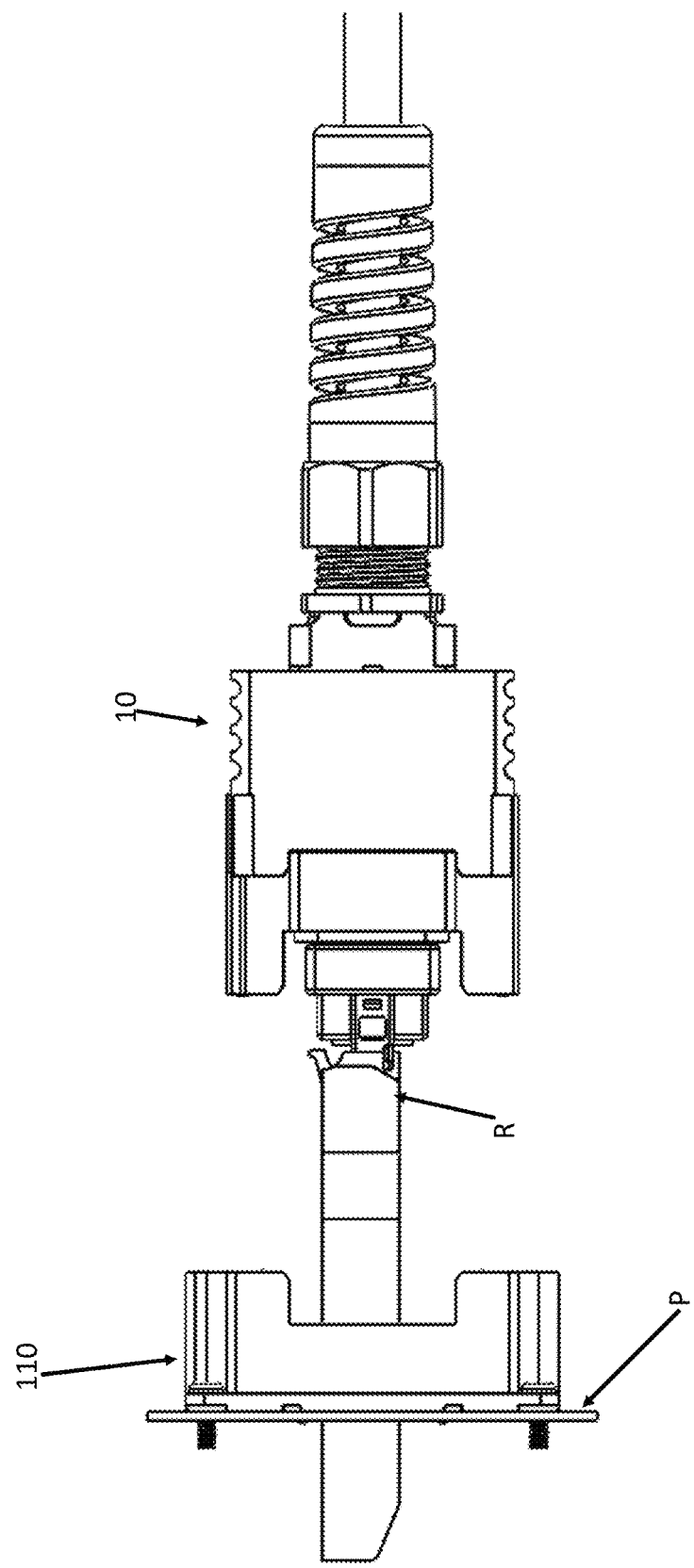
FIG. 25 is the elevation of FIG. 24 but showing the transceiver passing through the adapter and the panel.

Referring to FIGS. 23-25, it is also possible to mate the connector 10 to the receptacle R "in front of the wall" of the panel P (e.g., by inserting the plugs 18 into the receptacle R), and then plugging the receptacle-connector combination into the adapter 110 mounted on the panel P.

Figure 26:
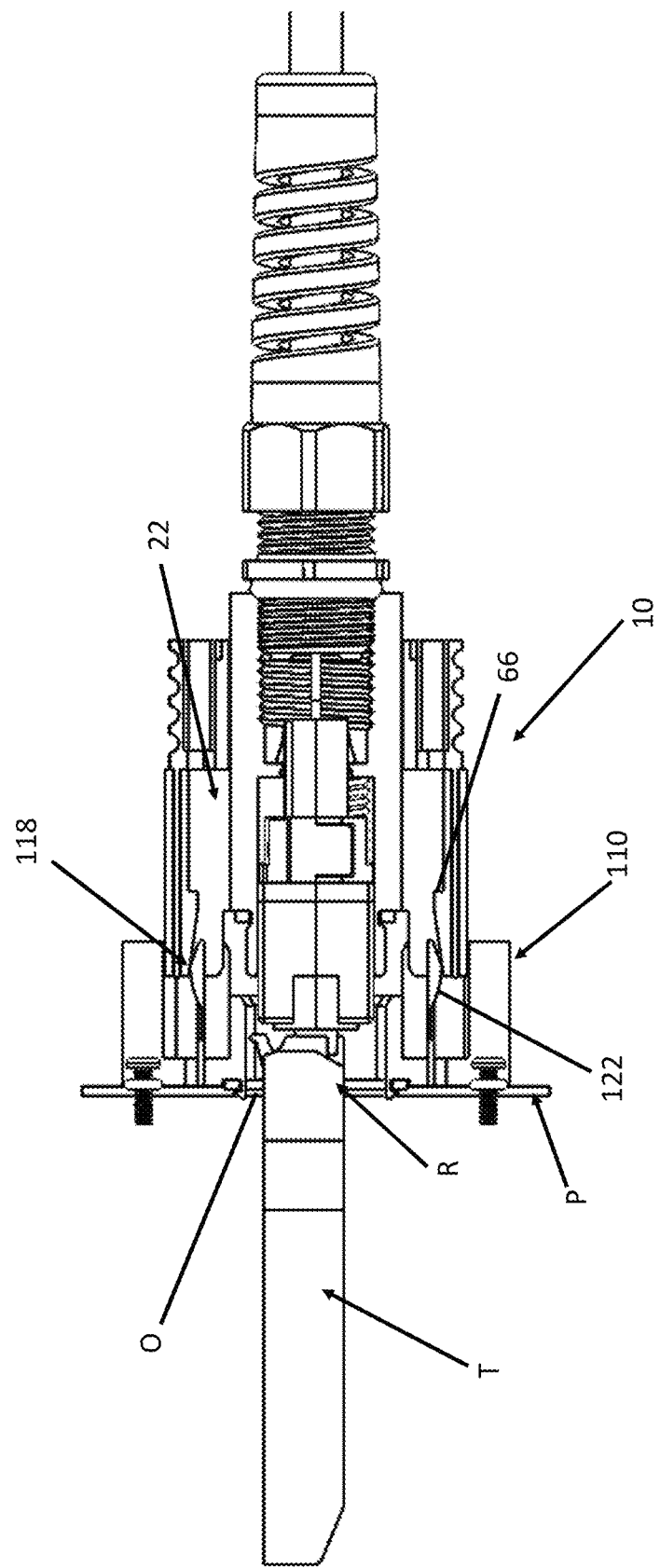
FIG. 26 is an elevation of the optical connection system showing the connector mated with the transceiver via the adapter, with the connector and adapter shown in section.
Figure 27:
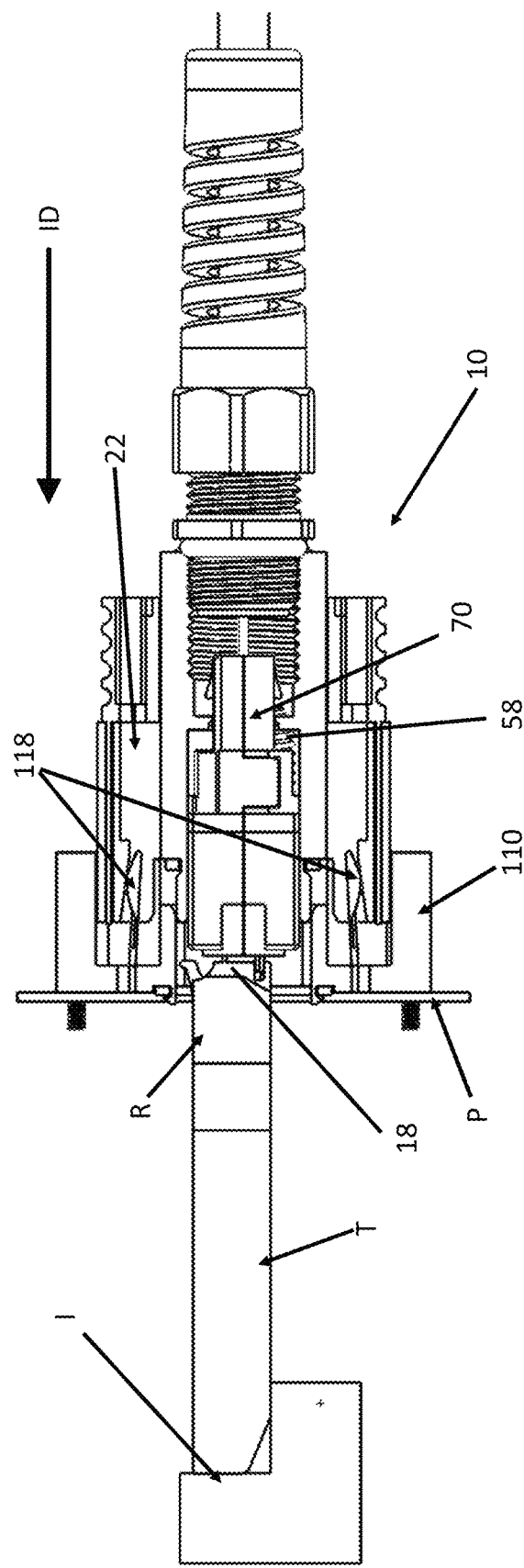
FIG. 27 is the elevation of FIG. 26 but showing the connector and transceiver advanced relative to FIG. 26 such that the transceiver engages an interface component behind the wall of the panel.

Referring to FIGS. 26-27, when the connector 10 mates with the adapter 110, as explained above, each of the upper and lower three-sided wings 60 passes into the respective one of the upper and lower pockets 135. The cantilevered latch hooks 118 pass into the locking channels 22, and the latch hooks bend inwardly so that the locking surface 122 of the latch hook clears the locking surface 66 of the locking channel 22. The latch hooks 118 resiliently rebound such that each latch hook locks with the locking surface 66 of the corresponding locking channel 22. As is seen in FIG. 27, a far end of the transceiver T connects to a mating interface I behind the wall of the panel. In an embodiment, just before the latch hooks 118 latch with the locking channels 22 (e.g., at the position shown in FIG. 27) the transceiver T mates with the mating interface I, which causes further longitudinal movement of the transceiver, the plugs 18, and the plug retention body 70 to stop. The connector housing 12 continues to move in the insertion direction ID relative to the plugs 18 and the plug retention body 70, until the latch hooks 118 latch with the locking channels 22, which causes the springs 58 to be compressed between the plug retention body and the transverse wall 54.

Figure 28:
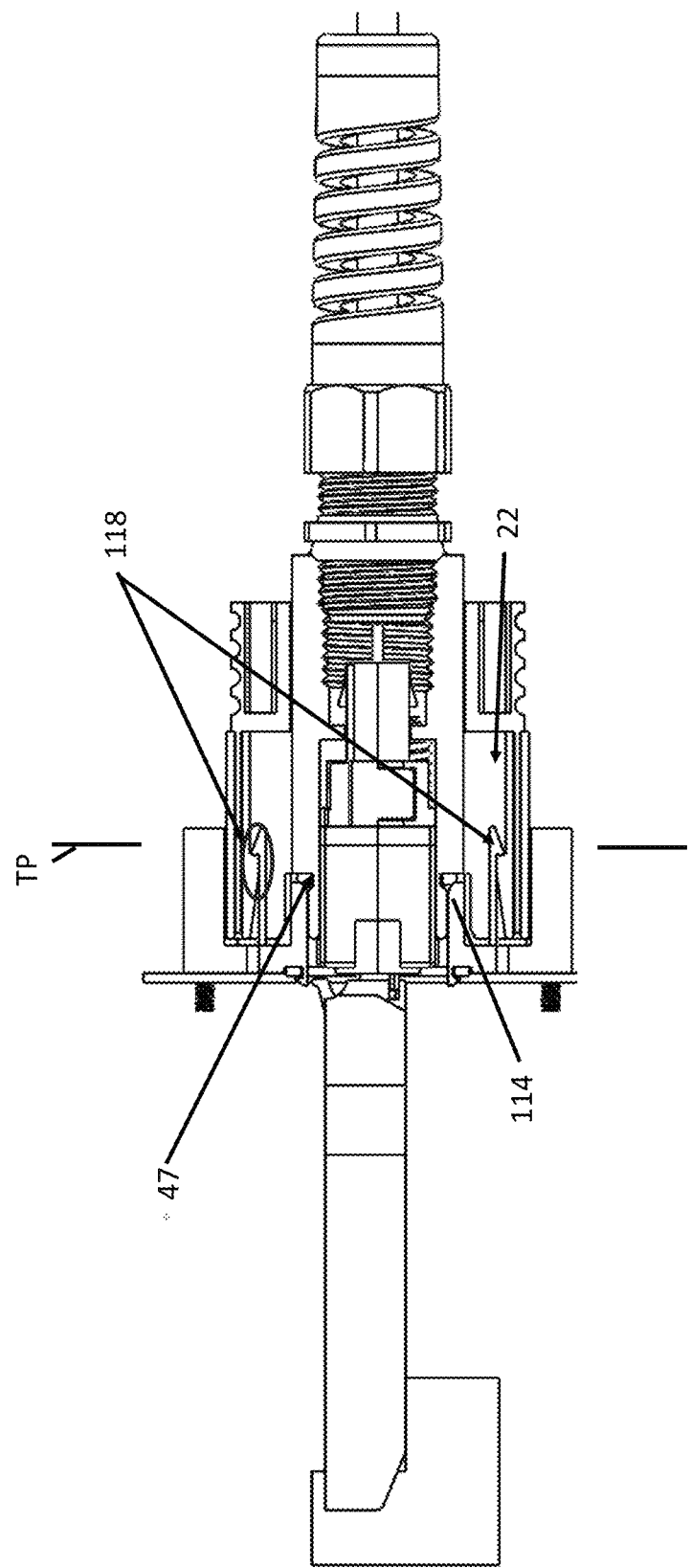
FIG. 28 is the elevation of FIGS. 26-27 but showing the connector coupled to the adapter

As shown in FIG. 28, after the latch hooks 118 latch with the locking channels 22, the seal 47 is compressed between the end of the jack 114 and the connector housing 112. The seal 47 thus provides a fluid seal of the interface between the connector 10 and the adapter 110 that extends circumferentially about the cable assembly 16.

Figure 29:
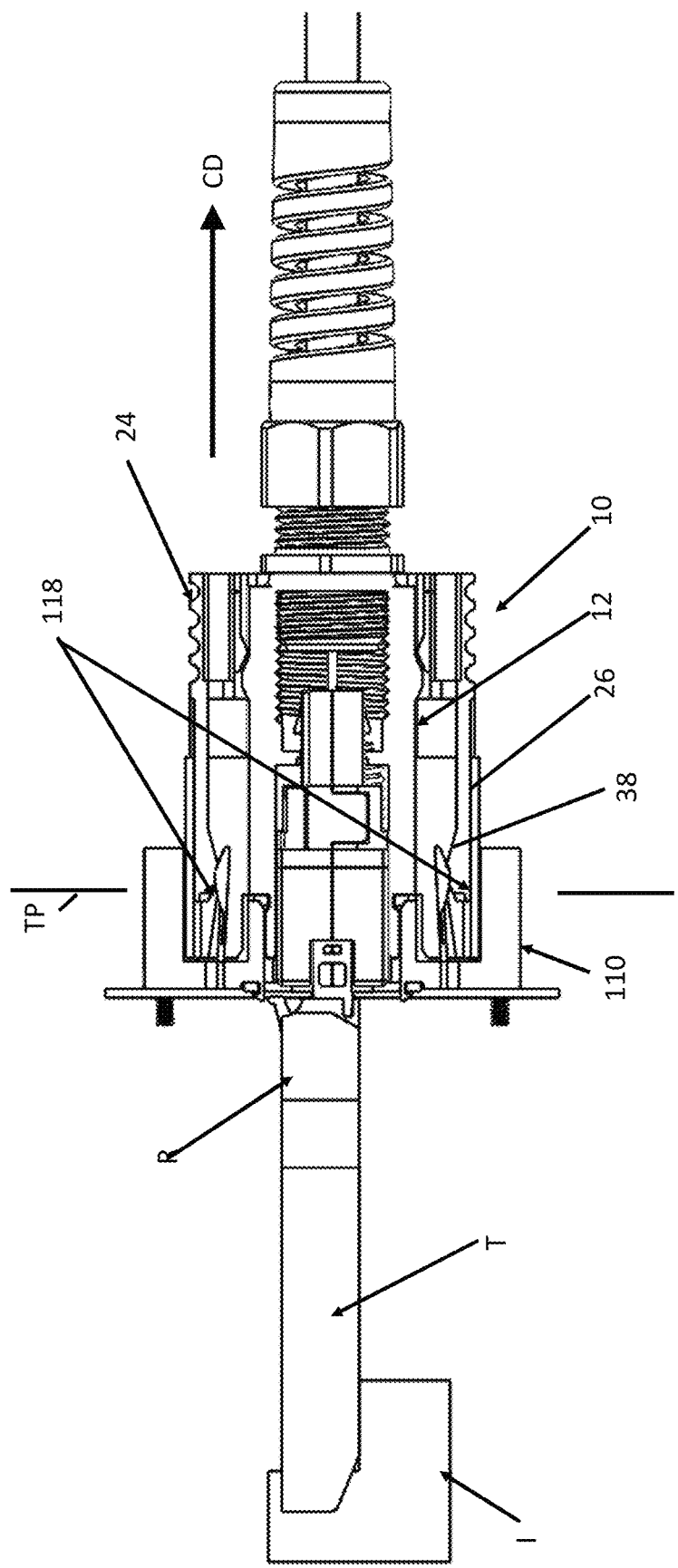
FIG. 29 is the elevation of FIGS. 26-28 but showing the delatch actuator of the connector being pulled back to release the connector from the adapter.

As can be seen, when the connector 110 is fully connected to the adapter 110, the delatch actuator 24 is in the locking position. Thus, as explained above, the wedge surface 38 is spaced apart from the transverse latching plane TP in the direction insertion direction ID. Referring to FIG. 29, to release the connector 10 from the adapter 110, a user pulls back on the delatch actuator 24 (in the cable direction CD). The delatch actuator 24 is displaced with respect to the connector housing 12 in the cable direction CD from the locking position to the unlocking position. The delatch arms 26 thus slide along the locking channels 22 in the cable direction CD. As the delatch actuator 24 moves from the locking position to the unlocking position, the wedge surfaces 38 cross the plane TP. As the wedge surfaces 38 cross the plane TP, the bendable latch hooks 118 slides along the wedge surfaces as a cam such that the wedge surfaces displaces the bendable latch hooks transversely inward to clear the locking surfaces 66.

Figure 30:
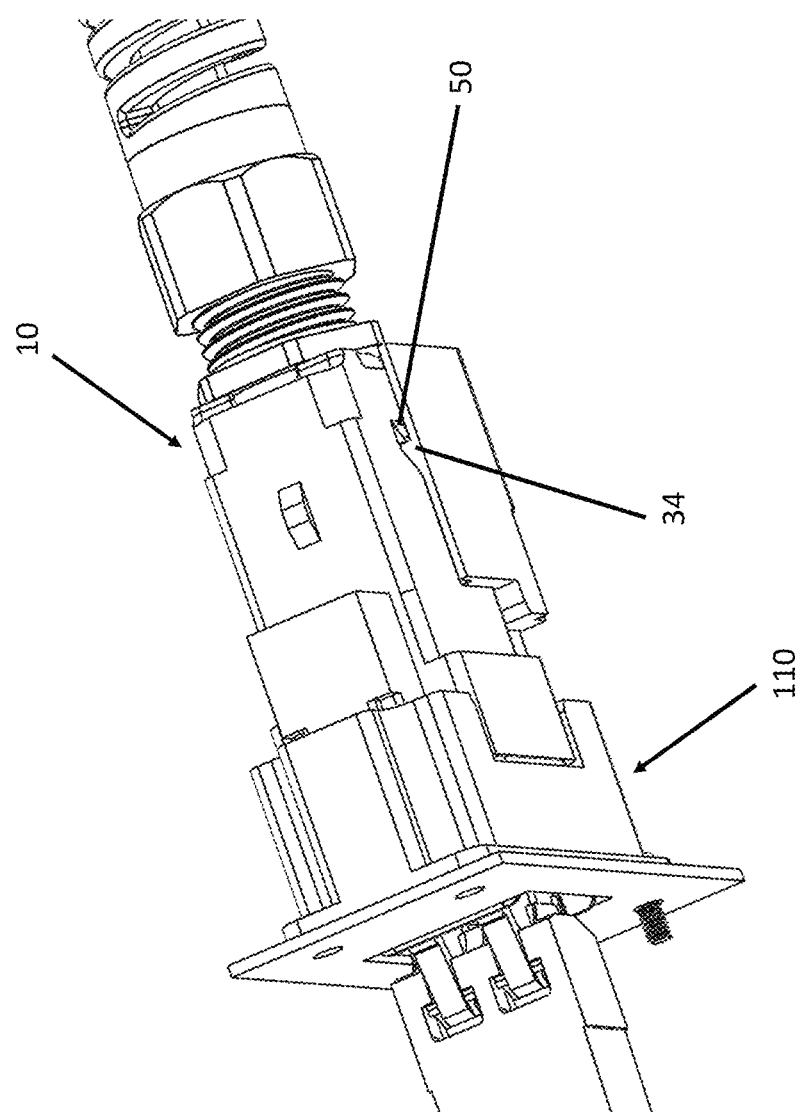
FIG. 30 is a perspective of the optical connection system in the configuration of FIG. 29 with an upper portion of the delatch actuator broken away.

As shown in FIG. 30, when the delatch actuator 24 is displaced relative to the connector housing 12 in the cable direction CD, the opposing ends of the stops 34, 50 engage one another to limit longitudinal displacement of the delatch actuator in the cable direction. This also causes further pulling on the delatch actuator 24 to transfer to the connector housing 12, which separates the connector housing from the adapter 110.

Figure 31:
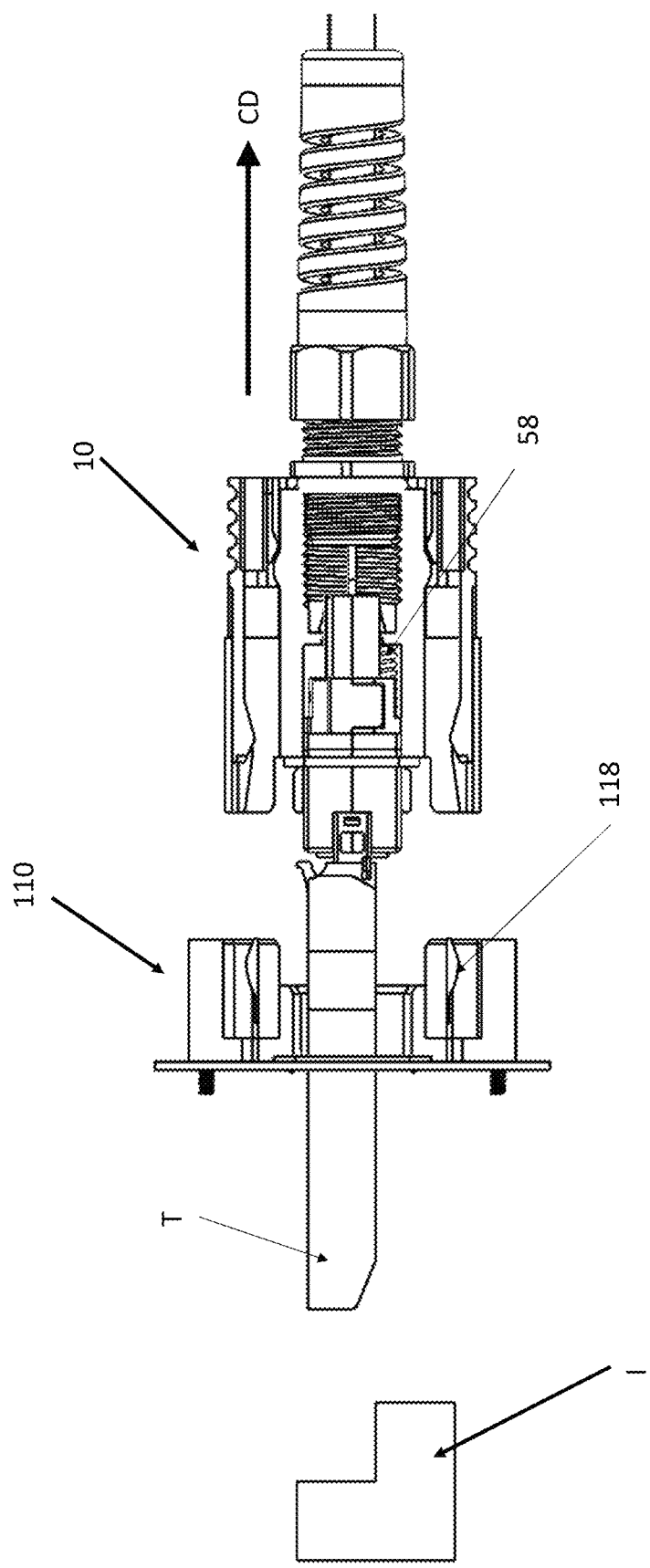
FIG. 31 is the elevation of FIGS. 26-29 showing the connector pulled out of the adapter.

Referring to FIG. 31, in one or more embodiments, when the connector 10 separates from the adapter 110, the transceiver T disconnects from the interface device I and is removed with the connector. This causes the springs 58 to rebound from their previous compressed state. Additionally, when the connector 10 separates from the adapter 110, the latch hooks 118 resiliently rebound to their undeflected positions.

Figure 32:
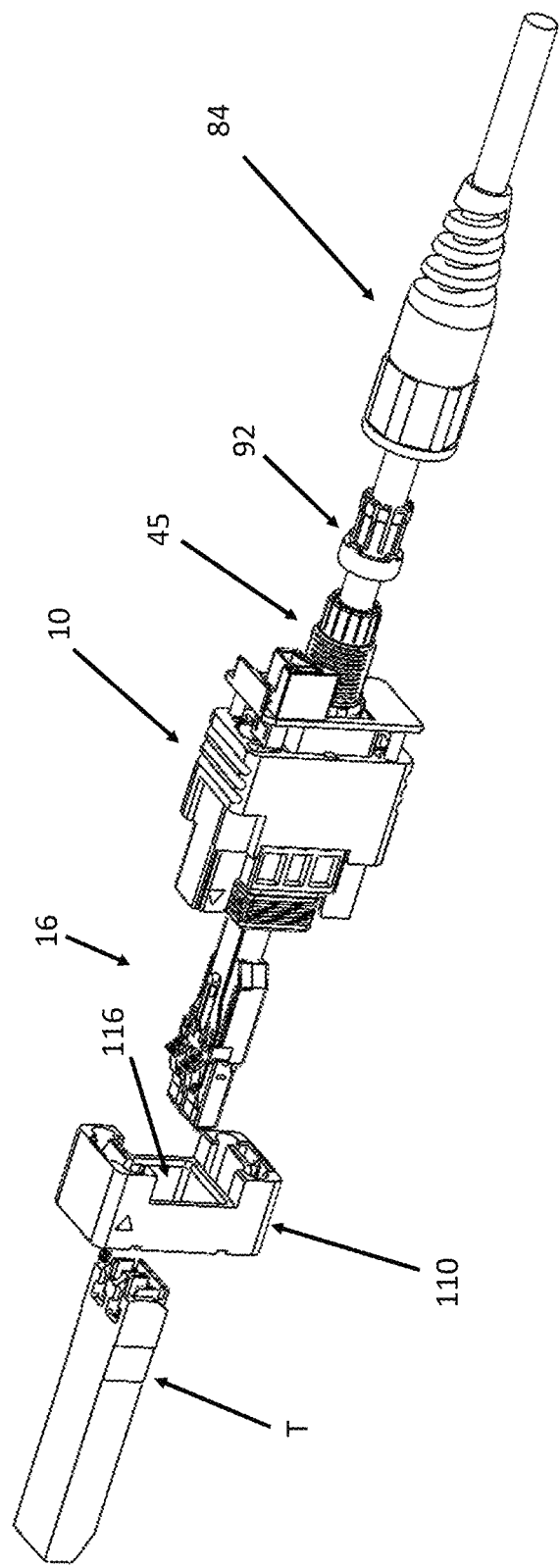
FIG. 32 is an exploded perspective of the optical connection system and transceiver showing the connector in a cable pass-through configuration.
Figure 39:
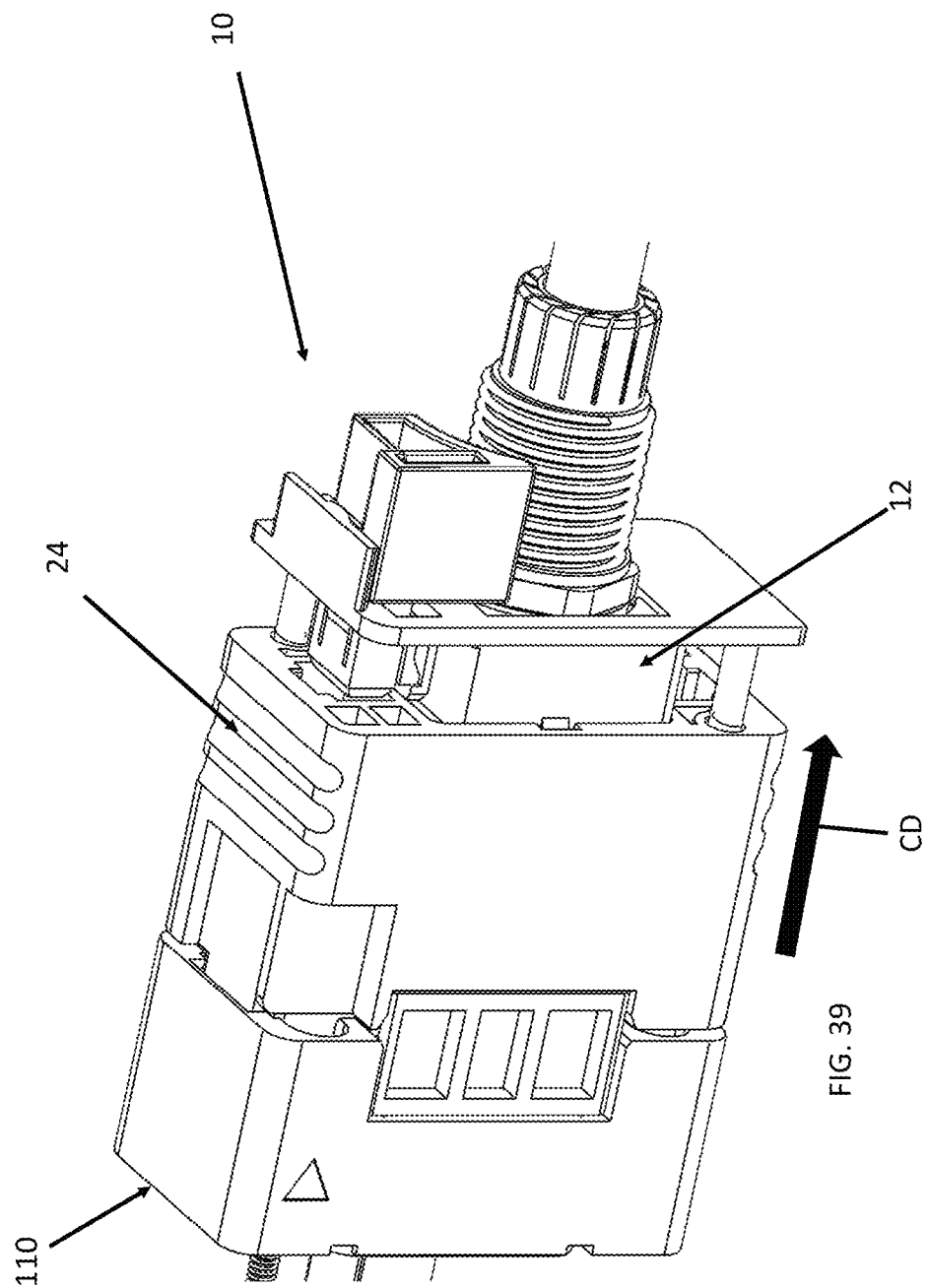
FIG. 39 is a perspective of the optical connection system showing the connector mated with the adapter.
Figure 42:
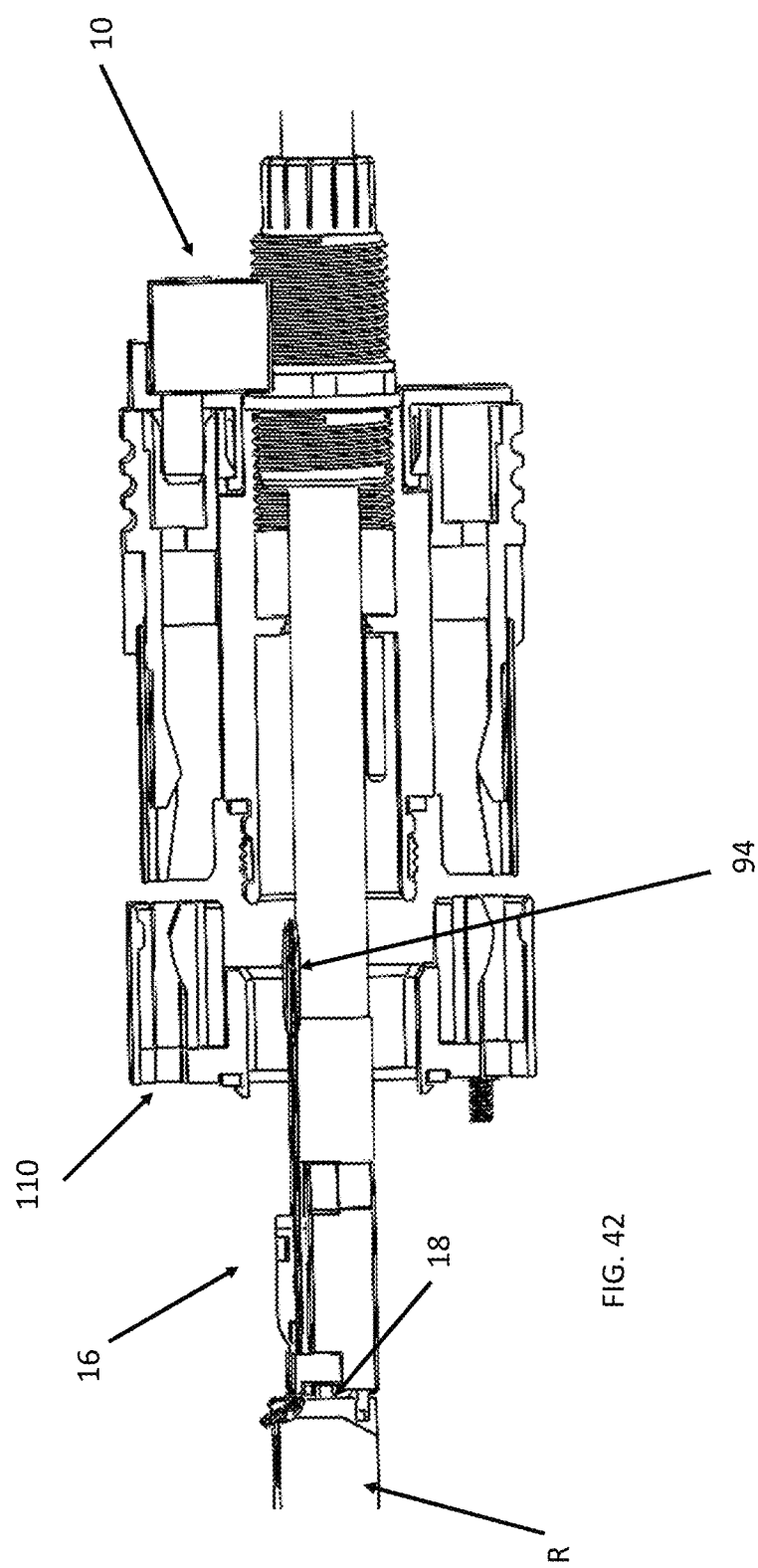
FIG. 42 is the elevation of FIGS. 40 and 41 but showing the connector pulled out of the adapter before the cable assembly is released from the transceiver.
Figure 44:
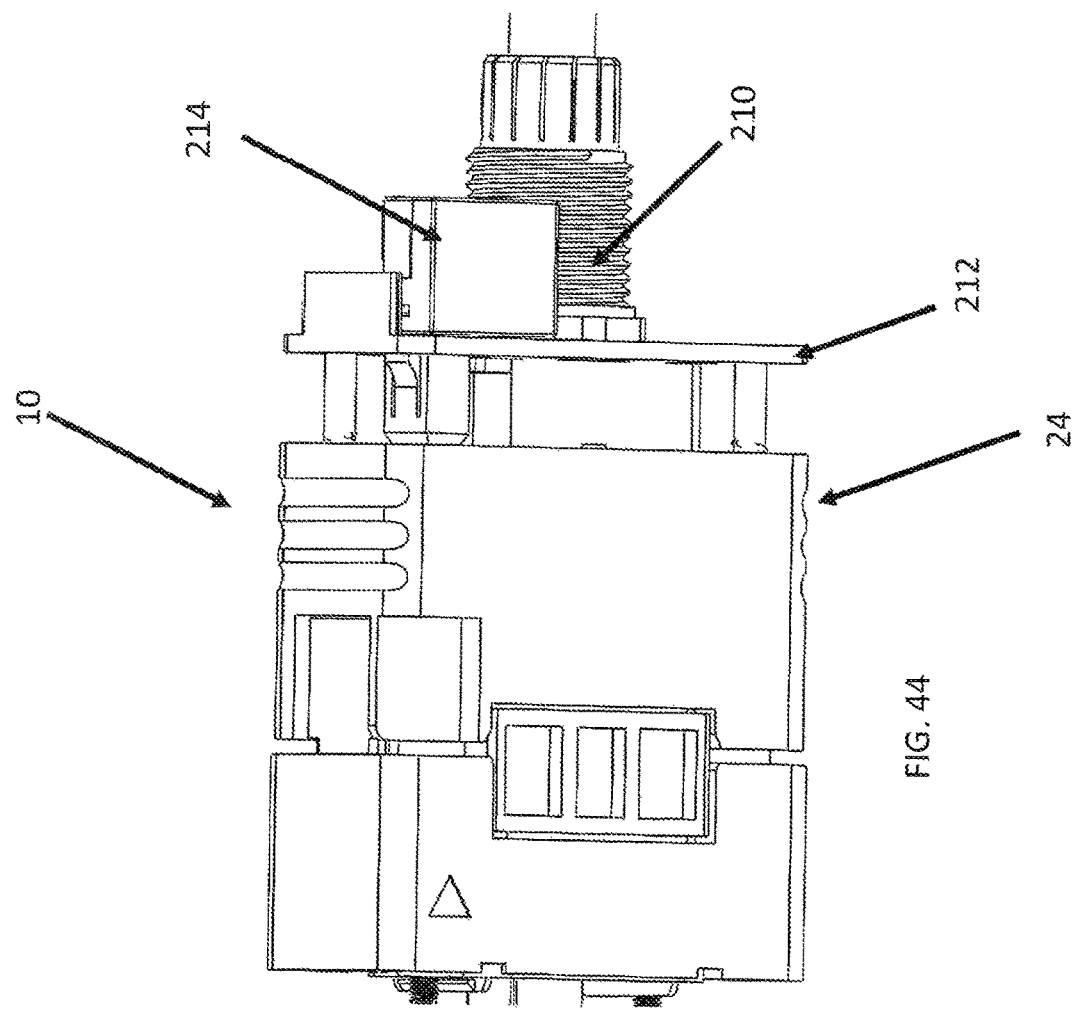
FIG. 44 is another perspective of the connection system showing the actuator lock in the release position.

Referring to FIG. 32, in one or more embodiments, the connector 10 is releasable from the cable assembly 16 such that the connector can slide along the cable 20 in relation to the fiber optic plugs 18. As shown in FIGS. 33 and 34, this allows, the plugs 18 to be inserted through the connector opening 116 of the adapter 110 to mate with a receptacle R before securing the connector 10 to the adapter. After the plugs 18 are mated with the receptacle R, as shown in FIGS. 35-37, the connector 10 is coupled to the adapter 110 in the same way as described above. Notably, when the connector 10 is moved along the cable 20 to mate with the adapter 110, the cable boot 84 is not secured to the gland shaft 80, which would otherwise create a compression connection between the connector and the cable.

Referring to FIG. 38, operation of the cable gland assembly 45 will now be described in greater detail. In the illustrated embodiment, the cable gland assembly 45 includes the gland shaft 80, the internal gland seal 82, the cable boot 84 (FIG. 13), and a cable retention strengthener 90 that is slidably received on the cable 20. The cable retention strengthener 90 comprises a tube received on the cable 20 between the gland shaft 80 and the cable boot 84. The cable retention strengthener 90 comprises a chamfered leading inner end portion and a plurality of circumferentially spaced fingers that define the trailing portion. When the cable boot 84 (broadly, gland shaft) is threaded onto the gland shaft 80, an internal chamfer 92 of the cable boot will press the cable strengthener 90 in the insertion direction ID. This causes the chamfer of the cable retention strengthener 90 to press inward on the fingers of the gland shaft 80, thereby compressing the gland seal 82 against the cable 20. Additionally, the internal chamfer 92 of the boot 84 presses the fingers of the cable retention strengthener 90 inward against the cable. Thus, it can be seen that cable gland assembly 45 provides a seal of the interface between the connector 10 and the cable 20. Further, the cable gland assembly 45 provides two points of connection to the cable 20.

After the cable gland assembly has been tightened, the connection system 10, 110 is ingress protected. As explained above the seals 128, 132 seal the interface between the adapter 110 and the front of the panel P, the seal 47 seals the interface between the connector 10 and the adapter, and the cable gland assembly 45 seals the interface between the connector and the cable assembly 16. Thus, the connection system 10, 110 can protect the mated plugs 18 and receptacle R from ingress originating on the front side of the panel P.

Referring to FIGS. 39-42, to disconnect the optical connection system 10, 110 described above, the cable boot 84 must first be removed from the gable gland shaft 82. Then, as explained above, the delatch actuator 24 is pulled back relative to the connector housing 12 to unlatch the connector 10 from the adapter 110. After the connector 10 has been moved out of the way, the plugs 18 can be disconnected from the receptacle R.

Figure 43:
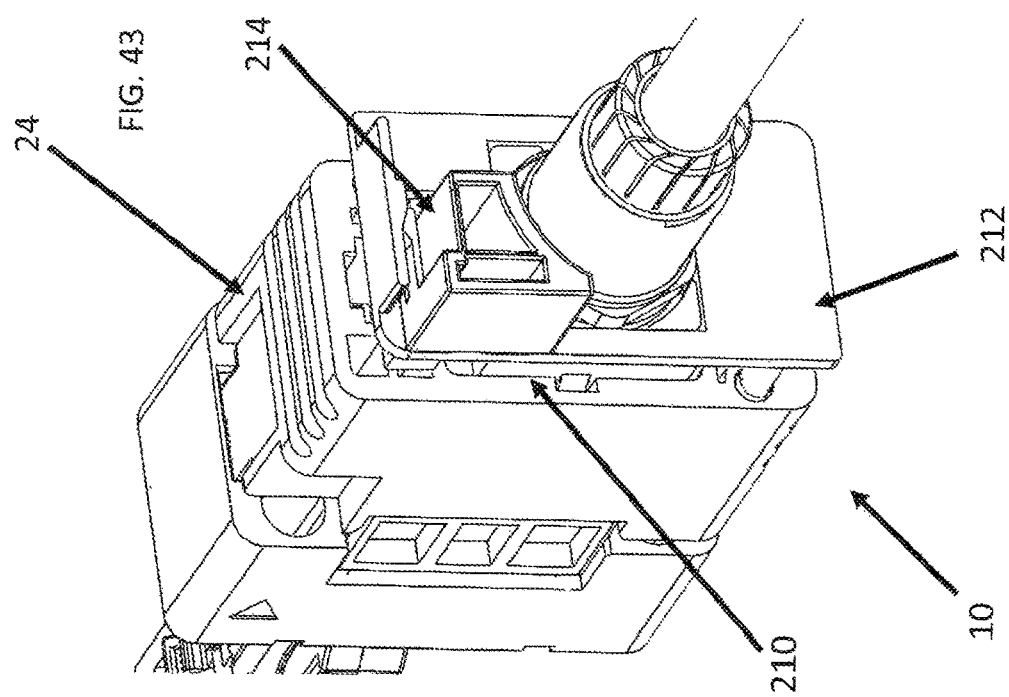
FIG. 43 is a perspective of the connection system showing an actuator lock in a release position.

Referring to FIGS. 43-61, in one or more embodiments, the connector 10 is fitted with an actuator lock 210 for selectively blocking the delatch actuator 24 from moving from the locking position to the unlocking position. The illustrated actuator lock 210 comprises a locking plate 212 supported on the cable end portion of the connector housing 12 and a blocking member 214 movably supported on the locking plate for movement relative to the locking plate between a blocking positon (FIGS. 43, 50) and a release position (FIG. 51-55). In the illustrated embodiment, the locking plate 212 includes a blocking member guide slot 216 and the blocking member 214 is slidably received in the blocking member guide slot for movement relative to a remainder of the connector 10 generally along the lateral axis LTA between the blocking position and the release position. In the blocking position, the blocking member 214 is configured to block the delatch actuator 24 from moving from the locking position the unlocking position. And in the release position, the blocking member 214 is positioned relative to the delatch actuator 24 such that the actuator can move from the locking position to the unlocking position without being blocked by the blocking member.

Referring to FIG. 45, in the illustrated embodiment, the locking plate 212 is attached to the cable end portion of the connector housing 12. The locking plate 212 extends in a plane generally parallel to the transverse-axis-TA-lateral-axis-LTA plane and generally perpendicular to the longitudinal axis LA. The guide slot 216 is located above the central enclosure 40 of the housing 12. In certain embodiments, the connector has mirror image features above and below the longitudinal axis LA so that the actuator lock can be selectively installed in an inverted position relative to what is shown. The locking plate 212 comprises first and second guide pins 218 that extend in the insertion direction ID and are slidably received in corresponding holes 220 formed in the trailing end of the delatch actuator 24. The trailing end portion of the delatch actuator 24 further defines a release opening 222 configured to receive a portion of the blocking member 214 when the blocking member is in the release position to allow the delatch actuator to move in the cable direction CD. The locking plate 212 further comprises a detent tab 224 with a detent protrusion 226. The detent tab 224 extends in the cable direction CD from the upper end portion of the locking plate 212.

Referring to FIGS. 46-47, the blocking member 214 comprises an actuator engagement portion 230 (broadly, a first portion) and a boot engagement portion 232 (broadly, a second portion). The actuator engagement portion 230 extends in the insertion direction ID from the boot engagement portion 232. The actuator engagement portion 230 is configured to be inserted through the guide slot 216 toward the delatch actuator 24 until the actuator engagement portion and the boot engagement portion are largely on opposite sides of the locking plate 212. In the illustrated embodiment, the actuator engagement portion 230 comprises upper and lower elastic fingers 234 that are configured to deflect toward one another as the actuator engagement portion 230 passes through the slot and resiliently rebound outwardly after the trailing ends of the fingers cross the locking plate 212. Then the locking plate 212 is received between the trailing ends of the fingers 234 and the leading end of the boot engagement portion 232 such that the blocking member 214 retains itself on the locking plate 212 and the locking plate constrains the blocking member to sliding along the slot 216 between the blocking and release positions. When the blocking member 214 is in the blocking position, the actuator engagement portion 230 is configured to engage the trailing end of the delatch actuator 214 to prevent the delatch actuator from being pulled from the locking position to the unlocking positon. By contrast, when the blocking member 214 is in the release position, the actuator engagement portion 230 is configured to allow the delatch actuator 24 to be pulled back from the locking position to the unlocking position. More particularly, the actuator engagement portion is configured to pass into the release opening 222 when the delatch actuator 24 is pulled back while the blocking member is in the release position.

The boot engagement portion 230 comprises a concave inner corner 236 that is configured to provide clearance for the cable boot 84 to be threaded onto (and off of) the gland shaft 80 when the blocking member 214 is in the blocking position. However, when the blocking member 214 is in the release position, the inner corner 236 interferes with the boot 84 being threaded onto the gland shaft 80. Conversely, when the cable boot 84 is retained on the gland shaft 80, the cable boot interferes with the blocking member 214 moving from the blocking position to the release position.

In the illustrated embodiment, the upper end section of the boot engagement portion 232 includes an elastic detent latch 238. The detent latch 238 is configured to interface with the detent protrusion 226 on the tab 224 of the locking plate 212. More particularly, the detent latch 238 must flex (resiliently) to pass over the detent protrusion 226 for the blocking member 214 to move from the blocking position to the release position and vice versa. Thus, it can be seen that the detent latch 238 and the detent protrusion 226 together form a detent mechanism configured to retain the blocking member 214 on the locking plate 212 in each of the blocking position and the release position.

FIGS. 48 and 49 show the process of installing the blocking member 214 on the locking plate 212 to form the actuator. As can be seen, the actuator engagement portion 230 is inserted into the slot 216 in the insertion direction ID until the elastic fingers 234 cross the locking plate 212 and snap in place.

FIGS. 50 and 51 show the blocking member 214 in the blocking position and release position, respectively. As can be seen, in the release position of FIG. 51, the inner corner 236 is immediately adjacent to the gland shaft 80, at a position that would interfere with the cable boot 84 being properly retained on the gland shaft. By contrast, in the blocking position, there is clearance for a boot 84 to thread onto the gland shaft 80. FIGS. 50 and 51 also show how the detent latch 238 must snap over the detent protrusion 226 to move from the blocking position to the release position and vice versa.

FIGS. 52-54 illustrate the relationship between the actuator lock 210 and the delatch actuator 24 when the blocking member 214 is in the release position. As can be seen, in the release position, the actuator engagement portion 230 is aligned with the release opening 222 in the delatch actuator 24. Thus, when the delatch actuator is pulled back as shown in FIG. 54, the actuator engagement portion 230 is received in the release opening 222, which allows the delatch actuator to be displaced in the cable direction CD relative to the connector housing 12.

Figure 56:
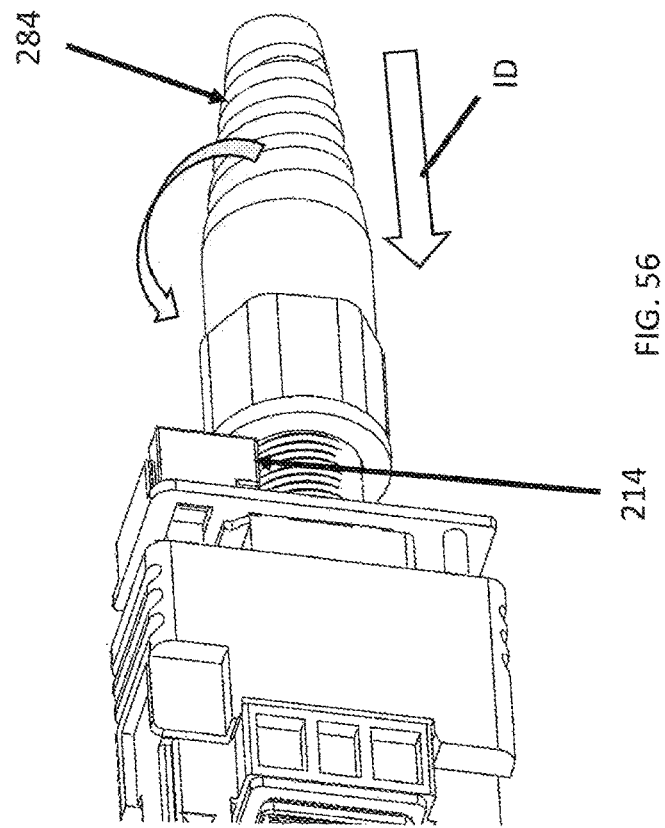
FIG. 56 is a fragmentary perspective of the connector showing the blocking member in the release position interfering with the cable boot being advanced onto the cable gland shaft.
Figure 55:
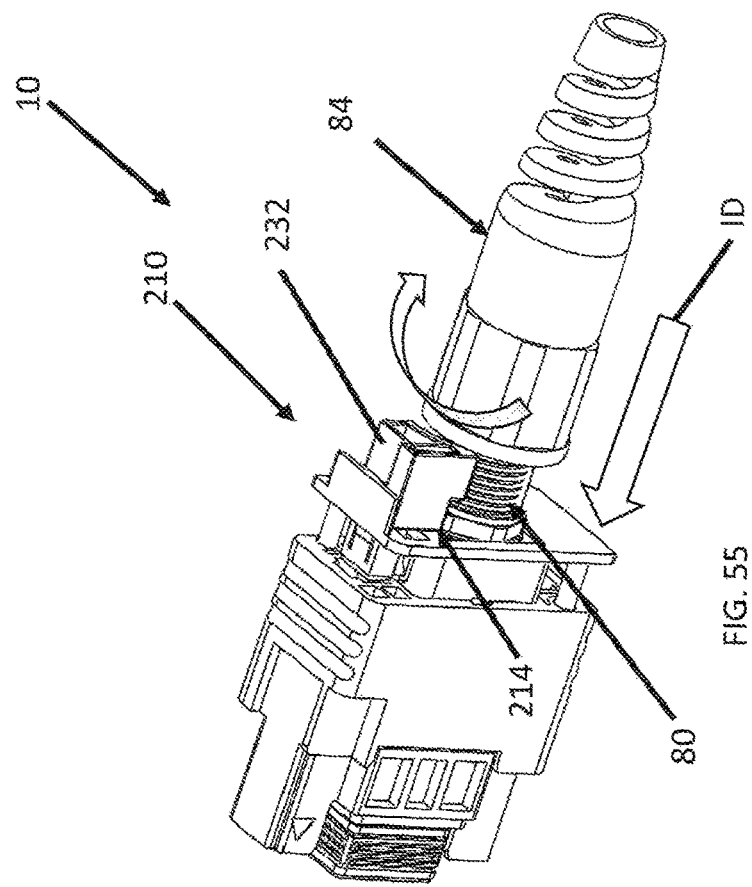
FIG. 55 is a perspective of the connector showing the blocking member in the release position interfering with the cable boot being advanced onto a cable gland shaft.

FIGS. 55 and 56 show how the boot engagement portion 232 interferes with threadably advancing the boot 84 onto the cable gland shaft 80 when the blocking member 214 is in the release position.

Figure 58:
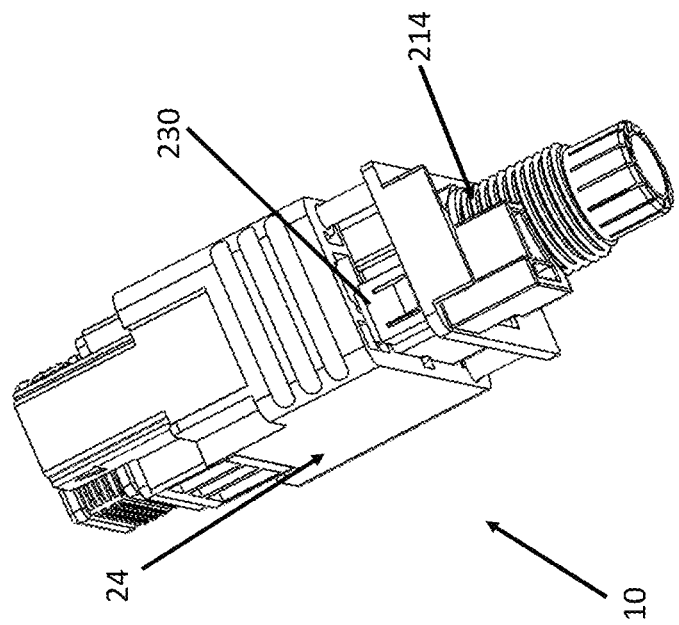
FIG. 58 is another perspective of the connector showing the blocking member in the blocking position.
Figure 57:
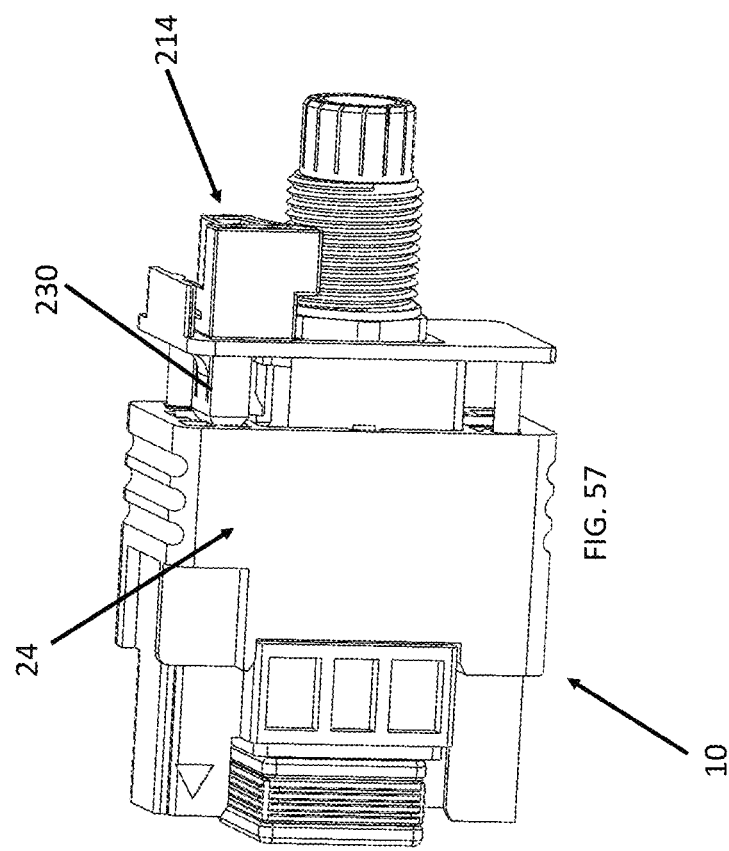
FIG. 57 is a perspective of the connector showing the blocking member in the blocking position.
Figure 62:
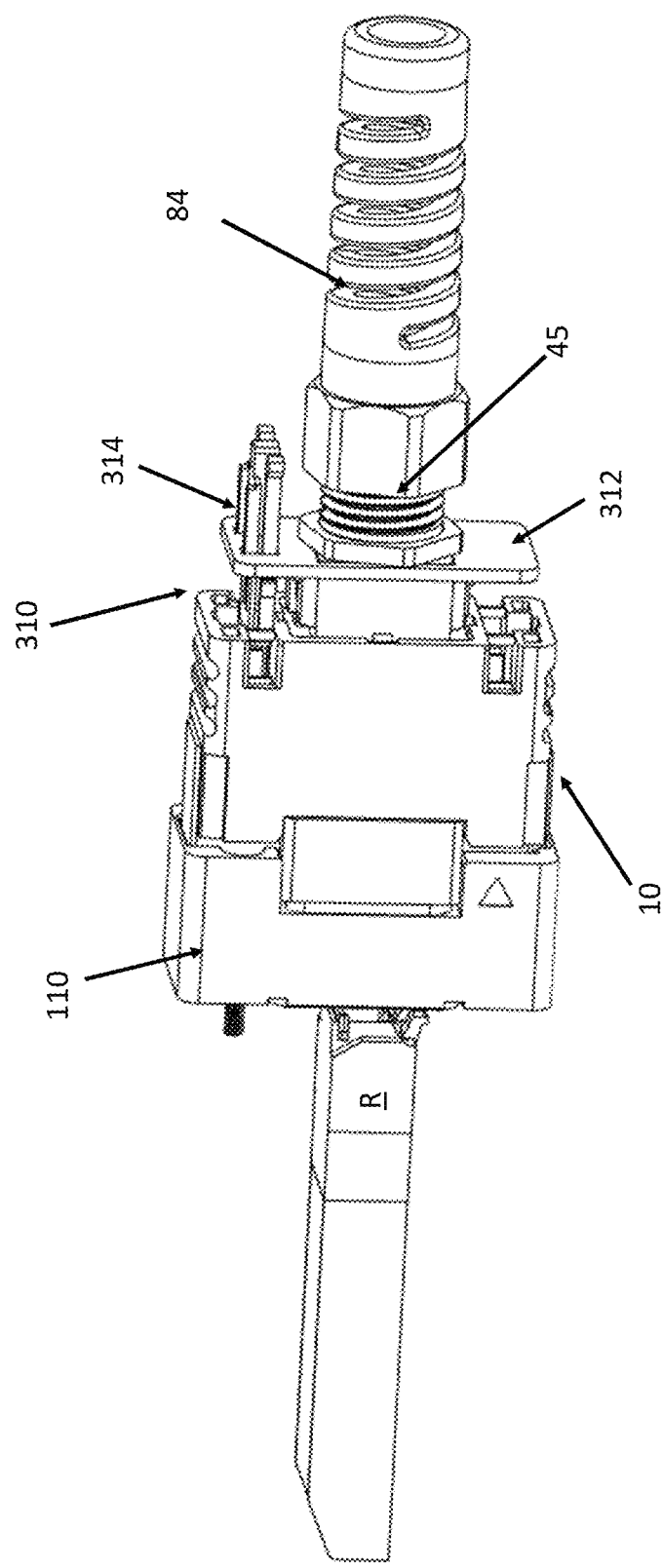
FIG. 62 is a perspective of a connection system including an adapter and a connector and showing the connector mated with the adapter.

FIGS. 57 and 58 show how, when the blocking member 214 is in the blocking positon, the actuator engagement portion 230 interferes with the cable end portion of the delatch actuator 24, thus preventing the delatch actuator from being pulled back in the cable direction CD.

As shown in FIGS. 59-62, when the blocking member 214 is in the blocking position, the concave inner corner 236 is positioned to allow the boot 84 to be threaded onto the cable gland shaft 80.

As can be seen, in the illustrated embodiment, the cable boot 84 is broadly configured to releasably connect to the cable end portion of the connector housing 12 at a coupled (e.g., tightened) position. In the coupled position, the cable boot 84 interferes with the blocking member 214 moving from the blocking position to the release position. The cable boot 84 is movable relative to the connector housing 12 to a displaced (e.g., loosened) position at which the cable boot is positioned so that the blocking member 214 can clear the cable boot to move from the blocking position to the release position. This configuration forces the user to loosen the cable boot 84 before releasing the actuator lock 210. This is advantageous when the connector housing 12 is used in the pass-through configuration discussed above in reference to FIGS. 32-42. The connector 10 cannot release from the adapter 110 until the boot 84 is released, thereby disconnecting the connector from the cable 20.

Figure 63:
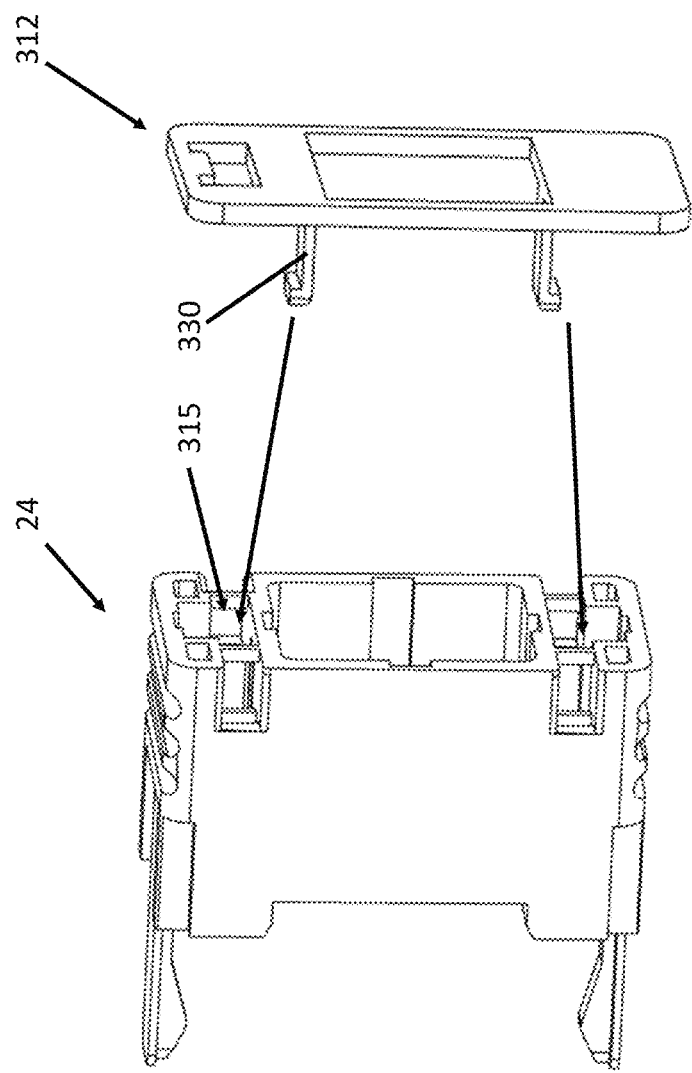
FIG. 63 is an exploded perspective of a subassembly of the connector of FIG. 62 including a delatch actuator and a locking plate of an actuator lock.
Figure 64:
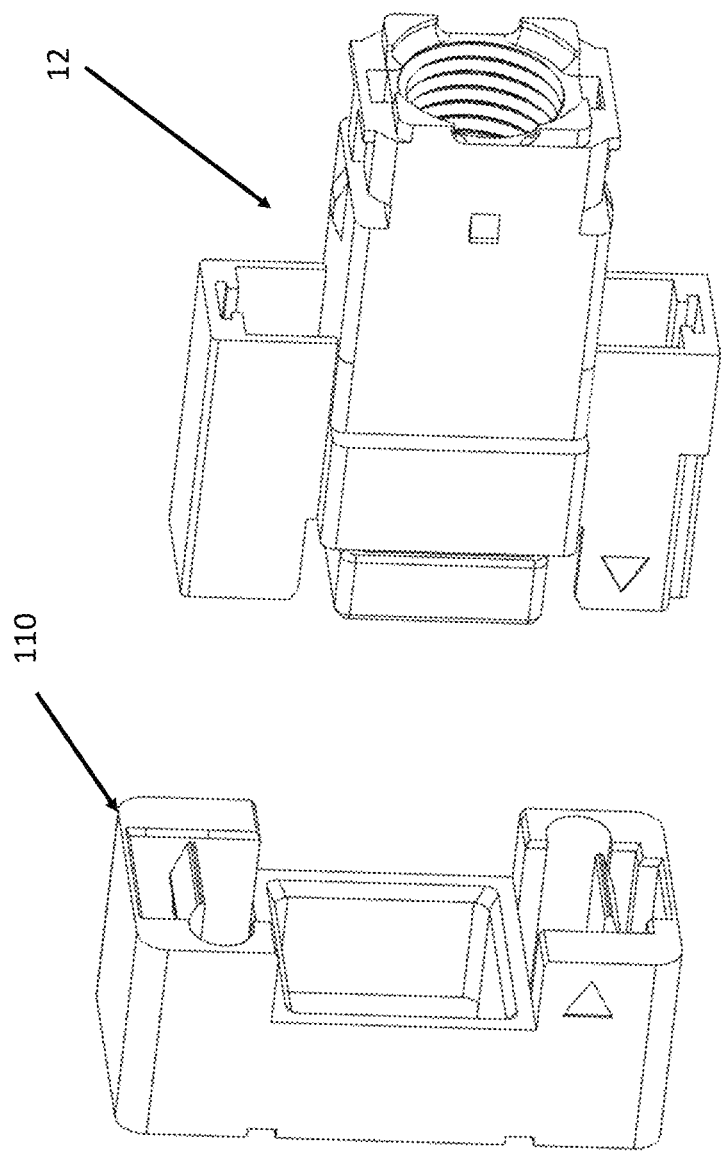
FIG. 64 is a perspective of a connector housing of the connector of FIG. 62 approaching the adapter of FIG. 62.
Figure 65:
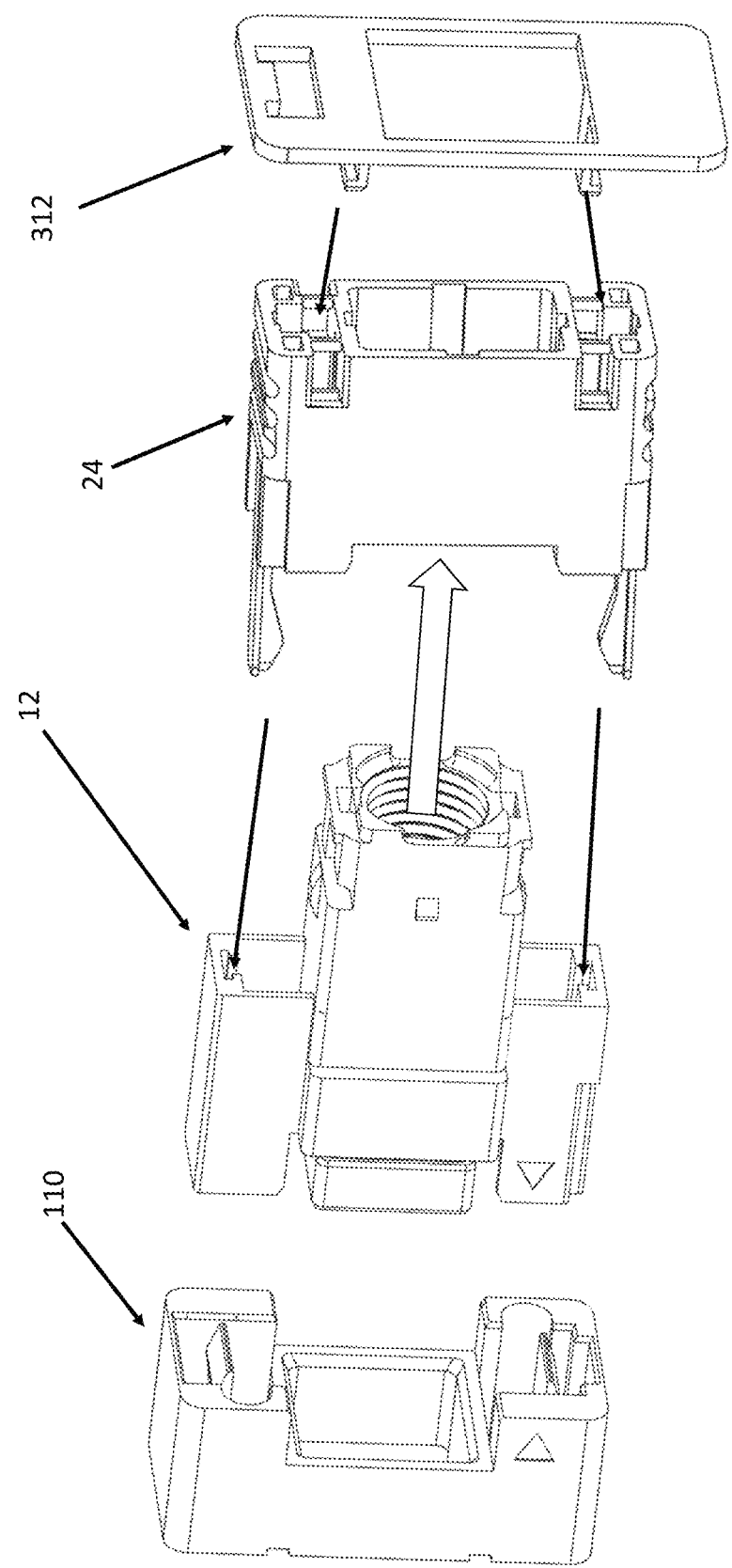
FIG. 65 is an exploded perspective of the connection system of FIG. 62.

Referring to FIGS. 62-69, in another embodiment, the connector 10 is fitted with an alternative actuator lock 310 for selectively retaining the delatch actuator 24 in the locking position. In FIGS. 62-69, the cable end portions of the delatch actuator 24 and the connector housing 12 are modified slightly to interface with the alternative actuator lock 310 but are otherwise the same in all material respects to the delatch actuator and connector housing discussed above. For example, as shown in FIG. 64, the connector housing 12 is configured to mate with the adapter 10 in the same way as described above. And as shown in FIG. 65, the delatch actuator 24 is configured to be loaded onto the connector housing 12 in the same way as described above.

Figure 66:
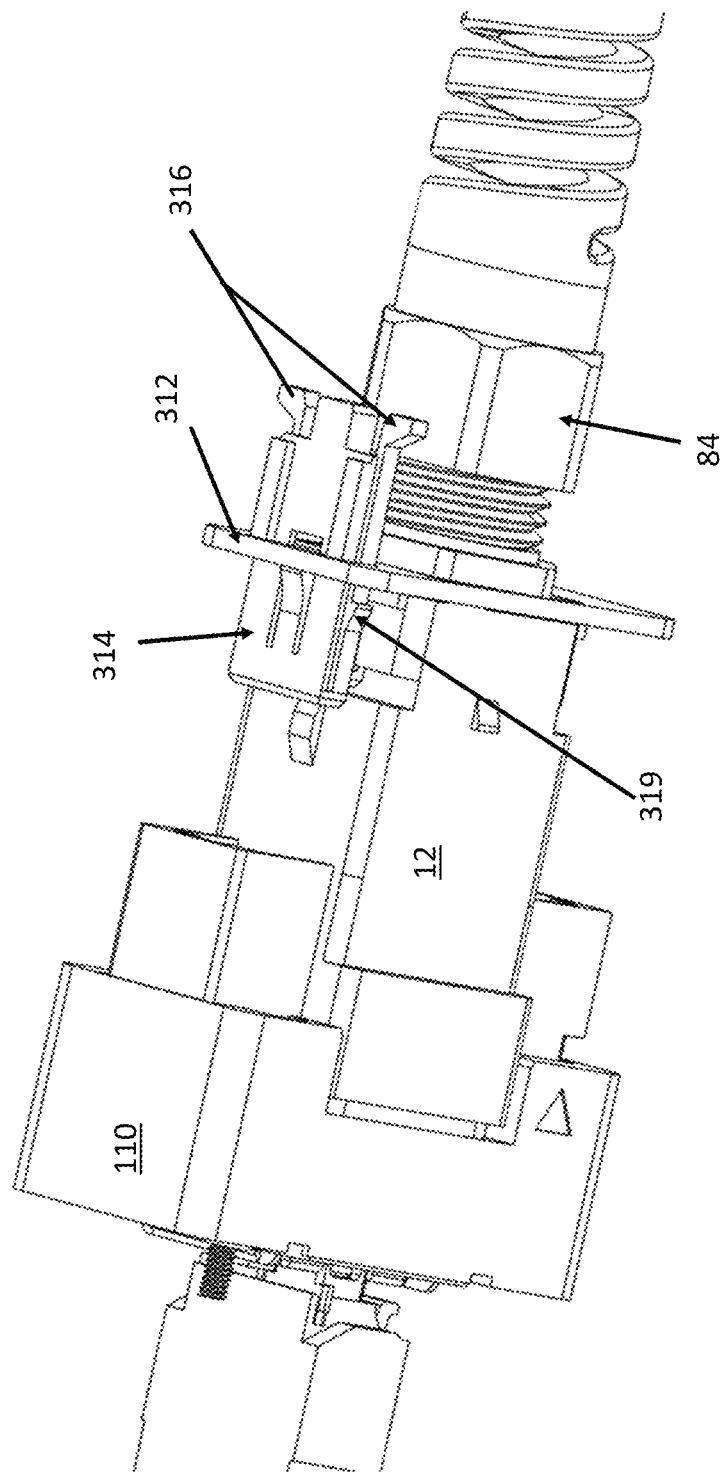
FIG. 66 is an upper perspective of the connection system of FIG. 62 with a delatch actuator of the connector removed, showing a locking key installed on an upper side of the connector.
Figure 67:
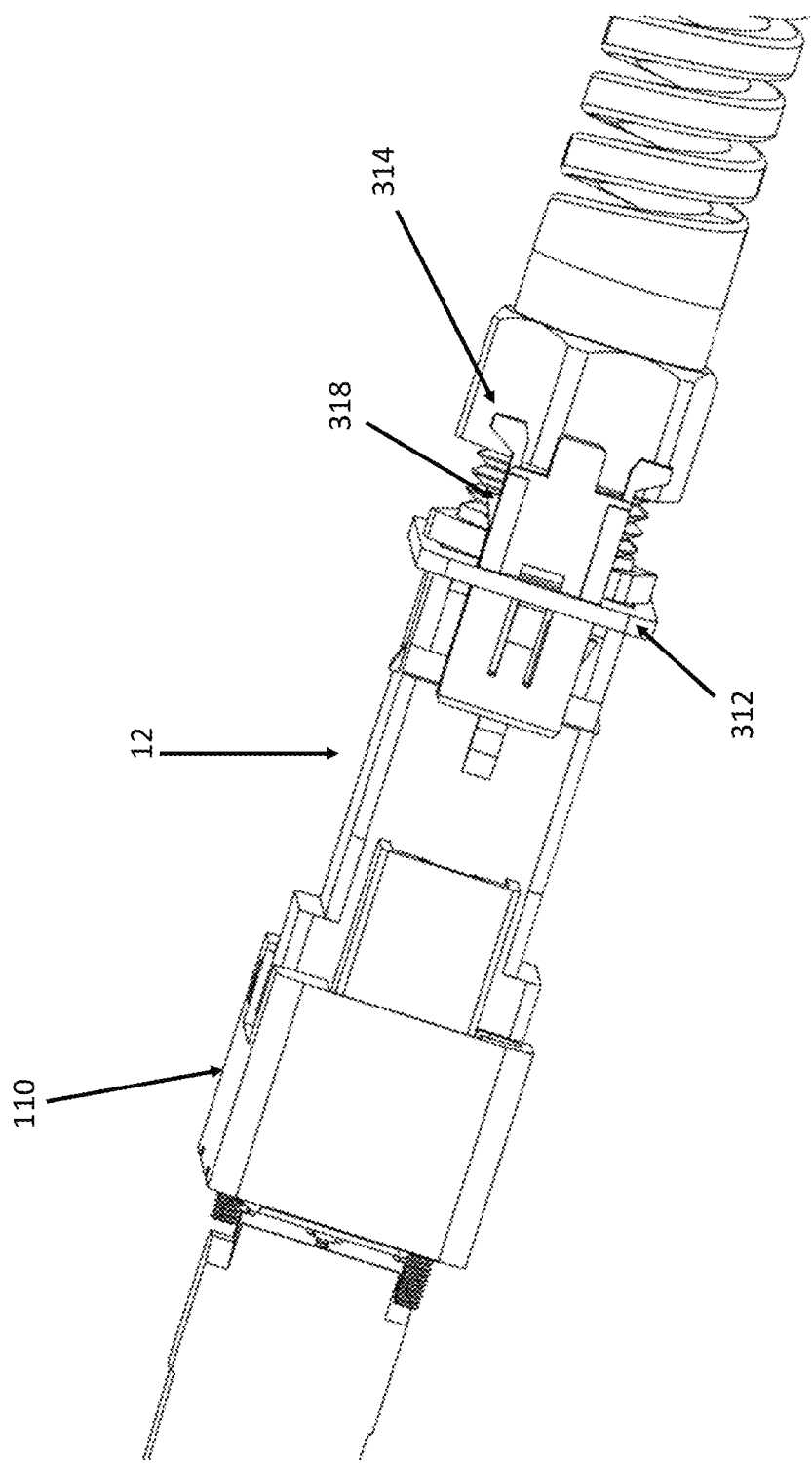
FIG. 67 is another perspective of the connection system of FIG. 62 with a delatch actuator of the connector removed, showing the locking key installed on an upper side of the connector.
Figure 68:
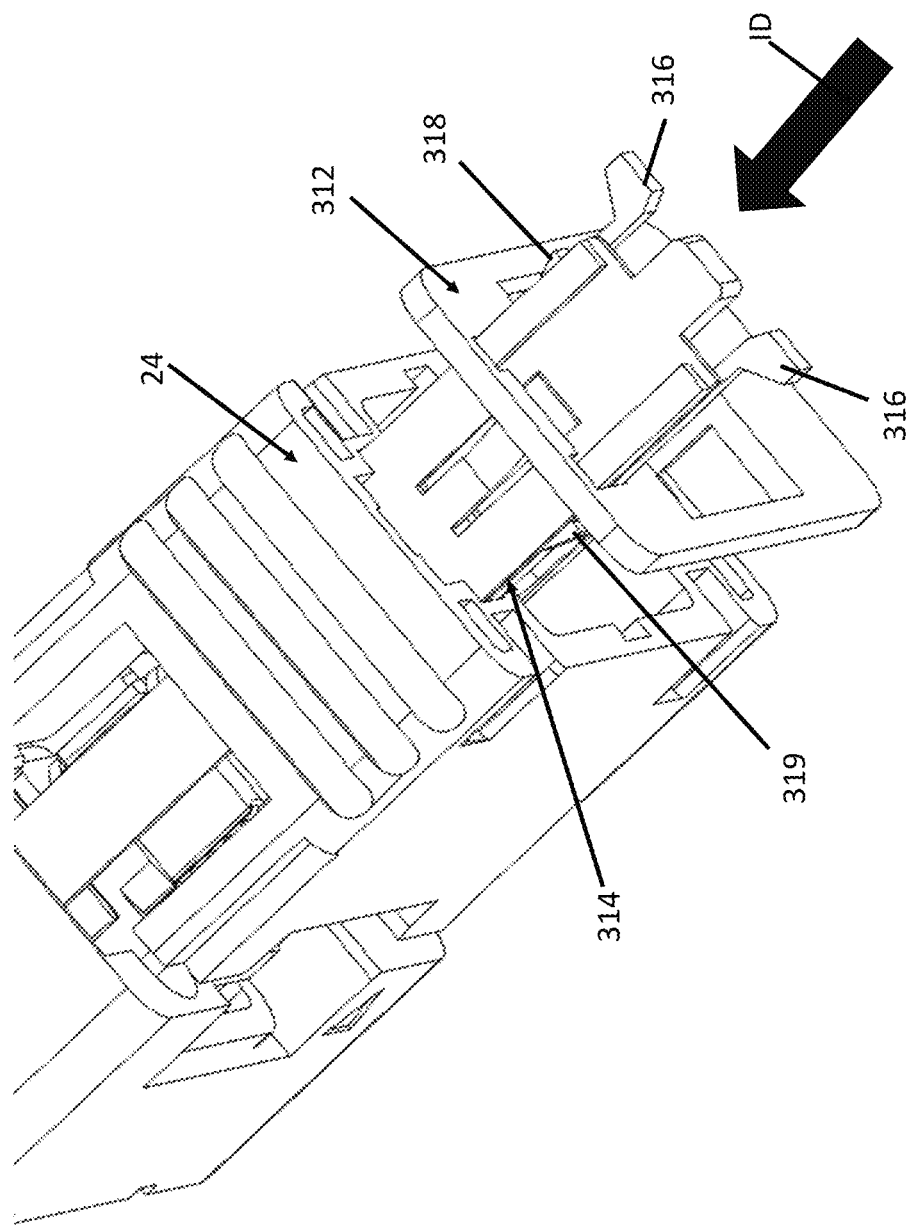
FIG. 68 is an enlarged fragmentary perspective of the connection system of FIG. 62 showing the locking key installed on a lower side of the connector.
Figure 69:
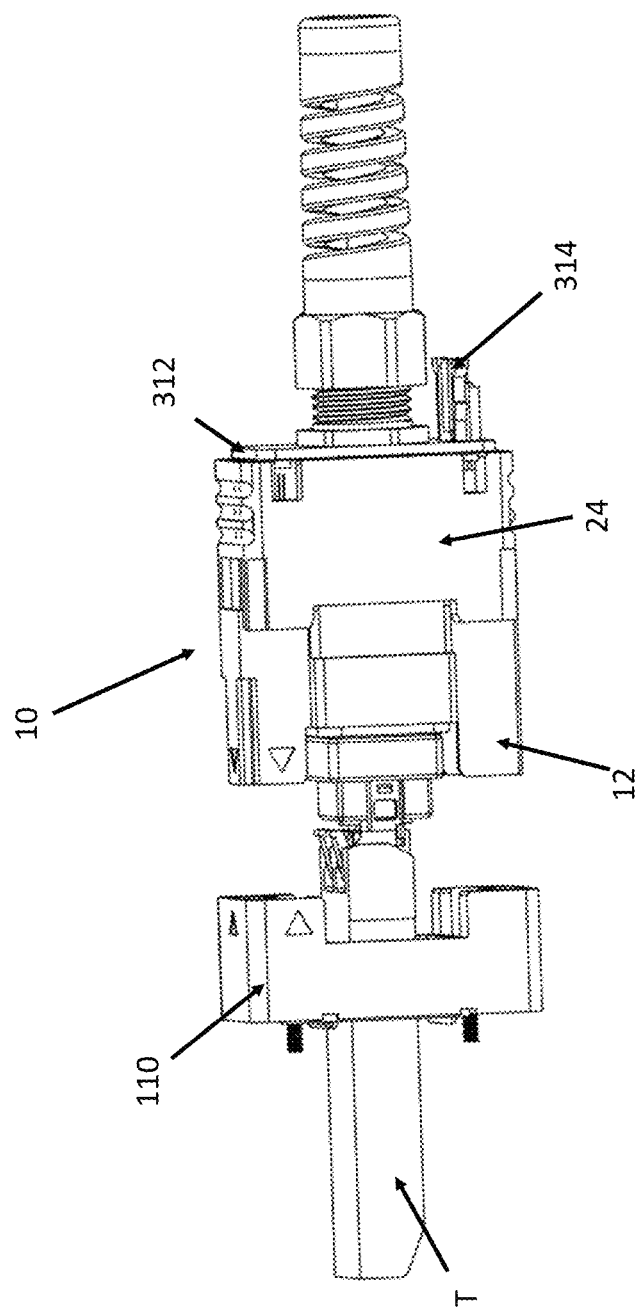
FIG. 69 is another perspective of the connection system of FIG. 62 showing the locking key installed on a lower side of the connector.

As shown in FIGS. 66 and 67, the actuator lock 310 includes a locking plate 312 secured to the cable end portion of the connector housing 12. As shown in FIG. 63, a pair of arms 330 that extend in the insertion direction ID from the locking plate 312 are configured to be slidably received in corresponding recesses formed on the cable end portion of the delatch actuator 24. Referring again to FIGS. 66 and 67, a locking key 314 is engaged with the locking plate 312 and capable of being secured to the delatch actuator 24. More particularly, the locking key has a leading end portion that is configured to be received in a recess 315 formed in the cable end portion of the delatch actuator 24. In one or more embodiments, the delatch actuator 24 comprises a mirror image recess on the opposite side of the central longitudinal axis so that the actuator lock 310 can be selectively used in two inverse orientations in relation to the remainder of the connector 10, depending on which is more convenient (compare FIGS. 68 and 69). The locking 314 key has a pair of flexible legs 316 and a stopper latch 318 on one of the legs that can engage with the locking plate 312. The locking key 314 further includes an actuator catch 319 on the leg opposite the stopper latch 318. The actuator catch 319 is configured to secure the locking key with the delatch actuator 24.

Figure 70A:
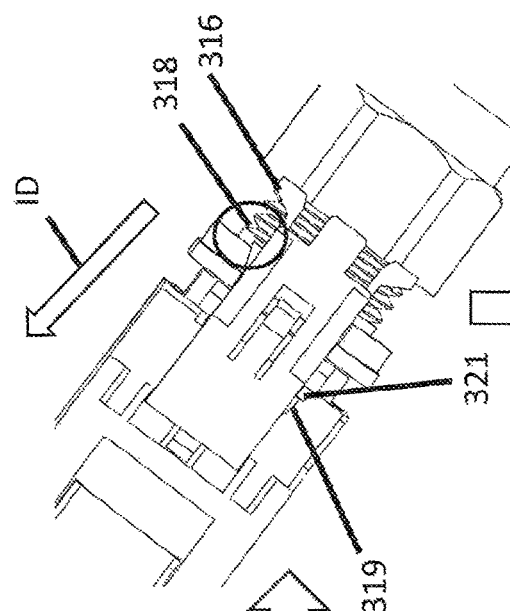
FIG. 70A is an enlarged fragmentary perspective of the connection system of FIG. 62 showing the delatch actuator displaced to an unlocking position at which it connects to the locking key.
Figure 70B:
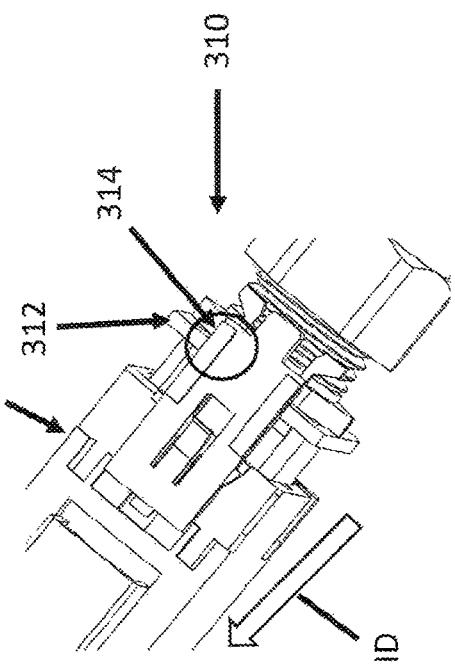
FIG. 70B is an enlarged fragmentary perspective of the connection system showing the delatch actuator advanced to a location between the unlocking position and the locking position after being displaced to the unlocking position as shown in FIG. 70A.
Figure 70C:
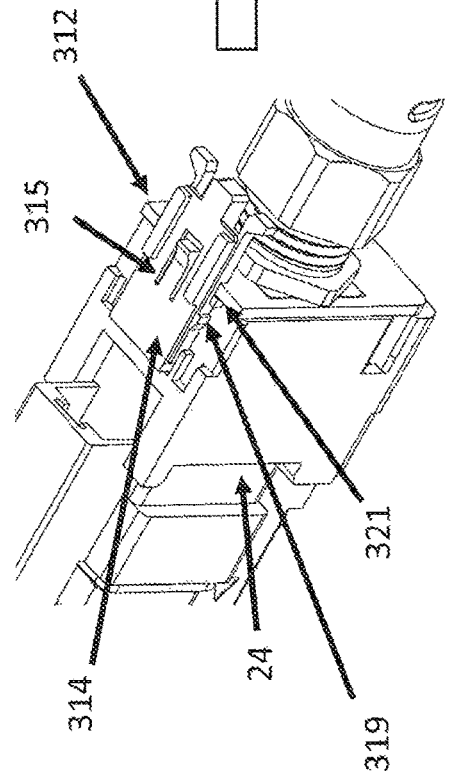
FIG. 70C is an enlarged fragmentary perspective similar to FIGS. 70A and 70B showing the delatch actuator further advanced toward the locking position relative to FIG. 70B.
Figure 70D:
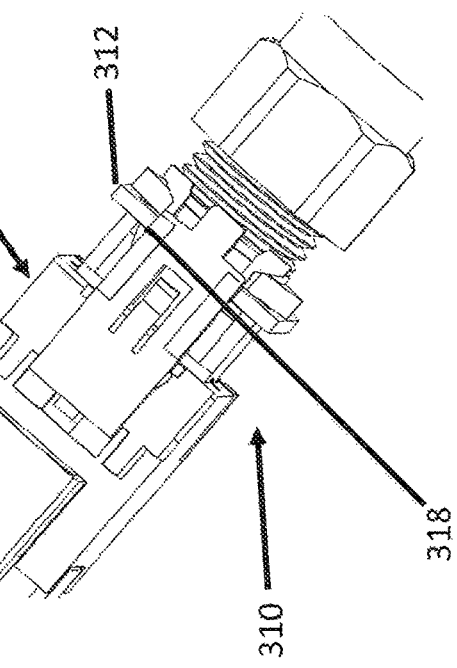
FIG. 70D is an enlarged fragmentary perspective similar to FIGS. 70A-70C showing the delatch actuator in the locking position.

The sequence of locking the locking plate 312 with the delatch actuator 24 is shown in FIGS. 70A-70D. As shown in FIG. 70A, the locking key 314 is initially pushed through the locking plate 312 into a corresponding recess 315 formed in the delatch actuator. The actuator catch 319 on the locking key 314 can snap into connection with the delatch actuator 24 so that the delatch actuator and locking key then move conjointly. More particularly, the actuator catch 319 latches with a protrusion 321 formed on the delatch actuator 24. As the delatch actuator 24 moves in the insertion direction ID (FIG. 70B) to connect the connector 10 to the adapter 110, the locking key 614 is pulled along by the delatch actuator further through the locking plate 312 (e.g., the protrusion 321 engages the catch 319 to move the key 314 forward). The movement of the locking key 314 in the insertion direction ID causes the leg 316 having the stopper latch 318 to deflect inwardly until the stopper latch passes through the locking plate 312 as shown in FIGS. 70C-70D. Once the stopper latch 318 passes the locking plate in the insertion direction ID, the leg 316 moves outward because of its resilience so that part of the stopper latch 318 overlies a portion of the locking plate 312. In this position, the delatch actuator 24 is held against movement in the cable direction CD relative to the locking plate 312 and the connector housing 12 through engagement of the locking plate by the stopper latch. In other words, the locking key functions in this blocking position as a blocking member that is retained on the locking plate 312 to block the delatch actuator 24 from moving from the locking position to the unlocking position.

Figure 71A:
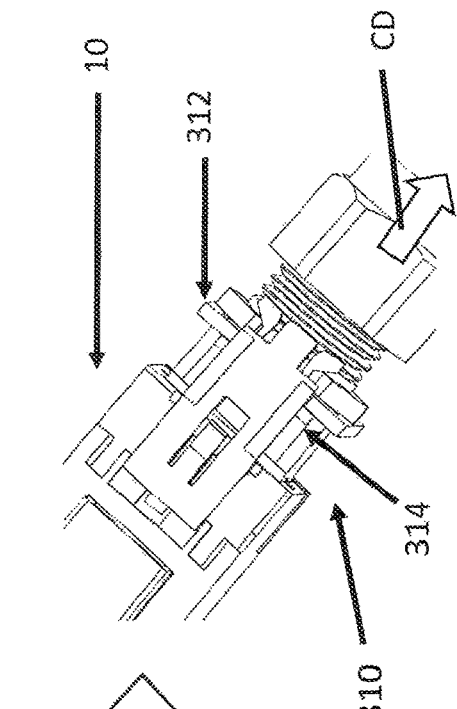
FIG. 71A is an enlarged fragmentary perspective of the connection system of FIG. 62 showing the delatch actuator in the locking position and a locking key of the delatch actuator retained on a locking plate at a blocking position to prevent the delatch actuator from being displaced to the unlocking position.
Figure 71B:
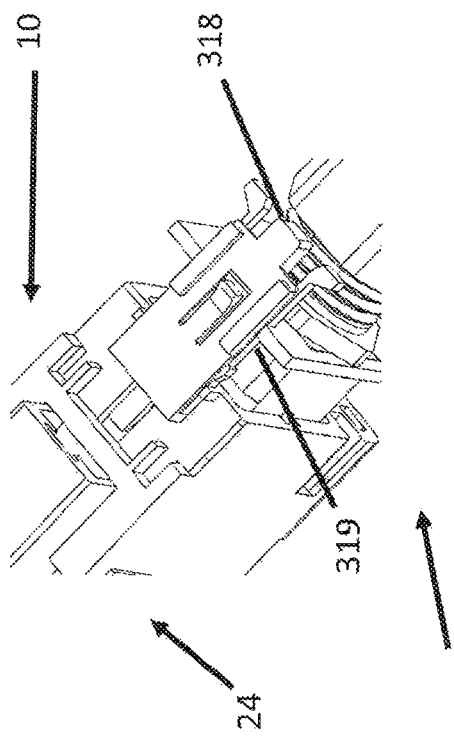
FIG. 71B is an enlarged fragmentary perspective of the connection system similar to FIG. 71A showing the locking key released from the locking plate at the blocking position.
Figure 71D:
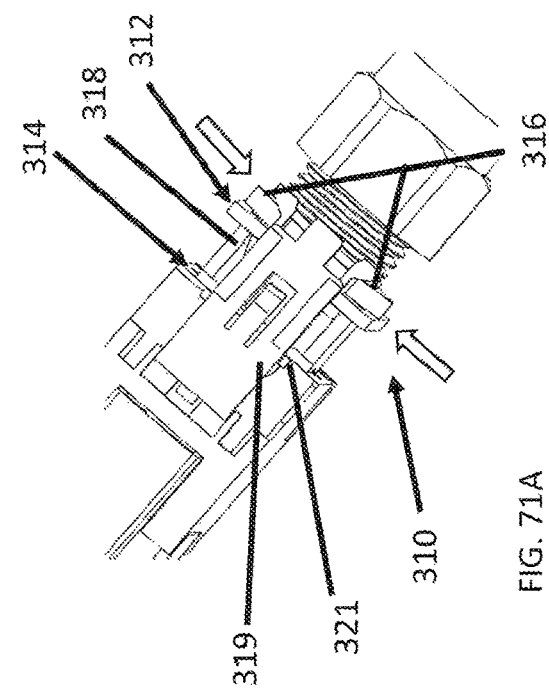
FIG. 71D is an enlarged fragmentary perspective similar to FIGS. 71A-71C showing the locking key at the release position and the delatch actuator displaced to the unlocking position.
Figure 71C:
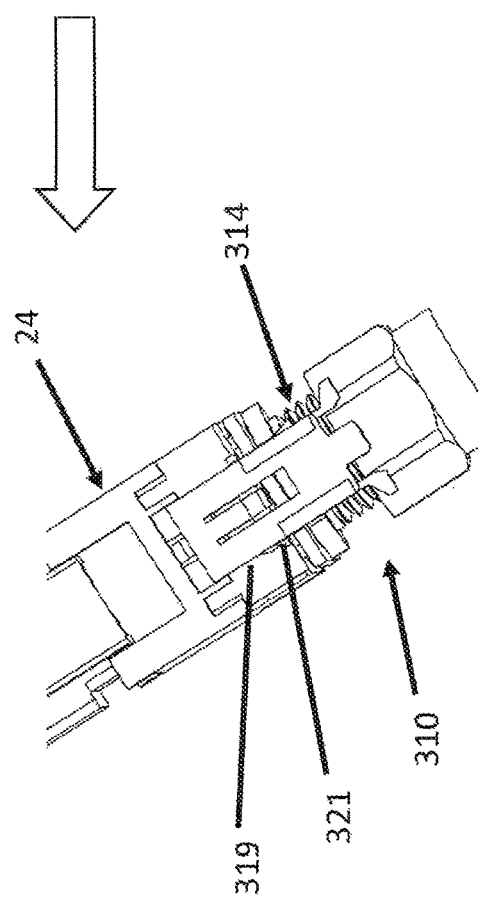
FIG. 71C is an enlarged fragmentary perspective similar to FIGS. 71A and 71B showing the locking key moved to a release position.
Figure 72:
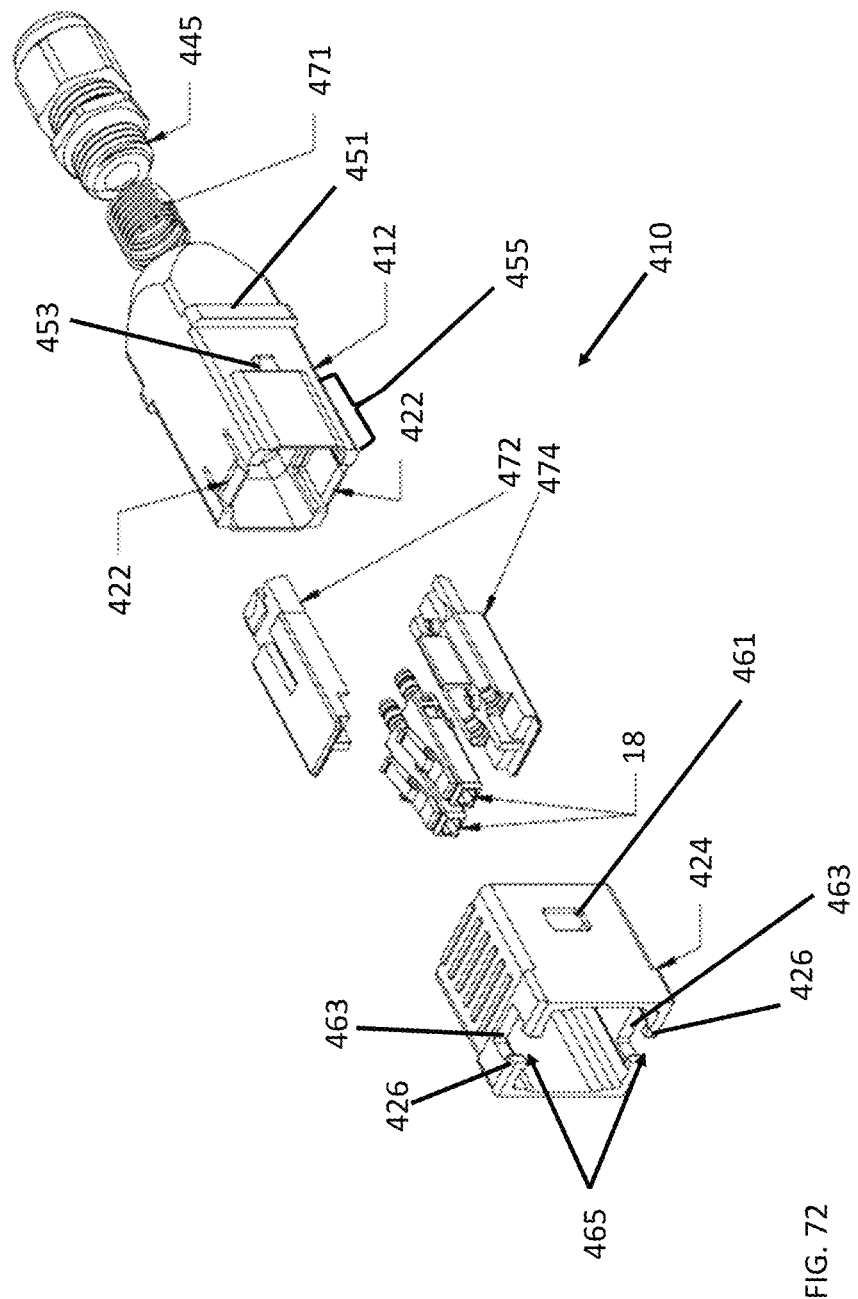
FIG. 72 is an exploded perspective of a connector of another embodiment of a connection system.
Figure 73:
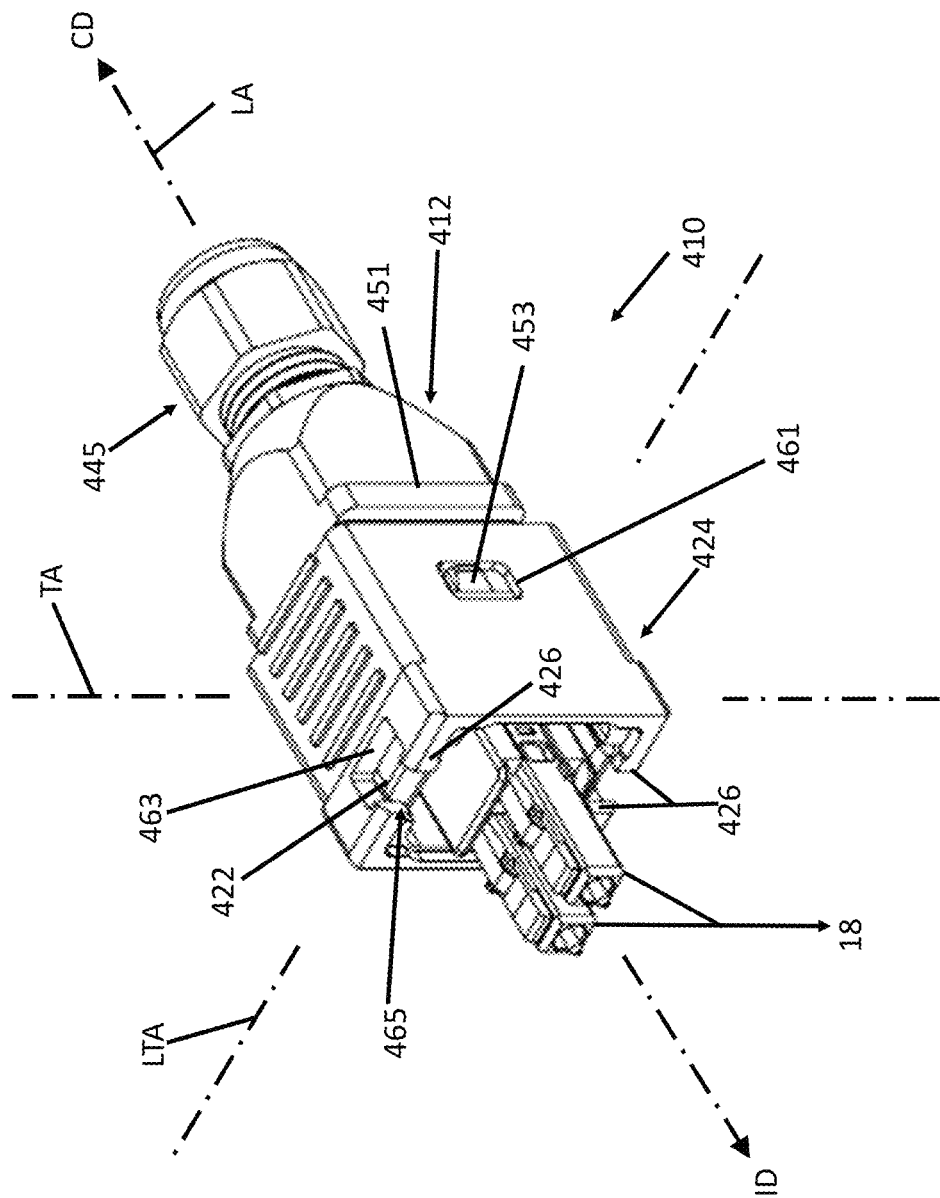
FIG. 73 is a perspective of the connector of FIG. 72.
Figure 74:
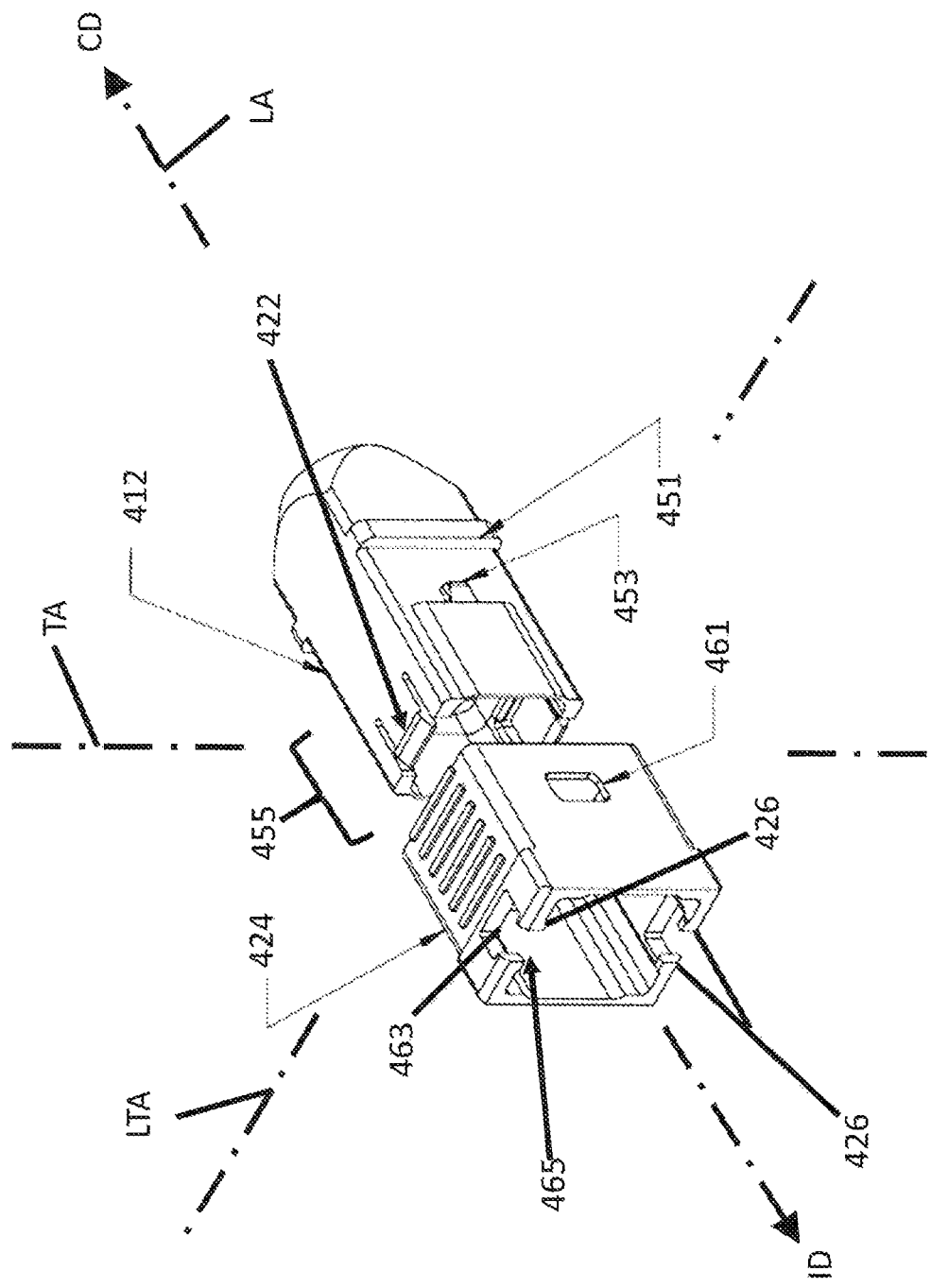
FIG. 74 is an exploded perspective of a subassembly of the connector of FIG. 72 including a connector housing and a delatch actuator.

Referring to FIGS. 71A-71D, in order to release the actuator lock 310, the legs 316 can be pressed inwardly by hand (FIG. 71A) so that the stopper latch 318 clears the locking plate 312 and the actuator catch 319 clears the protrusion 321. As shown in FIGS. 71B-71C, the locking key 314 can then be moved in the cable direction CD relative to the remainder of the connector 10 to a release position. As shown in FIG. 71C-71D, the delatch actuator 24 can then be freely displaced from the locking position to the unlocking position to release the connector 10 from the adapter 110. As shown in FIG. 71D, when the delatch actuator 24 is pulled back, it automatically latches with the actuator catch 319 in the same manner as described above.

Referring to FIGS. 72-103, another embodiment of a connection system for use with a cable assembly 16 that may be mated to the receptacle R includes a connector 410 and an adapter 510. The connector 410 and the adapter 510 are similar in several respects to the connector 10 and adapter 110 discussed above. For example, the connector 410 comprises connector latch elements 422 that are configured to releasably latch with adapter latch elements 518 to connect the connector to the adapter 510 of the connection system. Furthermore, the connector 410 comprises a delatch actuator 424 with delatch arms 426 configured to release the connector and adapter latch elements to disconnect the connection system. As explained more fully below, however, whereas the connector latch element 22 of the connector 10 comprises a locking channel 22 and the adapter latch element 118 of the adapter 110 comprises a bendable latch hook, in the connector 410 and the adapter 510 the placement of these latch elements is reversed. The connector latch elements 422 of the connector 410 comprise bendable latch hooks and the adapter latch elements 518 of the adapter 510 comprise locking channels.

Referring to FIGS. 72-82, the connector 410 broadly comprises a connector housing 412 having an adapter interface end portion and an opposite cable end portion spaced apart along a longitudinal axis LA. The cable end portion of the connector housing 412 is spaced apart from the adapter interface end portion in a cable direction CD. The adapter interface end portion of the connector housing 12 is spaced apart from the cable end portion in a connector insertion direction ID (broadly, a longitudinal direction opposite the cable direction).

The connector housing 412 defines an interior passage that extends longitudinally from the cable end portion through the adapter interface end portion. The adapter interface end portion of the connector housing 412 is configured to mate with an adapter 510 of the connection system (discussed below). The connector housing 412 is configured to receive the optical cable assembly 16 in the interior passage.

The connector 410 further comprises a delatch actuator 424 disposed on the connector housing 412 for movement with respect to the connector housing in the cable direction CD from a locking position (FIGS. 75-78) to an unlocking position (FIGS. 79-82). The delatch actuator 424 comprises at least one delatch arm 426. Each delatch arm 26 is broadly configured for unlatching the connector latch element 422 from a corresponding adapter latch element.

The connector housing 410 generally comprises a rectangular perimeter including left and right side walls spaced apart along a lateral axis LTA and top and bottom walls spaced apart along a transverse axis TA. The cable end portion of the connector housing 410 is internally threaded for coupling to a cable gland assembly 445. Each of the left and right side walls of the connector housing 412 comprises a flange 451 and an actuator retention catch 453 spaced apart from the flange in the insertion direction ID.

The adapter interface end portion of the connector housing 410 defines an adapter receptacle 455 that is configured to receive a portion of the adapter 510 therein. Along the receptacle 455, the top and bottom walls of the connector housing 412 define bendable latch hooks 422 that are configured for releasably retaining the connector 410 on the adapter 510. The bendable latch hooks 422 have free leading end portions and cantilevered trailing end portions that are bendably connected to the remainder of the connector housing 412. The free leading end portions define hooks comprising leading chamfers and trailing hook surfaces. The leading chamfers slope radially inward toward the longitudinal axis LA as they extend in in the insertion direction ID. The trailing hook surfaces are oriented generally perpendicular to the longitudinal axis.

The delatch actuator 424 comprises a generally rectangular perimeter including left and right side walls spaced apart along a lateral axis LTA and top and bottom walls spaced apart along a transverse axis TA. The left and right side walls each define a recess 461 configured to receive a respective actuator retention catch 453 therein. The delatch actuator 424 can be loaded onto the adapter interface end portion of the connector housing 412 by movement in the cable direction, whereby the actuator retention catches 453 snap into the recesses 461. The delatch actuator 424 is then movable relative to the connector housing 412 along the longitudinal axis in a limited range of motion that includes a locking position (FIGS. 75-78) in which a trailing edge of the recess 461 opposes a trailing end of the catch 453 and an unlocking position (FIGS. 79-82) in which a trailing end of the delatch actuator 424 engages the flanges 451.

Each of the upper and lower walls of the delatch actuator 424 defines a recess 463 for receiving a respective one of the bendable latch hooks 422. In the illustrated embodiment, each recess 463 comprises a leading gap 465 that opens through the leading end of the respective wall of the delatch actuator 424. Each of the upper and lower walls of the delatch actuator 424 comprises left and right delatch arms 426 (broadly, first and second delatch arms) that extend inward along the lateral axis LTA at a leading end portion of the respective recess 463. The delatch arms 426 on each wall protrude laterally inward toward one another at a leading end portion of the recess 463. The arms 426 overlap outer portions of the recess 463 along the lateral axis LTA. As shown in FIGS. 77 and 78, when the delatch actuator 424 is in the unlocking position, the delatch arms 426 on each wall of the actuator are spaced apart from the leading end of the corresponding bendable latch hook 422 in the connector insertion direction ID. As the delatch actuator 424 moves in the cable direction CD from the unlocking position, the delatch arms 426 are configured to slide along the leading chamfers of the latch hooks 422 and thereby bend the latch hooks inward toward one another for delatching the connector 410 from the adapter 510. Each of the delatch arms 426 extends laterally inward to a free end, and the free ends of the arms are spaced apart from one another to define the gap 465. As will be explained in further detail below, when the connector 410 is inserted into the adapter 510, an adapter latch structure is passable longitudinally through the gap 465 to latch with the bendable latch hook 422 of the connector housing 412.

Referring to FIGS. 93-99, the pair of LC plugs 18 are secured inside a plug retention body 470 that in turn is received in the connector housing 412. In one or more embodiments a spring 471 (FIG. 72) is compressed between the cable gland assembly 445 and the cable end portion of the plug retention body 470 to yieldably bias the plug retention body and plugs 18 in the insertion direction ID. The illustrated plug retention body 470 has a clamshell configuration. More particularly, the plug retention body 470 comprises an upper body part 472 and a lower body part 474 that are configured to secure together by snap-fit connection such that the plugs 18 are retained between the upper and lower body parts. In the illustrated embodiment, each of the upper and lower body parts 472, 474 defines grooved backpost channels 475 configured to hold ribbed backposts 477 of the plugs 18. The upper body part 472 further comprises a leading overhang 479 that is configured to depress LC latch arms 481 of the plugs 18. The upper and lower body parts 472, 474 further comprise trailing bend latches 483 that are configured to latch with corresponding catches 485 formed on the interior of the connector housing 412 (FIGS. 98-99).

Referring to FIGS. 100-101, much like the adapter 110 as shown in FIGS. 21 and 22, the adapter 510 is configured to mount on a panel P having an opening O therethrough (however, the panel is omitted from the drawings depicting the adapter 510 for clarity). The adapter 510 comprises a panel engagement wall 512 configured to be coupled to the panel P in face-to-face relationship therewith. The adapter 510 further comprises a rectangular fitting 514 extending longitudinally from the panel engagement wall 512 and defining a connector opening 516 therethrough. The fitting 514 is generally rectangular in shape for mating with the adapter receptacle 455 of the connector 410. The fitting 514 comprises a seal groove 515 that is configured to seat an annular gasket 517. When the fitting 514 is mated with the connector 410, the gasket 517 is compressed between the fitting and the adapter receptacle 455 to seal the interface between the connector and the adapter 510 against the ingress of liquid or debris through the interface.

The panel engagement wall 512 is configured to be positioned on the panel P such that the connector opening 516 aligns with an opening O in the panel P. Suitably the panel engagement wall 512 includes at least one mounting feature, such as the screw holes 524, for mounting the adapter 510 on the panel P (e.g., via screws 525). Although not shown, it is contemplated that the panel-facing side of the panel engagement wall 512 can comprise seal grooves around each of the screw holes 524 for retaining an O-ring gasket around each of the screws 525. Additionally, the panel-facing side of the illustrated panel engagement wall 512 comprises a seal groove 530 around the connector opening 516. The seal groove 530 is configured to seat a seal gasket 532 that extends 360 degrees about the connector opening 516 and the panel opening O. The gasket 532 is configured provide a fluid seal of the interface between the adapter 510 and the panel P to prevent ingress of liquid and/or debris through the interface.

The adapter 510 broadly comprises at least one adapter latch element 518 configured to latch with a latch element 422 of the connector 410. In the illustrated embodiment, the adapter 510 comprises upper and lower locking channels 518 (broadly, first and second locking channels) extending longitudinally from the panel engagement wall 512 on opposite sides of the fitting 514 for latching with the upper and lower latch hooks 422 of the connector. Each of the locking channels 518 is defined by an upper or lower wall of the fitting 514 and a catch overhang 519 in opposing, spaced apart relationship with the fitting. Each catch overhang 519 includes a finger 521 that protrudes inwardly along the transverse axis TA. When the connector 410 is mated with the adapter 510, the finger 521 passes through the laterally extending gap 465 and latches with the bendable latch hook 422.

Figure 84:
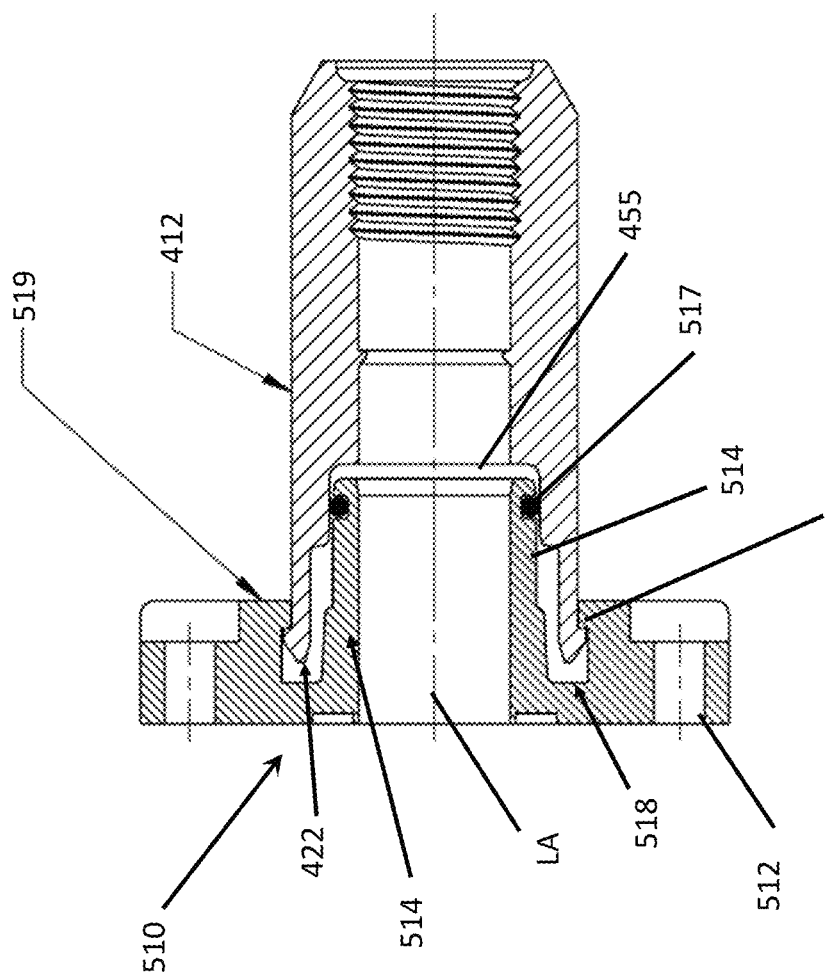
FIG. 84 is the section of FIG. 83 but showing the latch hooks rebounded outward to latch with the adapter.
Figure 89:
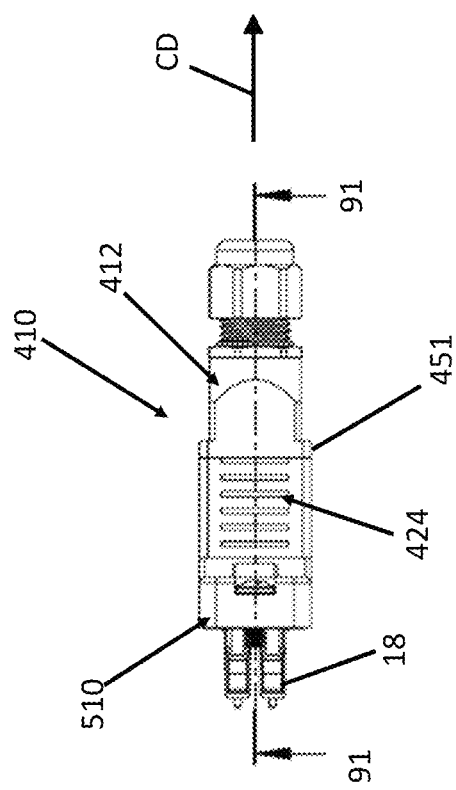
FIG. 89 is an elevation of the connection system of FIG. 85 showing the connector mated and unlatched from the adapter.
Figure 93:
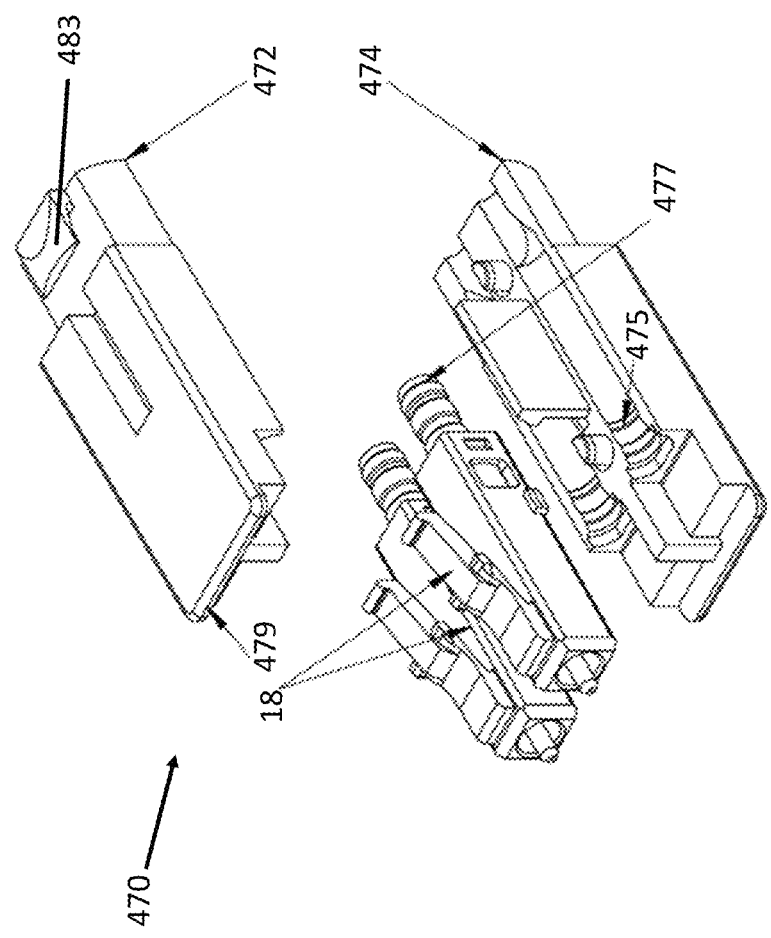
FIG. 93 is an exploded perspective of a subassembly of the connector of FIG. 72 including optical fiber plugs and a plug retention body.
Figure 97:
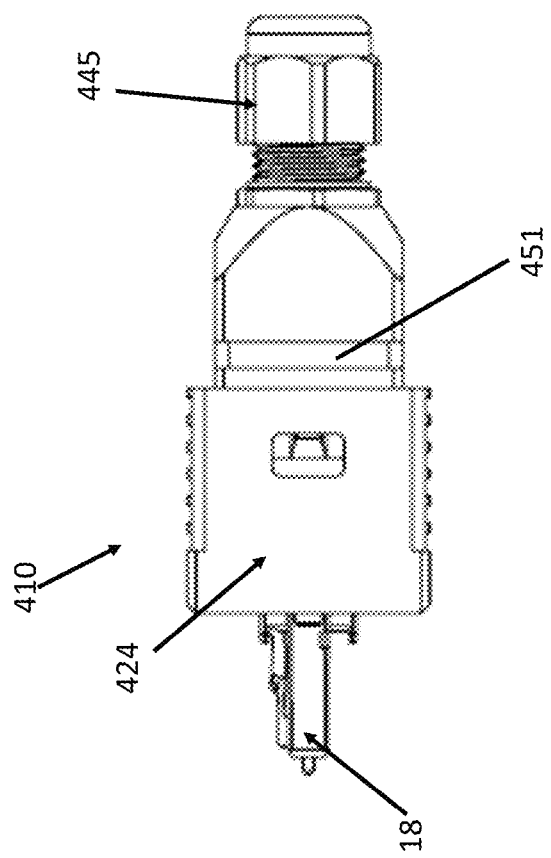
FIG. 97 is a side elevation of the connector of FIG. 72.
Figure 96:
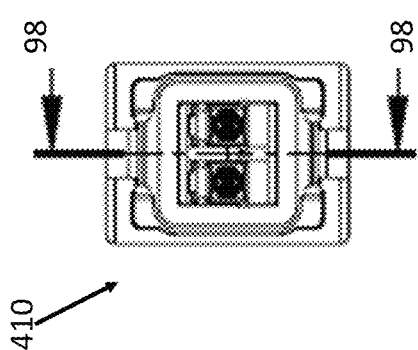
FIG. 96 is an end elevation of the connector of FIG. 72.

Referring to FIGS. 83, 102, and 103, the connector 410 is configured to mate with the adapter 510 by movement relative to the adapter in the insertion direction ID. The receptacle 455 of the connector housing receives the fitting 514 of the adapter 510 and the gasket 517 provides a fluid seal of the interface between the fitting and the receptacle. As the fitting 514 passes into the receptacle 455, the upper wall of the receptacle passes into the upper locking channel 518 between the fitting 514 and the upper catch overhang 519 and the lower wall of the receptacle passes into the lower locking channel between the fitting and the lower catch overhang. The fingers 521 of the catch overhangs 519 pass through the corresponding gaps 465 and into the recesses 463. The fingers 521 slide along the leading chamfers of the bendable latch hooks 422 and thereby depress the latch hooks inward. When the fingers 521 clear the trailing locking surfaces of the latch hooks 422, the latch hooks resiliently rebound thereby latching with the adapter as shown in FIG. 84 (which omits the delatch actuator 424) and FIGS. 85-87. When latching is complete, the delatch actuator 424 is positioned in the locking position where the delatch arms 426 are longitudinally spaced from the bendable latch hooks 422 in the insertion direction ID.

Referring to FIGS. 102 and 103, it can be seen that the connection system 410, 510 provides an ingress protected enclosure around the cable assembly 16 and its mating receptacle R on the front side of a panel P. The gasket 532 seals the interface between the adapter 510 and the front of the panel P, the seal 517 seals the interface between the connector 410 and the adapter, and the cable gland assembly 445 seals the interface between the connector and the cable assembly 16. Thus, the connection system can protect the mated plugs 18 and receptacle R from ingress originating on the front side of a panel P.

Referring to FIGS. 89-92, to remove the connector 410 from the adapter 510, the user pulls the delatch actuator 424 in the cable direction CD. Initially the connector housing 412 is retained in place by the latching engagement of the latch hooks 422 with the fingers 521. This causes the delatch actuator 424 to be displaced in the cable direction CD relative to the connector housing 412 from the locking position to the unlocking position. As the delatch actuator 424 is displaced, the delatch arms 426 slide along the leading chamfers of the latch hooks 422 and depress the latch hooks transversely inward to clear the fingers 521. This unlatches the latch hooks 422 from the locking channels 518. The cable end of the delatch actuator 424 engages the flange 451 and thus transfers the pulling force to the connector housing 412. Further pulling of the delatch actuator 424 withdraws the connector 410 from the adapter 510.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical connection system for a receptacle and an optical cable assembly comprising
an optical cable terminated by an optical plug configured to mate with the receptacle, the optical connection system comprising: an adapter comprising a plug opening and an adapter latch element, the adapter having a first end and a second end, the plug opening extending from the first end to the second end, the adapter configured to be supported adjacent to the receptacle such that at least a portion of the optical plug is passable through the plug opening from the first end and protrudes from the second end to mate with the receptacle; and a connector configured to releasably couple to the adapter, the connector comprising: a connector housing having an adapter interface end portion and a cable end portion, the connector housing defining an interior passage extending longitudinally through the connector housing from the cable end portion through the adapter interface end portion, the adapter interface end portion of the connector housing being configured to mate with the adapter, the connector housing being configured to receive the optical cable assembly in the interior passage such that the optical cable extends from the cable end portion of the connector housing in a cable direction and the optical plug is exposed through the adapter interface end portion in an opposite direction for mating with the receptacle, the connector housing further comprising a connector latch element configured to latch with the adapter latch element to secure the connector to the adapter when the connector housing is mated with the adapter; and a delatch actuator disposed on the connector housing for movement with respect to the connector housing from a locking position to an unlocking position, the delatch actuator comprising a delatch arm; wherein one of the adapter latch element and connector latch element comprises a bendable latch hook and the other of the adapter latch element and connector latch element comprises a locking channel; wherein when the connector housing is mated with the adapter, the delatch arm is configured to: (i) allow the bendable latch hook to latch with the locking channel when the delatch actuator is in the locking position; and (ii) unlatch the bendable latch hook from the locking channel as the delatch actuator moves from the locking position to the unlocking position.

2. The optical connection system as set forth in claim 1, wherein the adapter latch element comprises the bendable latch hook and the connector latch element comprises the locking channel.

3. The optical connection system as set forth in claim 2, wherein the delatch arm is slidably received in the locking channel.

4. The optical connection system as set forth in claim 3, wherein the locking channel comprises an adapter interface end portion, a cable end portion and a locking surface facing in the cable direction, the locking surface being longitudinally spaced apart between the adapter interface end portion and the cable end portion, the locking surface having a transverse dimension along a transverse axis.

5. The optical connection system as set forth in claim 4, wherein the delatch arm comprises a wedge surface facing in the cable direction and having a transverse dimension along the transverse axis that is greater than the transverse dimension of the locking surface.

6. The optical connection system as set forth in claim 5, wherein the locking surface extends generally in a plane, wherein when the delatch actuator is in the locking position the wedge surface is spaced apart in a mating direction from the plane and wherein the wedge surface crosses the plane as the delatch actuator moves from the locking position to the unlocking position.

7. The optical connection system as set forth in claim 6, wherein as the wedge surface crosses the plane, the bendable latch hook slides along the wedge surface as a cam such that the wedge surface displaces the bendable latch hook transversely to clear the locking surface.

8. The optical connection system as set forth in claim 2, wherein the connector housing comprises a central enclosure which defines the interior passage.

9. The optical connection system as set forth in claim 8, wherein the locking channel comprises a first locking channel and a second locking channel on opposite sides of the central enclosure, the first and second locking channels being spaced apart along a transverse axis.

10. The optical connection system as set forth in claim 9, wherein the delatch arm comprises a first delatch arm slidably received in the first locking channel and a second delatch arm slidably received in the second locking channel.

11. The optical connection system as set forth in claim 10, wherein the bendable latch hook comprises a first bendable latch hook and a second bendable latch hook, the first and second delatch arms being configured to (i) allow the first and second bendable latch hooks to latch with the locking channel when the delatch actuator is in the locking position; and (ii) unlatch the first and second bendable latch hooks from the locking channel as the delatch actuator moves from the locking position to the unlocking position.

12. The optical connection system as set forth in claim 11, wherein the first and second delatch arms comprise inward facing wedge surfaces configured to bend the first and second bendable latch hooks inward toward one another as the delatch actuator moves from the locking position to the unlocking position.

13. The optical connection system as set forth in claim 8, wherein the central enclosure comprises an adapter interface end portion configured to be received in the plug opening when the connector housing is mated with the adapter, the optical connection system further comprising a seal configured to seal an interface between the adapter and the adapter interface end portion of the central enclosure when the adapter interface end portion is received in the plug opening.

14. The optical connection system as set forth in claim 8, wherein the central enclosure comprises a cable end portion, the optical connection system further comprising a cable seal configured to couple to the cable end portion of the central enclosure and seal an interface between the cable end portion of the central enclosure and the optical cable.

15. The optical connection system as set forth in claim 1, wherein the connector housing is configured to hold the optical plug in the interior passage.

16. The optical connection system as set forth in claim 1, wherein the connector housing is configured to be movable longitudinally along the cable in relation to the plug.

17. The optical connection system as set forth in claim 1, wherein the adapter latch element comprises the locking channel and the connector latch element comprises the bendable latch hook.

18. The optical connection system as set forth in claim 17, wherein the delatch actuator comprises a wall defining a recess for receiving the bendable latch hook.

19. The optical connection system as set forth in claim 18, wherein delatch arm is located at a leading end portion of the recess.

20. The optical connection system as set forth in claim 19, wherein the delatch arm comprises first and second delatch arms protruding laterally inward toward one another at the leading end portion of the recess.

21. The optical connection system as set forth in claim 20, wherein each of the first and second delatch arms has a free end and the free ends of the first and second delatch arms are spaced apart from one another to define a laterally extending gap therebetween.

22. The optical connection system as set forth in claim 21, wherein the adapter comprises a fitting which defines the plug opening and a catch overhang in opposing, spaced apart relationship with the fitting such that the catch overhang and the fitting together form the locking channel.

23. The optical connection system as set forth in claim 22, wherein the catch overhang includes an inwardly protruding finger configured to pass through the laterally extending gap and latch with the bendable latch hook.

24. The optical connection system as set forth in claim 23, wherein the first and second delatch arms are configured to depress the bendable latch hook inwardly to clear the inwardly protruding finger as the delatch actuator moves from the locking position to the unlocking position.

25. The optical connection system as set forth in claim 22, wherein the connector housing comprises a perimeter wall configured to receive the fitting therein such that a portion of the perimeter wall is located in the channel between the fitting and the catch overhang.

26. The optical connection system as set forth in claim 1, wherein the adapter is configured to mount on a panel such that the plug opening is aligned with an opening through the panel, the adapter comprising a panel engagement wall configured to engage the panel in face-to-face relationship therewith, the connection system further comprising a seal configured to seal an interface between the panel engagement wall and the panel about the plug opening and the opening through the panel.

27. The optical connection system as set forth in claim 1, wherein the delatch actuator comprises a sleeve that is configured to fit around the perimeter of at least a portion of the connector housing.

* * * * *